(12) United States Patent
Lin et al.

(10) Patent No.: US 8,493,385 B2
(45) Date of Patent: Jul. 23, 2013

(54) 3D IMAGE DISPLAY DEVICE

(75) Inventors: Ming-Yen Lin, Taipei (TW); Kan-Ju Lee, Taipei County (TW); Shou-Lun Chin, Keelung (TW)

(73) Assignee: Unique Instruments Co. Ltd, Taipei (TW)

( * ) Notice: Subject to any disclaimer, the term of this patent is extended or adjusted under 35 U.S.C. 154(b) by 379 days.

(21) Appl. No.: 13/008,266

(22) Filed: Jan. 18, 2011

(65) Prior Publication Data

US 2012/0086708 A1    Apr. 12, 2012

(30) Foreign Application Priority Data

Oct. 12, 2010  (TW) ............................... 99134699 A

(51) Int. Cl.
*G06T 15/00*    (2006.01)
*G09G 5/00*    (2006.01)

(52) U.S. Cl.
USPC .......................................... 345/419; 345/613

(58) Field of Classification Search
USPC .................................. 345/419, 613
See application file for complete search history.

(56) References Cited

U.S. PATENT DOCUMENTS

| | | | |
|---|---|---|---|
| 7,126,598 B2 * | 10/2006 | Oh et al. | 345/419 |
| 7,889,196 B2 * | 2/2011 | Nomura et al. | 345/419 |
| 2010/0007721 A1 * | 1/2010 | Kim et al. | 348/51 |

* cited by examiner

*Primary Examiner* — Hau Nguyen
(74) *Attorney, Agent, or Firm* — WPAT, PC; Justin King

(57) ABSTRACT

A 3D image display device mainly includes a multi-view image, a view memory, a memory image configuration, combination, and conversion procedure, a display memory, a conversion display controller, a display screen having sub-pixels in Delta configuration, and a view separation device. The memory image configuration, combination, and conversion procedure mainly performs processes of sub-pixel image configuration sequence conversion and multi-view image combination on the multi-view image, and outputs a recovered multi-view combined image. The conversion display controller mainly performs sub-pixel image data configuration sequence conversion on image data on even-numbered or odd-numbered horizontal scan lines of the recovered multi-view combined image, and then outputs the horizontal scan image data. The display screen having sub-pixels in Delta configuration receives the horizontal scan image data and displays the recovered multi-view combined image. The view separation device performs view separation on the recovered multi-view combined image to provide a 3D image.

61 Claims, 37 Drawing Sheets

3D IMAGE DISPLAY DEVICE

BACKGROUND OF THE INVENTION

1. Field of Invention

The present invention relates to a 3D image display device, mainly including a multi-view image, a view memory, a memory image configuration, combination, and conversion procedure, a display memory, a conversion display controller, a display screen having sub-pixels in Delta configuration, and a view separation device, in which the memory image configuration, combination, and conversion procedure mainly performs processes of sub-pixel image configuration sequence conversion and multi-view image combination on the multi-view image, and outputs a recovered multi-view combined image; the conversion display controller mainly performs sub-pixel image data configuration sequence conversion on image data on even-numbered or odd-numbered horizontal scan lines of the recovered multi-view combined image, and then outputs the horizontal scan image data; the display screen having sub-pixels in Delta configuration receives the horizontal scan image data and displays the recovered multi-view combined image; and the view separation device performs view separation on the recovered multi-view combined image to provide a 3D image.

2. Related Art

FIG. 1 is a schematic view of a flat panel display screen having R, G, B sub-pixels generally in horizontal strip configuration in the prior art. The flat panel display screen 100 is formed by N×M R, G, B sub-pixels and has the characteristic of horizontal strip configuration. N indicates a total number of sub-pixels in a horizontal direction (X-axis) of the display screen, and M indicates a total number of sub-pixels in a vertical direction (Y-axis) of the display screen. j, i are indices of horizontal and vertical positions of a single sub-pixel, and the single sub-pixel has a size of $p_W \times p_H$. The horizontal strip configuration refers to that the R, G, B sub-pixels on any horizontal scan line are configured in an R, G, B sequence in the horizontal direction, so as to form a strip structure having color distribution; while in the vertical direction, the sub-pixels having the same color form a strip structure having a single color.

For the flat panel display screen having sub-pixels in Delta configuration, FIG. 2 is a schematic view of a geometrical structure generally having sub-pixels in right shifted Delta configuration. Compared with even-numbered horizontal scan lines (i.e., the value of i is an even number), the geometrical positions of all odd-numbered horizontal scan lines (i.e., the value of i is an odd number) are shifted rightwards for a half of a sub-pixel width $p_W/2$; and meanwhile, image data on all the odd-numbered horizontal scan lines is reconfigured (e.g., a configuration of B, R, G) in a unit of one group of R, G, B pixels, so that the image on any two adjacent even-numbered and odd-numbered horizontal scan lines, as shown in FIG. 4, is in Delta configuration, thus forming a display screen 110 having sub-pixels in right shifted Delta configuration.

FIG. 3 is a schematic view of a geometrical structure generally having sub-pixels in left shifted Delta configuration. Compared with the even-numbered horizontal scan lines, the geometrical positions of all the odd-numbered horizontal scan lines are shifted leftwards for a half of the sub-pixel width $p_W/2$; and meanwhile, the image data on all the odd-numbered horizontal scan lines is reconfigured (e.g., a configuration of G, B, R) in the unit of one group of R, G, B pixels, so that the image on any two adjacent even-numbered and odd-numbered horizontal scan lines, as shown in FIG. 5, is in Delta configuration, thus forming a display screen 120 having sub-pixels in left shifted Delta configuration.

Additionally, FIG. 6 is a schematic view of another display screen generally having sub-pixels in right shifted Delta configuration. The display screen 130 having sub-pixels in right shifted Delta configuration has sub-pixels in a G, B, R sequence configuration on the even-numbered horizontal scan lines, and has sub-pixels in an R, G, B sequence configuration on the odd-numbered horizontal scan lines. Hereinafter, the screens as shown in FIG. 4 and FIG. 6 are generally referred to as the display screens having sub-pixels in right shifted Delta configuration. For differentiation and convenience of illustration in the following context, the screen in FIG. 4 is also referred to as a display screen having sub-pixels in right shifted even Delta configuration; and the screen in FIG. 6 is referred to as a display screen having sub-pixels in right shifted odd Delta configuration.

FIG. 7 is a schematic view of another display screen generally having sub-pixels in left shifted Delta configuration. The display screen 140 having sub-pixels in left shifted Delta configuration has sub-pixels in a B, R, G sequence configuration on the even-numbered horizontal scan lines, and has sub-pixels in an R, G, B sequence configuration on the odd-numbered horizontal scan lines. Hereinafter, the screens as shown in FIG. 5 and FIG. 7 are generally referred to as the display screens having sub-pixels in left shifted Delta configuration. For differentiation and convenience of illustration in the following context, the screen in FIG. 5 is also referred to as a display screen having sub-pixels in left shifted even Delta configuration; and the screen in FIG. 7 is referred to as a display screen having sub-pixels in left shifted odd Delta configuration.

For the display 110 screen having sub-pixels in right shifted even Delta configuration in FIG. 4, ROC Patent Application No. 099127429 proposes a 2-view 3D image combination formula, in which a 2-view slantwise step parallax barrier is used to perform view separation on a 2-view 3D combined image produced according to the formula so as to display a 3D image. The formula and the design of the 2-view slantwise step parallax barrier are respectively illustrated as follows.

Firstly, two single-view images $V_0$, $V_1$ having a parallax effect are expressed by the following formulas:

$$V_0 = \sum_{i=0}^{M-1} \sum_{j=0}^{N-1} V_0^{i,j} \quad (1)$$

$$V_1 = \sum_{i=0}^{M-1} \sum_{j=0}^{N-1} V_1^{i,j} \quad (2)$$

where $V_0^{i,j}$, $V_1^{i,j}$ are sub-pixel image data at a position (i,j) in the single-view images $V_0$, $V_1$. $V_0$, $V_1$ are respectively a left image and a right image, or vice versa. The 2-view 3D combined image $\Sigma_2$ is expressed by the following formula:

$$\Sigma_2 = \sum_{i=0}^{M-1} \sum_{j=0}^{N-1} V_\Lambda^{i,j} \quad (3)$$

where M, N, i, j, $V_\Lambda^{i,j}$ are defined as described above. $\Lambda$ is an index of the single-view image, and is determined by the following formula:

$$\Lambda = \text{Mod}\left[\text{int}\left(\frac{j - \text{int}\left(\frac{i}{2}\right)}{m}\right), 2\right] \quad (4)$$

where m is a number of sub-pixels for forming a transverse display unit of the smallest view image and a value thereof is an integer $m \geq 1$, and $mp_W$ is a horizontal width of a transverse display unit of the smallest view image (for simplicity of drawings, m=3 is taken as an example for illustration). int(x) is an integer function, when $x \geq 0$ and $a \leq x \leq a+b$ where a is a positive integer including 0 and b is a positive real number $0 \leq b < 1$, int(x)=a; and when x<0 and $-a \leq x < -a+b$, int(x)=-a. Mod(x,2) is a x÷2 residue function, when $x \geq 0$ and x=2a+c, Mod(x,2)=c where c is a positive real number of $0 \leq c < 2$; and when x<0 and x=-2a+c, Mod(x,2)=c. It is obtained through the calculation based on Formula (4) that the value of $\Lambda$ is 0 or 1, and a 2-view 3D combined image $\Sigma_2$ as shown in FIG. 8 is achieved.

The view separation device for processing the 2-view 3D combined image $\Sigma_2$ in FIG. 8 is a 2-view right slantwise step parallax barrier. FIG. 9 is a schematic view of structure of a 2-view right slantwise step parallax barrier. The 2-view right slantwise step parallax barrier 200 is mainly formed by a plurality of light-transmissive elements 201 having a step structure and shielding elements 202. In the structure, the light-transmissive elements 201 and the shielding elements 202 firstly form a basic barrier structure unit 203; then, a plurality of the basic barrier structure units 203 forms a barrier horizontal line structure unit 204 along a horizontal direction in a repetitive configuration manner; thereafter, a plurality of the barrier horizontal line structure units 204 forms the 2-view slantwise step parallax barrier 200 along a vertical direction in a repetitive configuration manner; and any two adjacent upper and lower barrier horizontal line structures in the vertical direction of all the barrier horizontal line structure units 204 are arranged in the horizontal direction in a manner that the lower horizontal line structure is shifted rightwards by a displacement of $p_W/2$ relative to the upper horizontal line structure. Additionally, the light-transmissive element 201 and the shielding element 202 respectively have a horizontal width $B_{DW}$, $\overline{B}_{DW}$ and a vertical height $B_{DH}$, which are expressed by the following formulas:

$$B_{DW} = \frac{P_{DW}L_E}{P_{DW} + L_E} \quad (5)$$

$$\overline{B}_{DW} = B_{DW} \quad (6)$$

$$B_{DH} = \frac{B_{DW}}{P_{DW}} p_H \quad (7)$$

where $L_E$ is an interpupillary distance (IPD); and $P_{DW}$ is a horizontal width of a transverse display unit of the smallest view image and is set to satisfy the following relation:

$$P_{DW} = mp_W \quad (8)$$

where m is a number of sub-pixels for forming a transverse display unit of the smallest view image and a value thereof is an integer $m \geq 1$, and $mp_W$ is a horizontal width of a transverse display unit of the smallest view image. Additionally, the patent also proposes a method of properly reducing a horizontal width $B_{DW}$ and a vertical width $B_{DH}$ of an opening of the light-transmissive element 201 of the parallax barrier 200, so as to increase the horizontal and vertical viewable ranges.

Moreover, referring to ROC Patent Application No. 099128602, the view separation device for processing the 2-view 3D combined image $\Sigma_2$ in FIG. 8 is also a 2-view right slantwise strip parallax barrier. FIG. 10 is a schematic view of structure of a 2-view right slantwise strip parallax barrier. The 2-view right slantwise strip parallax barrier 300 is mainly formed by a plurality of light-transmissive elements 301 having a slantwise strip structure and a plurality of shielding elements 302 having a slantwise strip structure, and the light-transmissive elements 301 and the shielding elements 302 are alternately configured along the horizontal direction. The light-transmissive element 301 and the shielding element 302 respectively have a horizontal width $B_{SS}$, $\overline{B}_{SS}$ and a slant angle $\theta$, which are expressed by the following formulas:

$$B_{SS} = \frac{P_{SS}L_E}{P_{SS} + L_E} \quad (9)$$

$$\overline{B}_{SS} = (n-1)B_{SS} \quad (10)$$

$$\theta = \tan^{-1}\left(\frac{p_W}{2p_H}\right) \quad (11)$$

where n is a total number of views, and when n=2, it is applicable to a 2-view design. Therefore, the above Formula (10) is a general formula, and is applicable to a multi-view design having the number of views greater than 2; $L_E$ is an IPD; for the slant angle $\theta$, when $\theta > 0$, the structure of the strip parallax barrier has a right slant characteristic from top to bottom; and $P_{SS}$ is a horizontal width of a transverse display unit of the smallest view image and is set to satisfy the following relation:

$$P_{SS} = mp_W \quad (12)$$

where m is a number of sub-pixels for forming a transverse display unit of the smallest view image and a value thereof is an integer $m \geq 1$, and $mp_W$ is a horizontal width of a transverse display unit of the smallest view image. Additionally, the Patent No. 099128602 also proposes a method of properly reducing a horizontal width of the light-transmissive element 301 of the parallax barrier 300 for a proper amount $\Delta \overline{B}_{SS}$ which is preferably set as $\Delta \overline{B}_{SS} \geq p_W/2$, so as to reduce the ghost image and increase the horizontal viewable range.

In view of the above, the two patents No. 099127429 and No. 099128602 propose a 2-view 3D image combination formula for the display screen having sub-pixels in right shifted Delta configuration 110, in which parallax barriers like a right slantwise step parallax barrier and a right slantwise strip parallax barrier are used for displaying a 3D image. However, for the display screens having sub-pixels in left shifted Delta configuration 120 and 140 as shown in FIG. 5 and FIG. 7, no practical solution is proposed for displaying a 3D image. Additionally, the 2-view 3D image combination formula does not cover the multi-view application, and also lacks for providing different image combination methods and conversion relations between a memory image and a display image; and the right slantwise step parallax barrier also lacks the design of the multi-view application. Therefore, for the conventional display screens having sub-pixels in Delta configuration, the calculation formulas and the view separation devices mentioned in the two patents No. 099127429 and No.

099128602 only apply to a limited application scope, and thus no generalized 3D image display device is provided.

SUMMARY OF THE INVENTION

In view of the above defects, for the display screens having sub-pixels in right shifted and left shifted Delta configurations, the present invention provides different multi-view image combination procedures and memory image and display image conversion procedures, in which different view separation devices such as a parallax barrier, a slant lenticular sheet, or a slantwise step micro lenticular lens array are used for displaying a 3D image.

As described above, the display screens having sub-pixels in right shifted and left shifted Delta configurations in FIG. 4 to FIG. 7 mainly have the characteristic that the geometrical positions of the even-numbered and odd-numbered horizontal scan lines have the relation of a relative displacement with a half sub-pixel width. Regarding the characteristic of the relative displacement of the geometrical positions, for the structure having the same displacement direction, the present invention provides two multi-view 3D image combination methods, namely, a right slant multi-view 3D image combination method and a left slant multi-view 3D image combination method, for generating a multi-view 3D combined image. Further, a proper view separation device is provided in consideration of the characteristic of each multi-view 3D combined image, such as a slantwise step parallax barrier, a slantwise strip parallax barrier, a slant lenticular sheet, or a slantwise step lens array, so as to display a 3D image.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

To display a multi-view 3D image, a plurality of single-view images $V_k$ having a parallax effect is firstly defined by the following formula:

$$V_k = \sum_{i=0}^{M-1}\sum_{j=0}^{N-1} V_k^{i,j} \tag{13}$$

where M, N, i, j are defined as described above, k is an index of view and k<n, n is a total number of views; and $V_k^{i,j}$ is sub-pixel image data at a position (i,j) in the single-view image $V_k$. Therefore, the multi-view combined image $\Sigma_n$ is expressed by the following formula:

$$\Sigma_n = \sum_{i=0}^{M-1}\sum_{j=0}^{N-1} V_\Lambda^{i,j} \tag{14}$$

Figure 1:
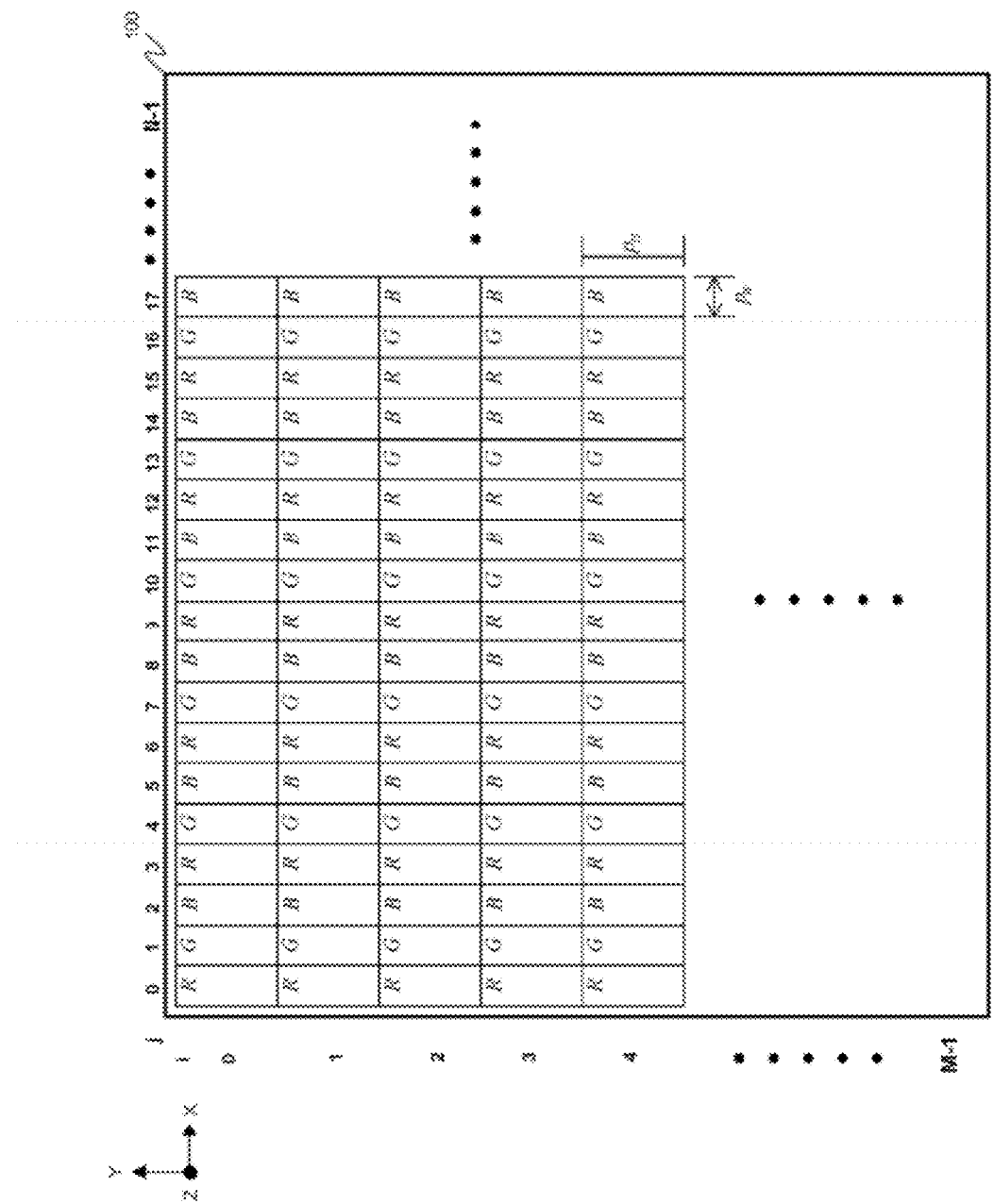
FIG. 1 is a schematic view of a flat panel display screen having R, G, B sub-pixels generally in horizontal strip configuration in the prior art.
Figure 2:
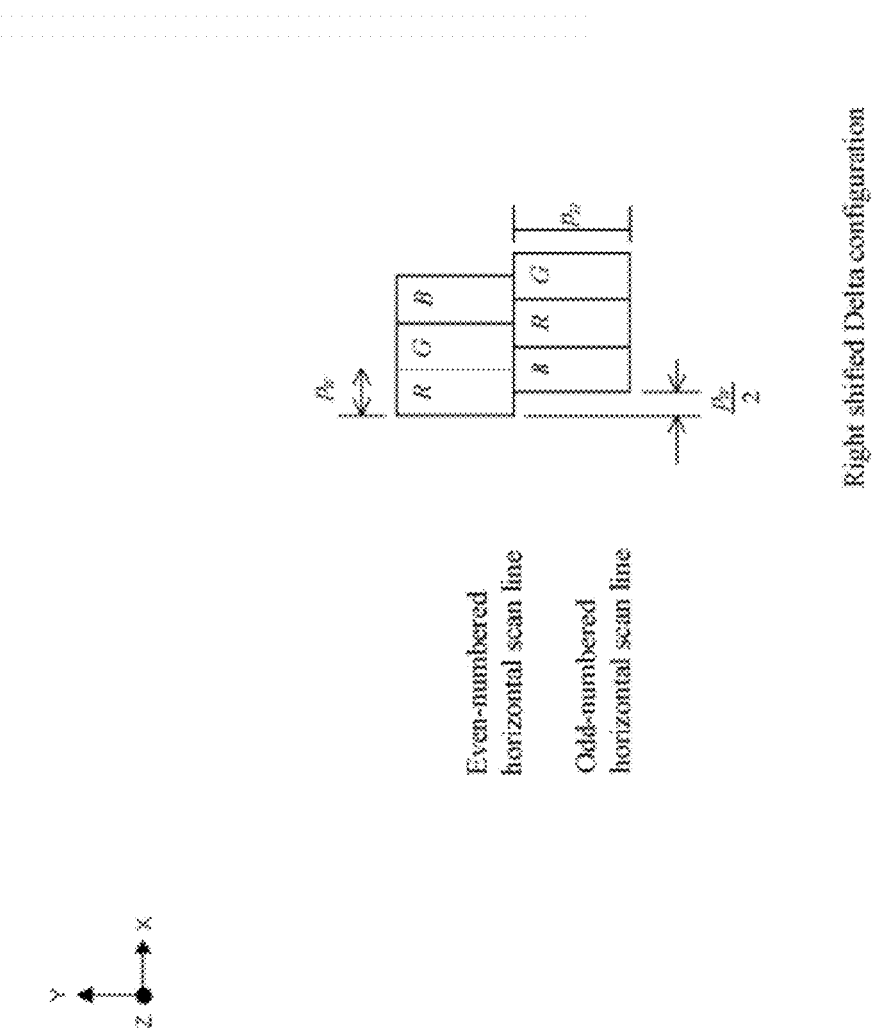
FIG. 2 is a schematic view of a geometrical structure generally having sub-pixels in right shifted Delta configuration.
Figure 3:
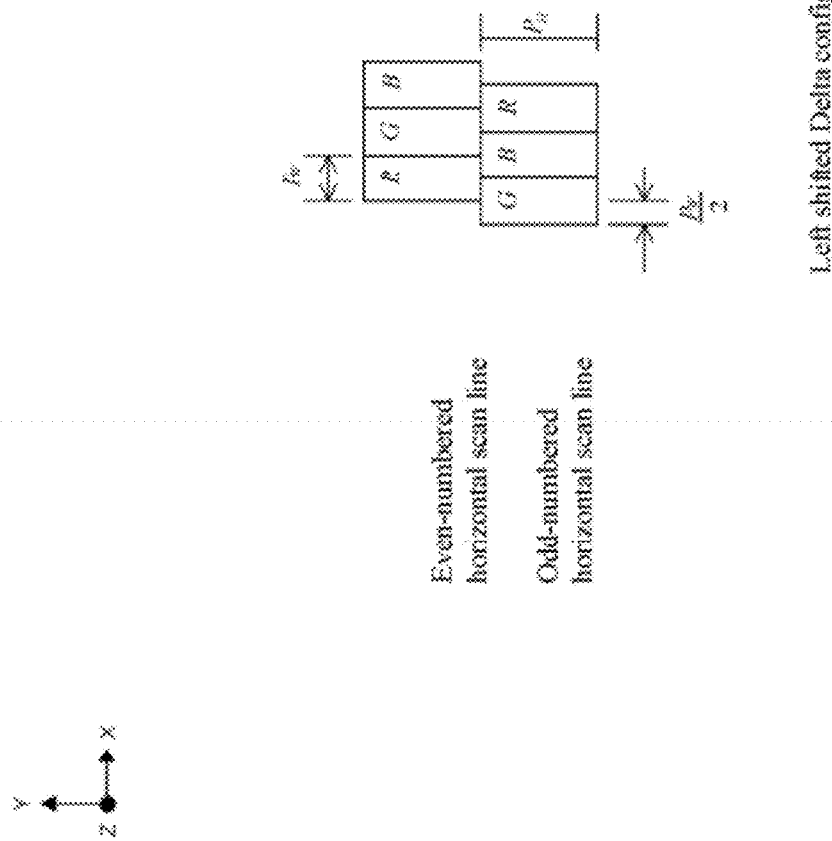
FIG. 3 is a schematic view of a geometrical structure generally having sub-pixels in left shifted Delta configuration.
Figure 4:
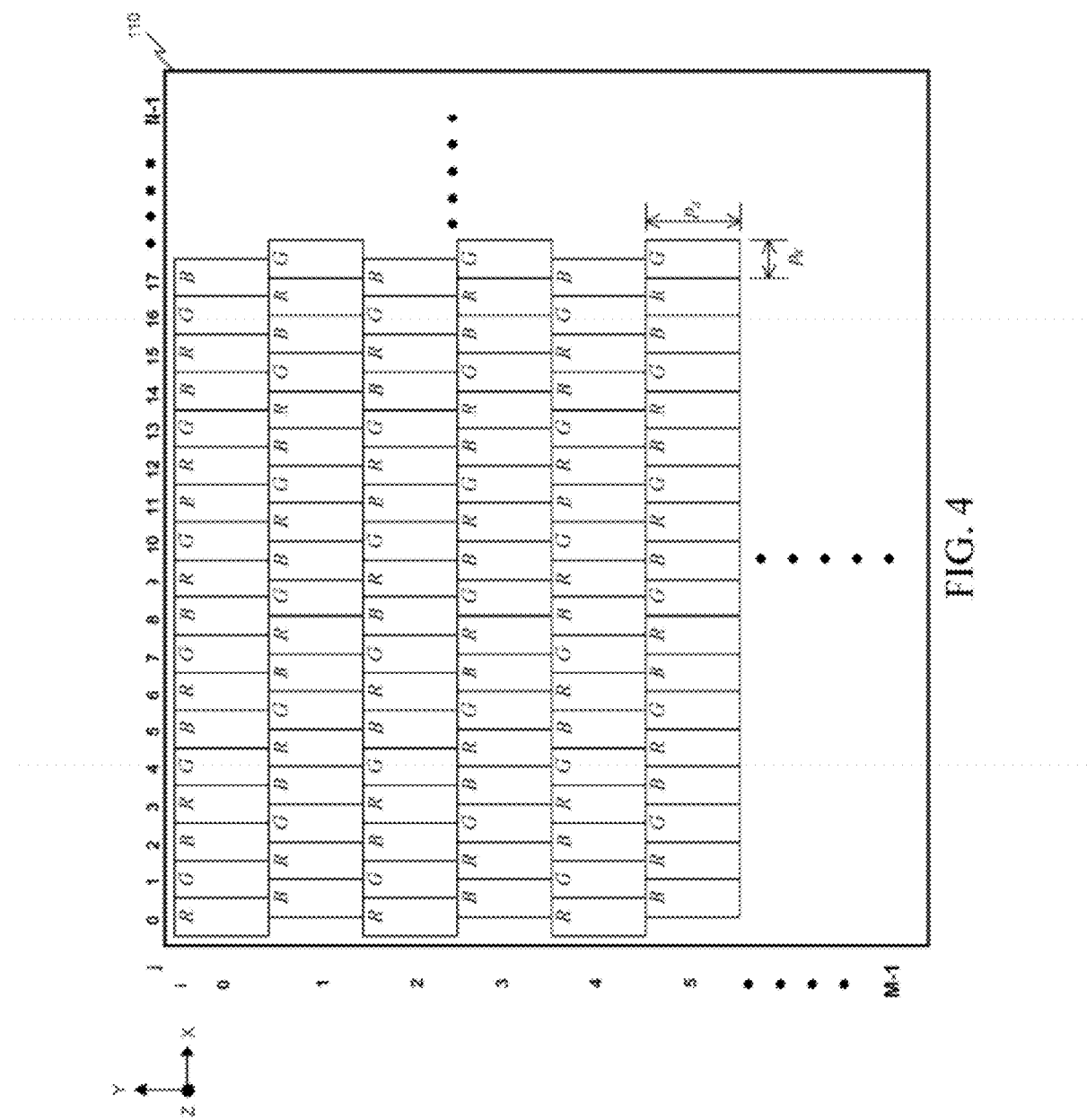
FIG. 4 is a schematic view of a display screen generally having sub-pixels in right shifted even Delta configuration.
Figure 6:
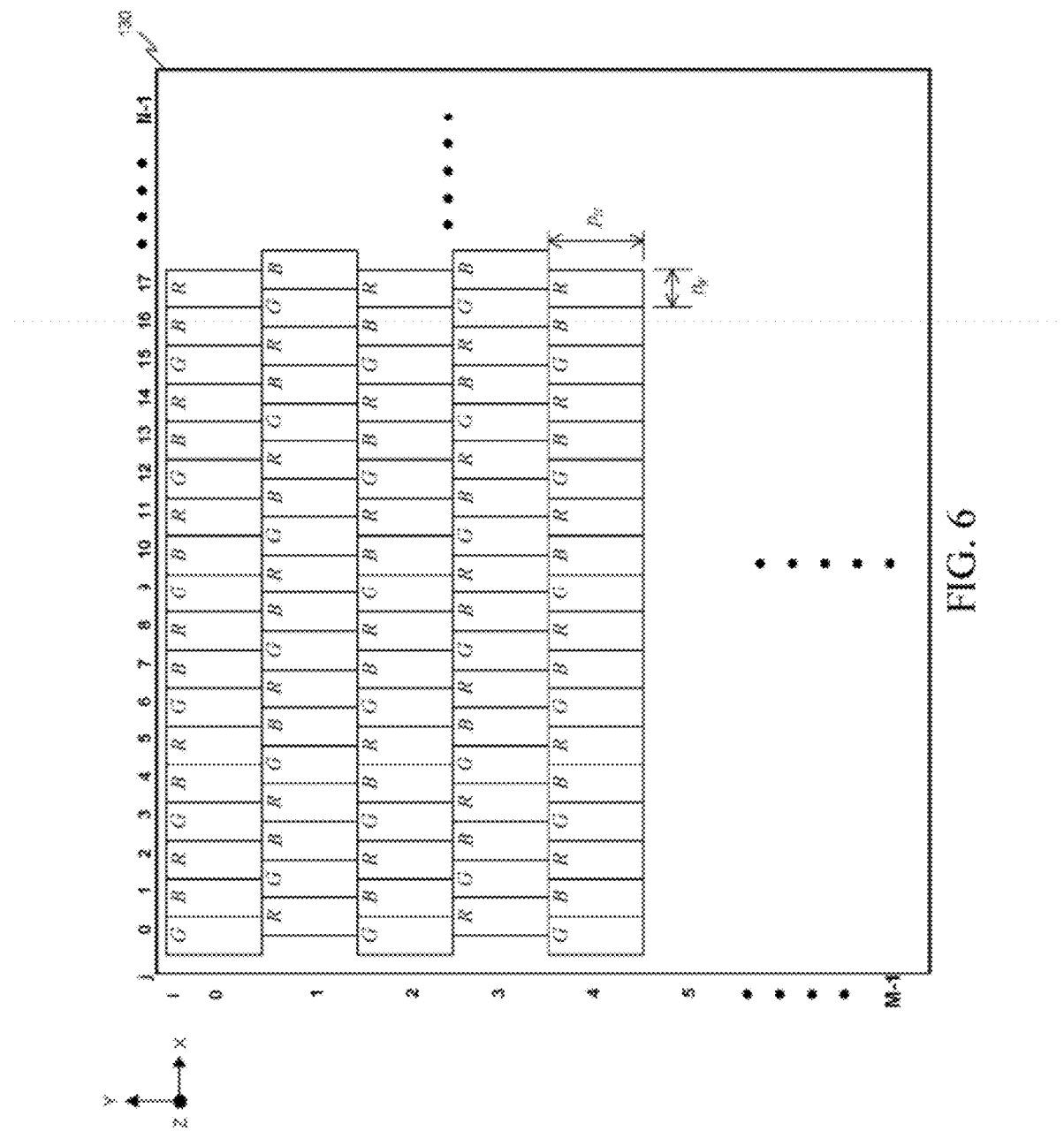
FIG. 6 is a schematic view of a display screen generally having sub-pixels in right shifted odd Delta configuration.
Figure 11:
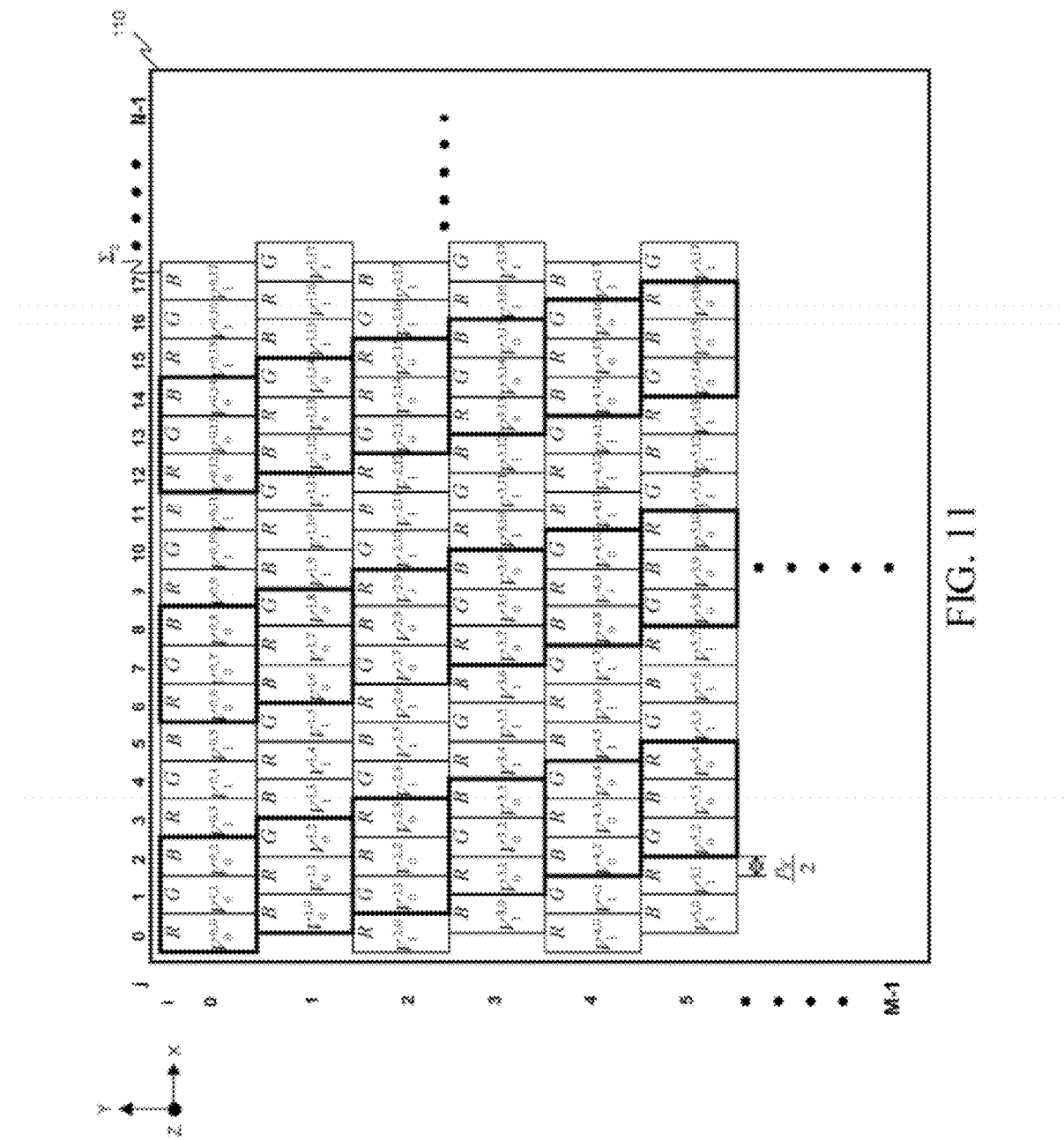
FIG. 11 is a schematic view of a right slant multi-view combined image when m=3, n=2, Q=2, Δ=0, Π=1.

The display screens 110 and 130 having sub-pixels in right shifted Delta configuration as shown in FIG. 4 and FIG. 6 may generate a right slant multi-view combined image through the following multi-view 3D image combination formula:

$$\Lambda = \text{Mod}\left[\text{int}\left(\frac{j - \Pi \times \text{int}\left(\frac{i+\Delta}{Q}\right)}{m}\right), n\right] \tag{15}$$

where M, N, i, j, m, n are defined as described above; Q is a number of sub-pixels for forming a vertical display unit of the smallest view image; Δ is a transverse displacement phase; and Π is a transverse displacement amplitude. Here, the screen of FIG. 4 is taken as an example for illustrating the right slant multi-view combined image. FIG. 11 shows the right slant multi-view combined image in which m=3, n=2, Q=2, Δ=0, Π=1. Additionally, to acquire a better spatial continuity in 3D image, it is set that m=2, n=2, Q=2, Δ=0, Π=1 (not shown).

Figure 12:
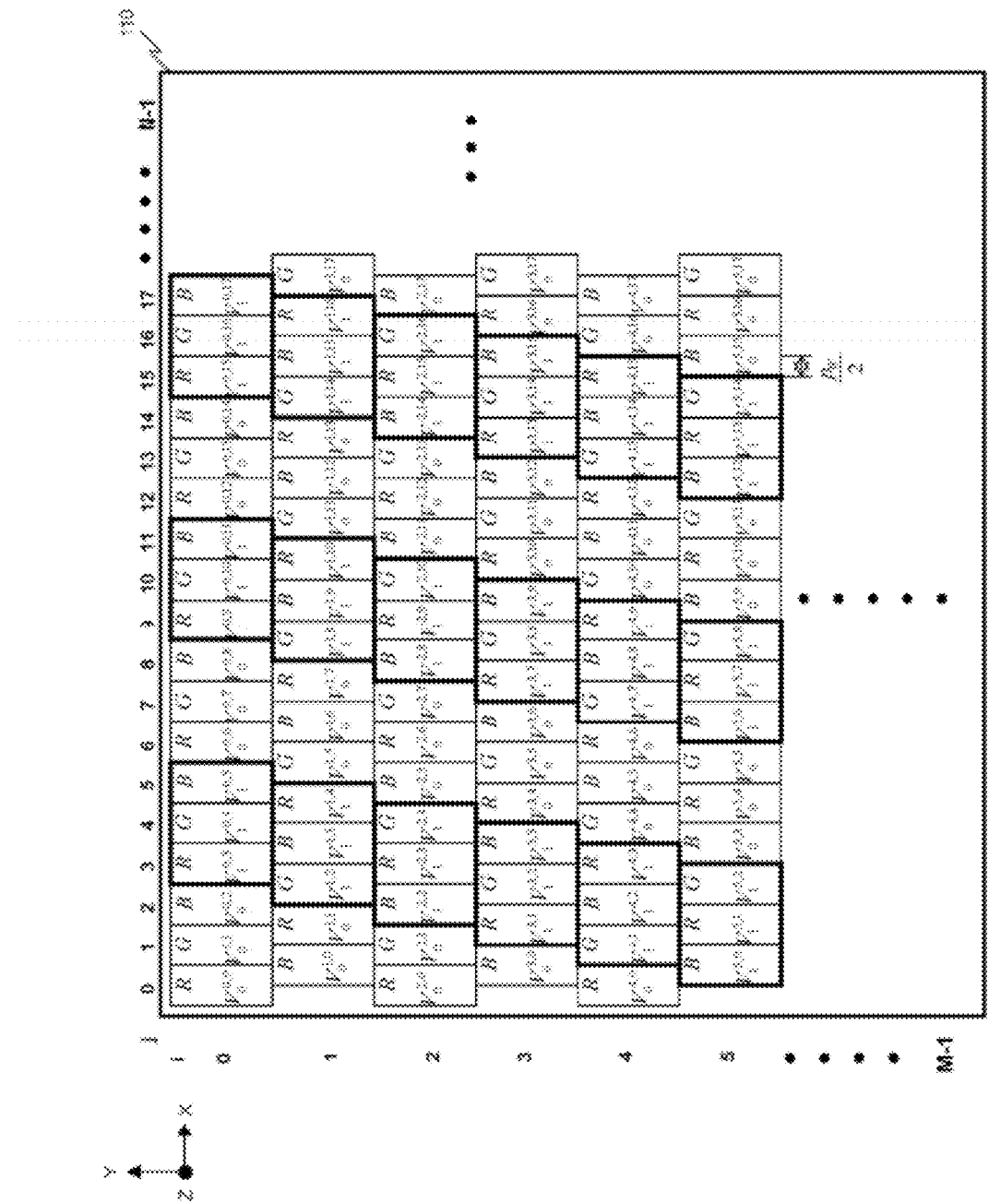
FIG. 12 is a schematic view of a left slant multi-view combined image when m=3, n=2, Q=2, Δ=1, Π=1.

In addition, the display screens 110 and 130 having sub-pixels in right shifted Delta configuration as shown in FIG. 4 and FIG. 6 may generate a left slant multi-view combined image through the following multi-view 3D image combination formula:

$$\Lambda = \mathrm{Mod}\left[\mathrm{int}\left(\frac{(N-1)-j-\Pi \times \mathrm{int}\left(\frac{i+\Delta}{Q}\right)}{m}\right), n\right] \tag{16}$$

where M, N, i, j, m, n, Q, Δ, Π are defined as described above. Here, the screen of FIG. 4 is taken as an example for illustrating the left slant multi-view combined image. FIG. 12 shows the left slant multi-view combined image in which m=3, n=2, Q=2, Δ=1, Π=1. Additionally, to acquire a better spatial continuity in 3D image, it is set that m=2, n=2, Q=2, Δ=1, Π=1 (not shown).

Figure 5:
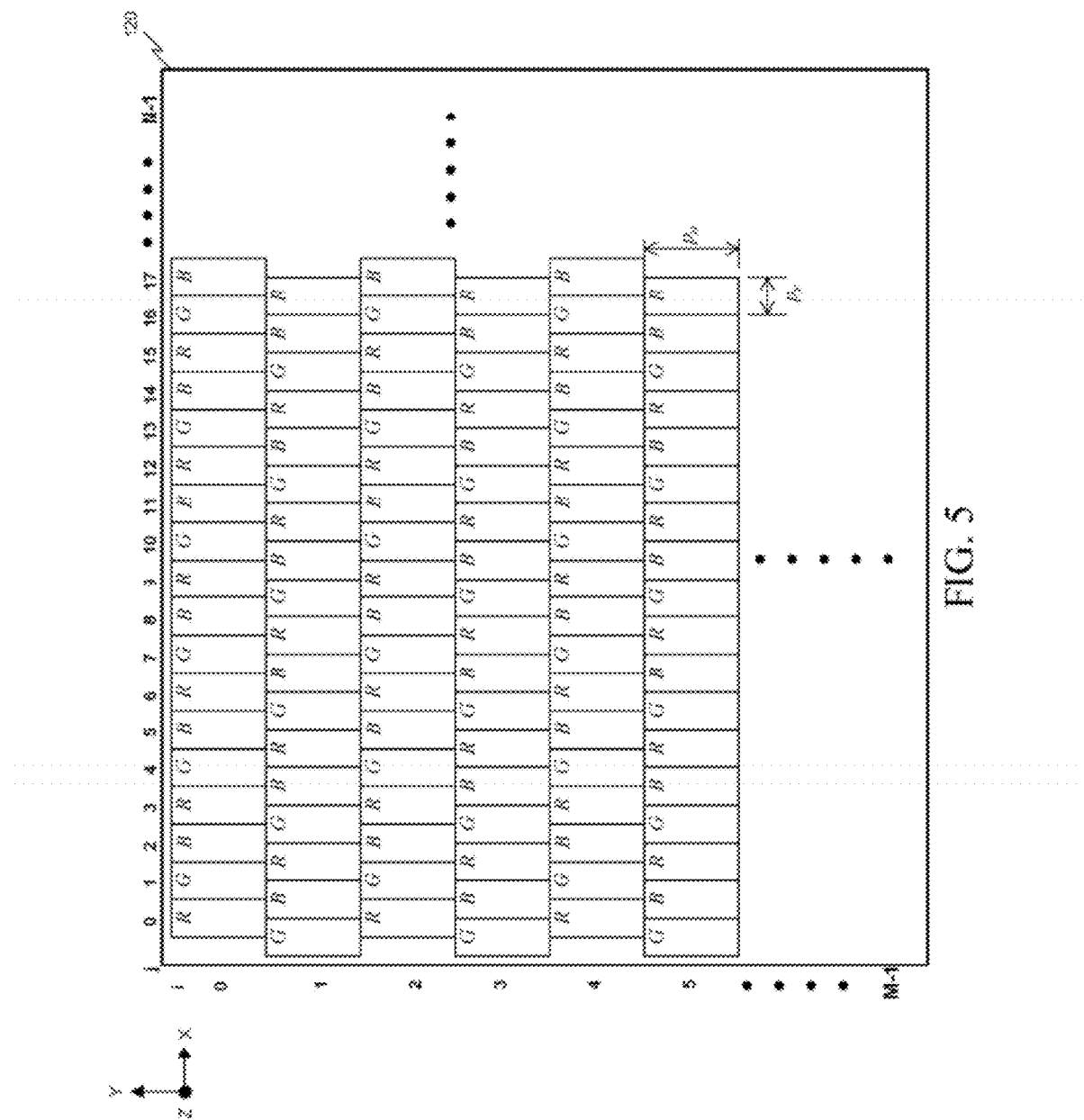
FIG. 5 is a schematic view of a display screen generally having sub-pixels in left shifted even Delta configuration.
Figure 7:
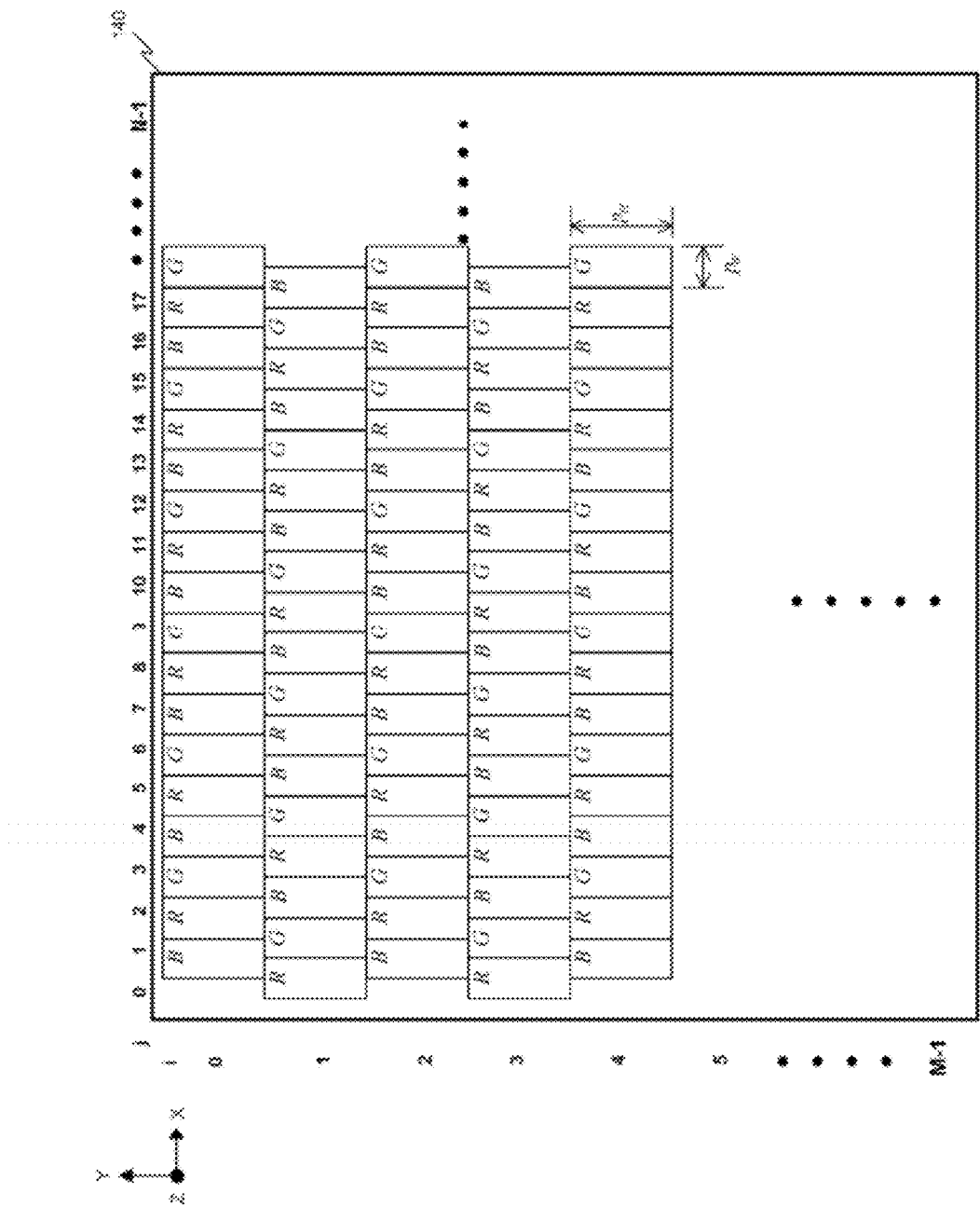
FIG. 7 is a schematic view of a display screen generally having sub-pixels in left shifted odd Delta configuration.
Figure 8:
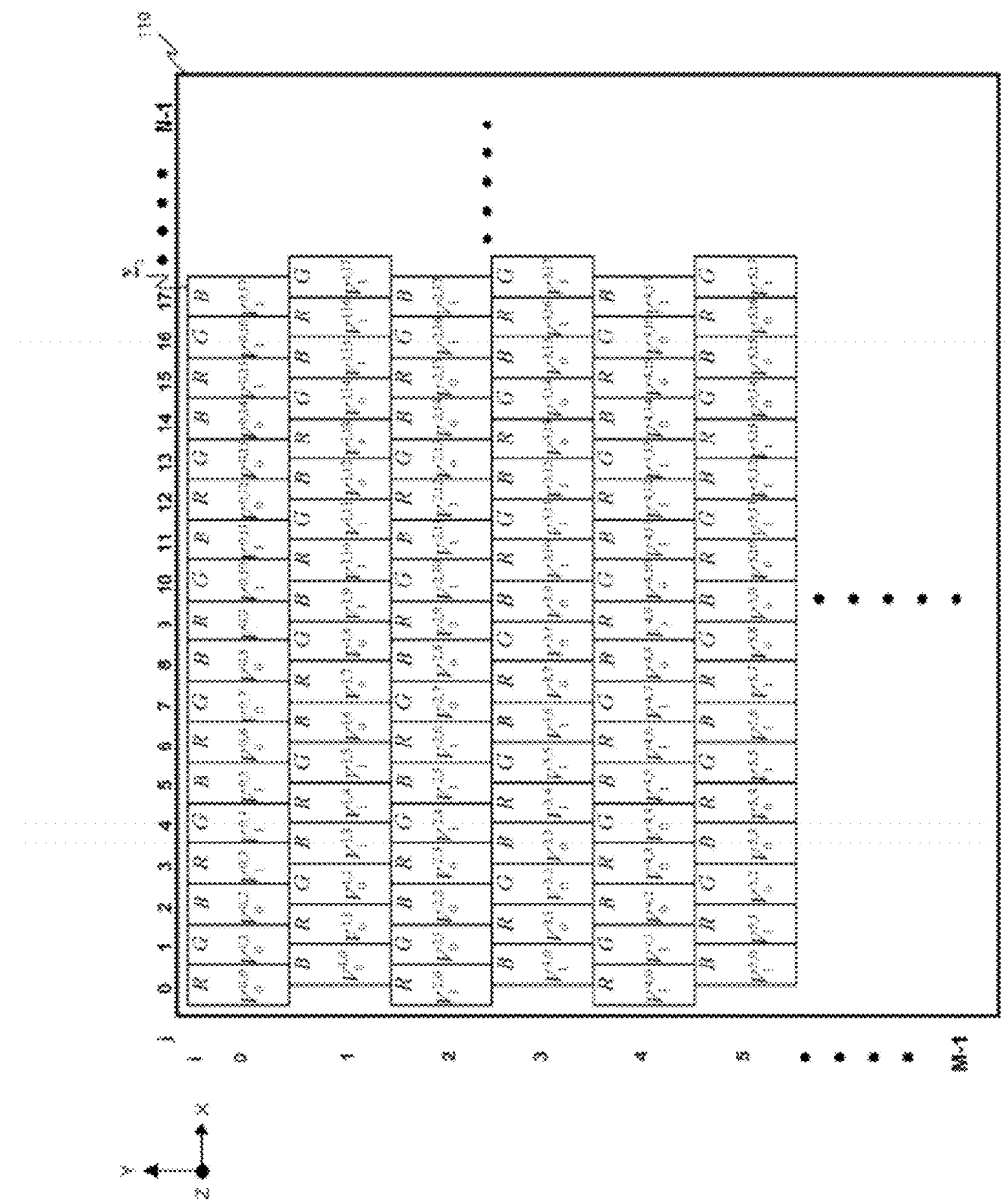
FIG. 8 is a schematic view of a 2-view 3D combined image.
Figure 13:
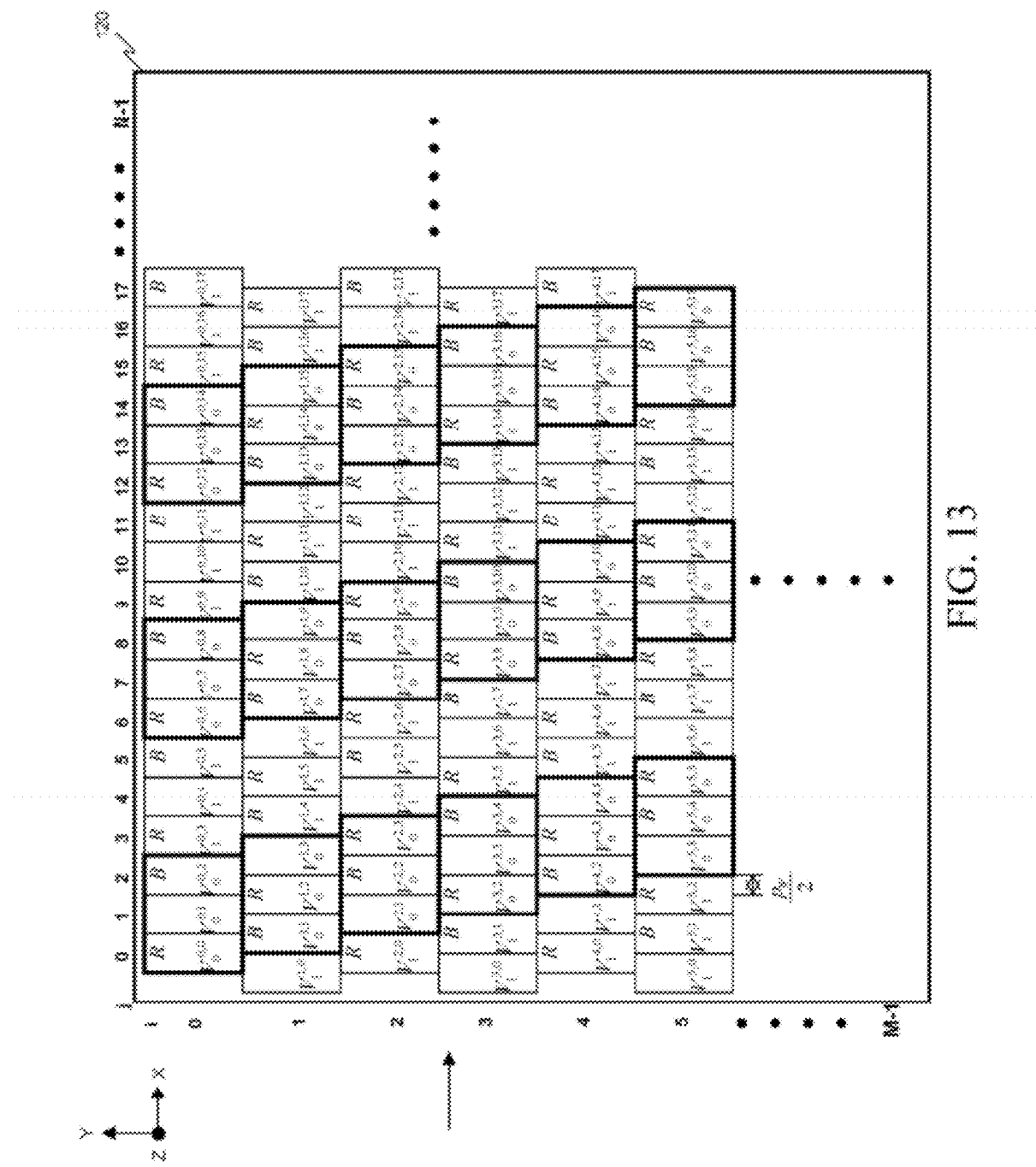
FIG. 13 is a schematic view of a right slant multi-view combined image when m=3, n=2, Q=2, Δ=1, Π=1.

The display screens 120 and 140 having sub-pixels in left shifted Delta configuration as shown in FIG. 5 and FIG. 7 may generate a right slant multi-view combined image through the following multi-view 3D image combination formula:

$$\Lambda = \mathrm{Mod}\left[\mathrm{int}\left(\frac{j-\Pi \times \mathrm{int}\left(\frac{i+\Delta}{Q}\right)}{m}\right), n\right] \tag{17}$$

where M, N, i, j, m, n, Q, Δ, Π are defined as described above. Here, the screen of FIG. 5 is taken as an example for illustrating the right slant multi-view combined image. FIG. 13 shows the right slant multi-view combined image in which m=3, n=2, Q=2, Δ=1, Π=1. Additionally, to acquire a better spatial continuity in 3D image, it is set that m=2, n=2, Q=2, Δ=1, Π=1 (not shown).

Figure 14:
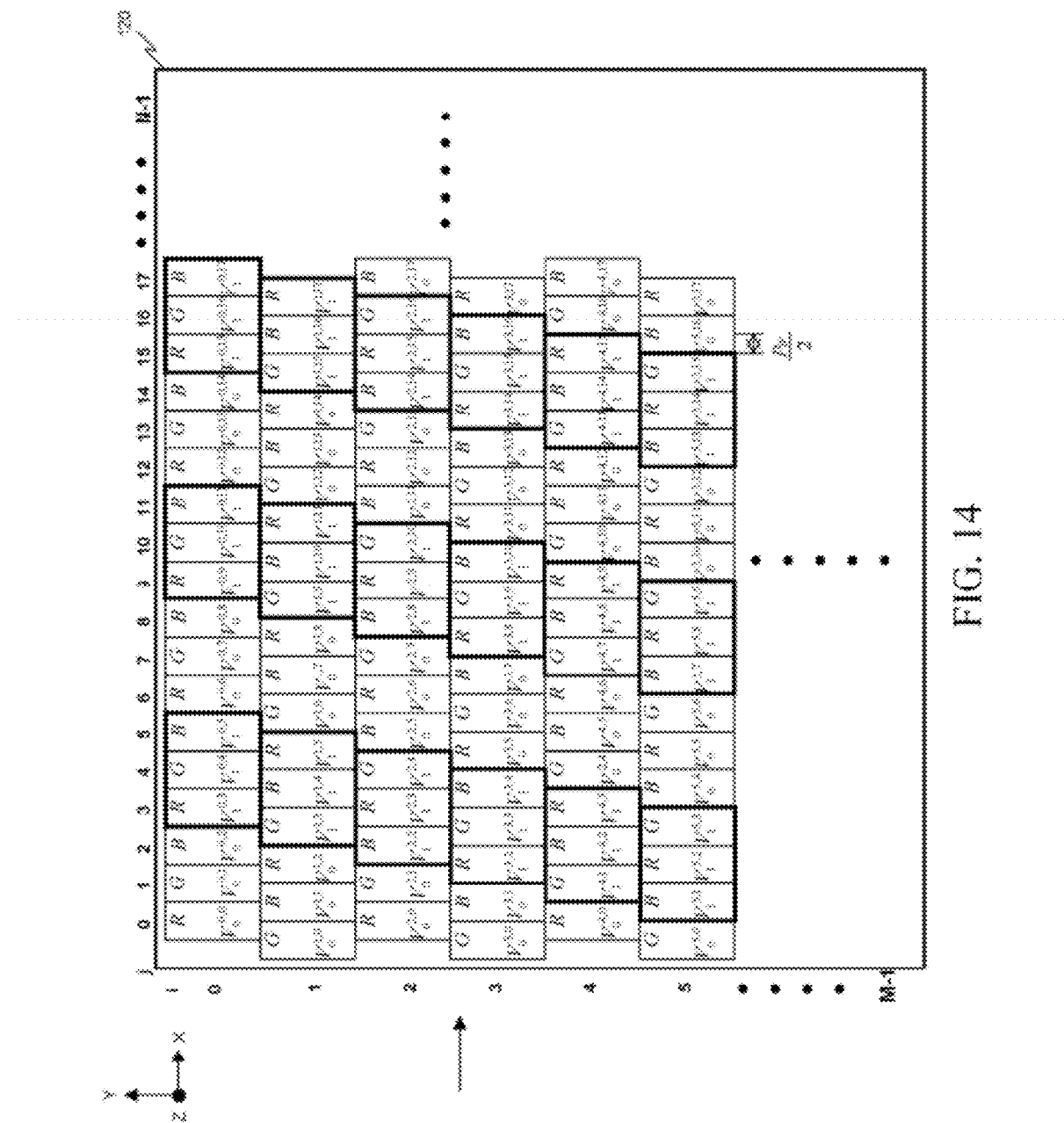
FIG. 14 is a schematic view of a left slant multi-view combined image when m=3, n=2, Q=2, Δ=0, Π=1.

In addition, the display screens 120 and 140 having sub-pixels in left shifted Delta configuration as shown in FIG. 5 and FIG. 7 may generate a left slant multi-view combined image through the following multi-view 3D image combination formula:

$$\Lambda = \mathrm{Mod}\left[\mathrm{int}\left(\frac{(N-1)-j-\Pi \times \mathrm{int}\left(\frac{i+\Delta}{Q}\right)}{m}\right), n\right] \tag{18}$$

where M, N, i, j, m, n, Q, Δ, Π are defined as described above. Here, the screen of FIG. 5 is taken as an example for illustrating the left slant multi-view combined image. FIG. 14 shows the left slant multi-view combined image in which m=3, n=2, Q=2, Δ=0, Π=1. Additionally, to acquire a better spatial continuity in 3D image, it is set that m=2, n=2, Q=2, Δ=0, Π=1 (not shown).

Hereinafter, every possible view separation device is illustrated. Firstly, regarding the characteristic of the slant direction of the multi-view 3D combined image, a slantwise step parallax barrier is provided to display a 3D image.

Figure 9:
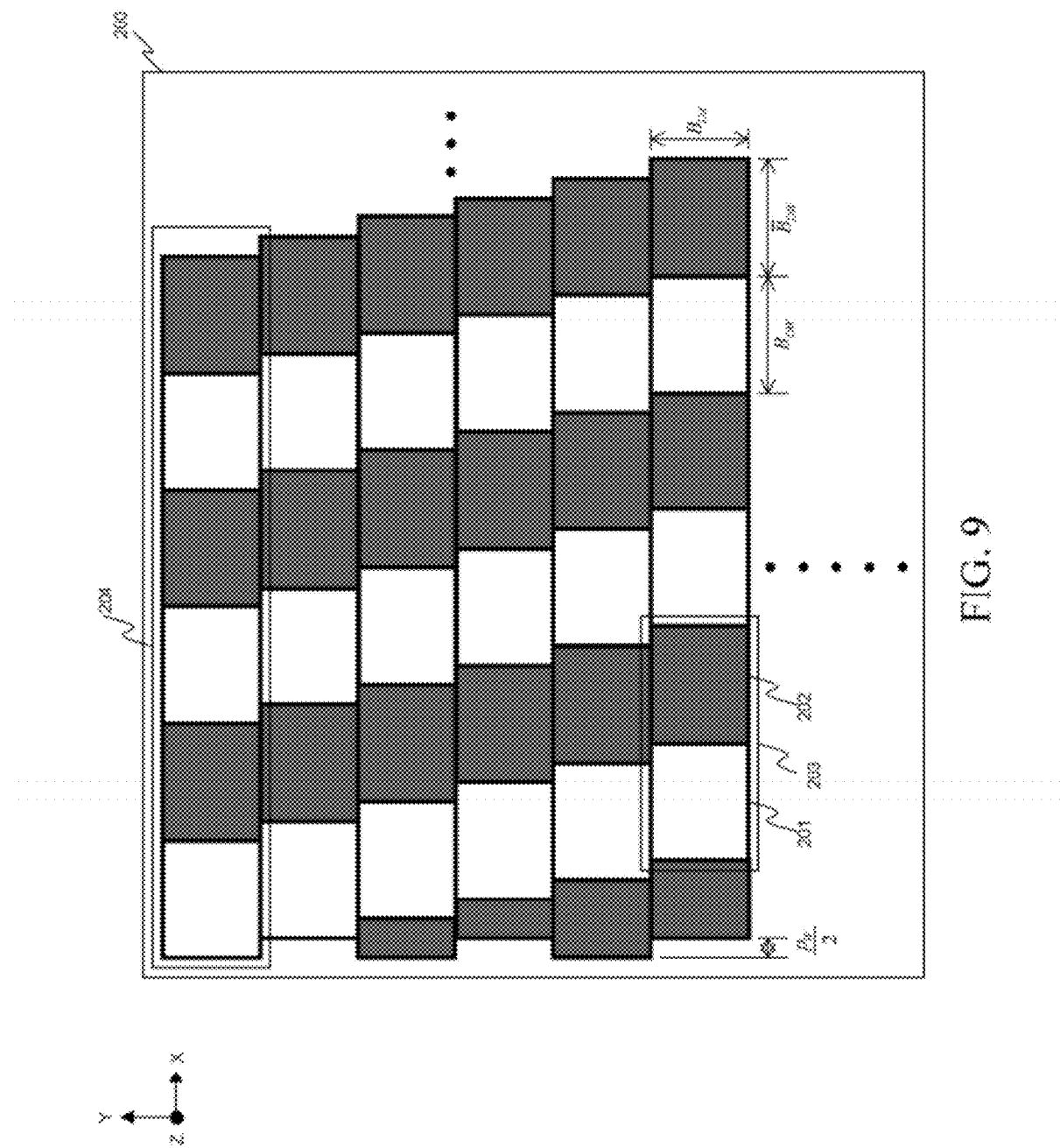
FIG. 9 is a schematic view of structure of a 2-view right slantwise step parallax barrier.
Figure 15:
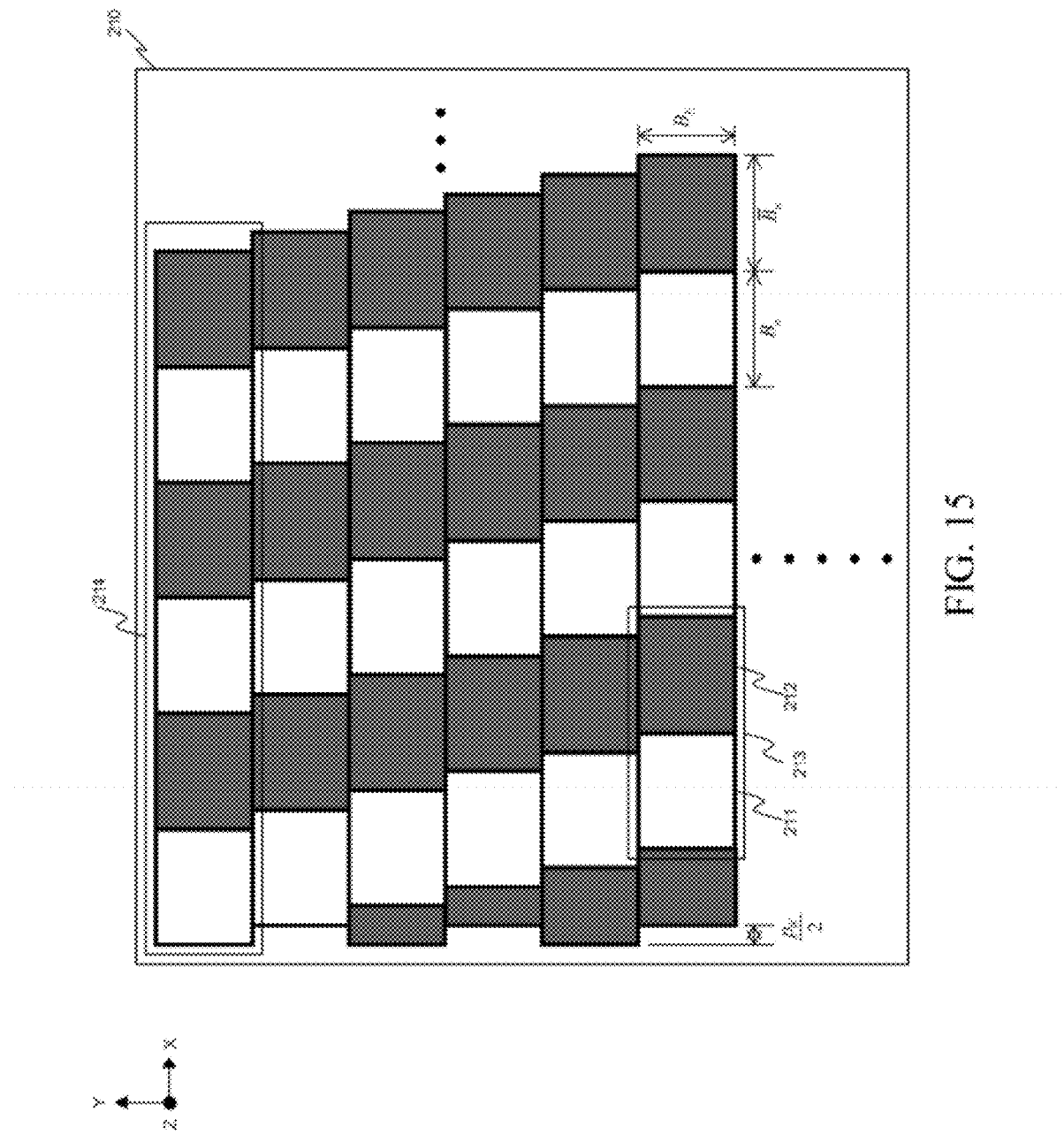
FIG. 15 and FIG. 16 are schematic views of structure of a multi-view right slantwise step parallax barrier.
Figure 16:
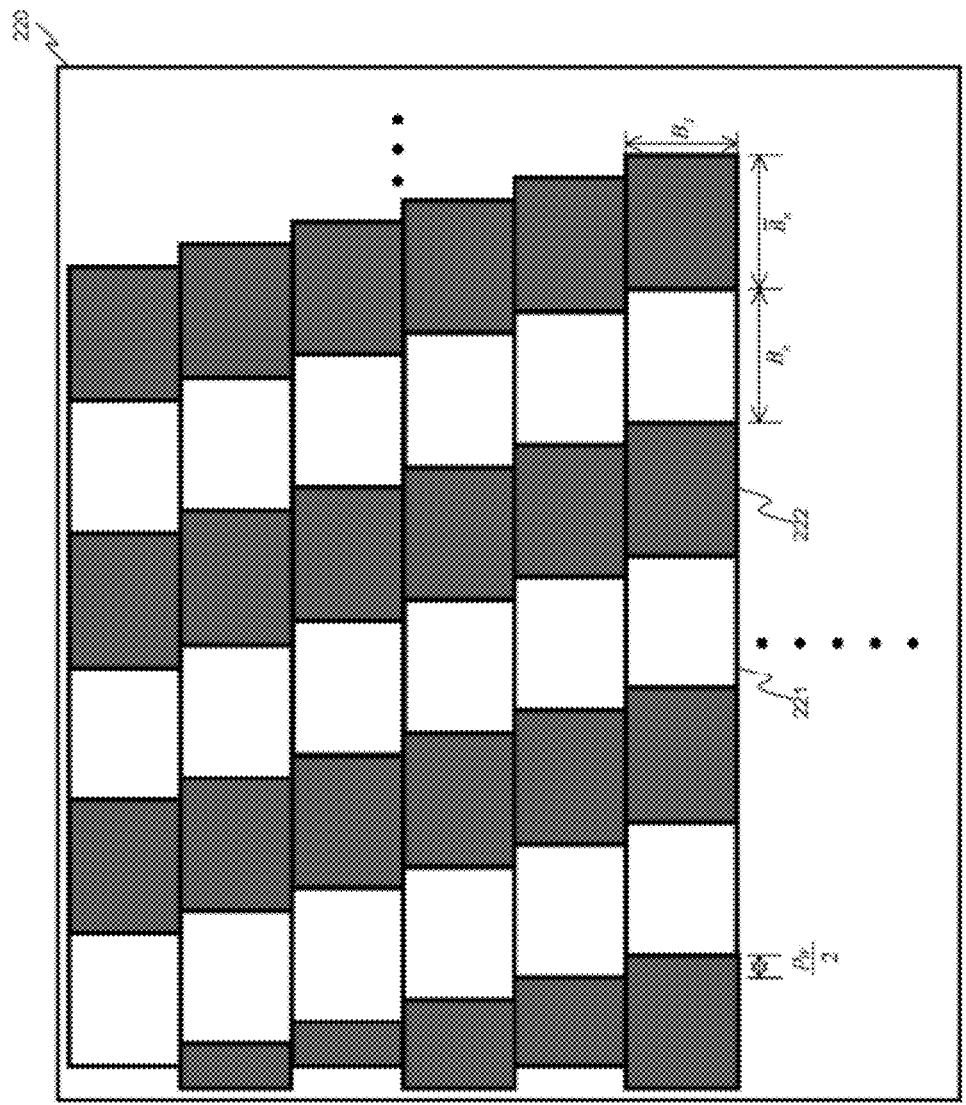

For the right slant multi-view combined images as shown in FIG. 11 and FIG. 13, a multi-view right slantwise step parallax barrier is designed to display a 3D image. FIG. 15 and FIG. 16 are schematic views of structure of the multi-view right slantwise step parallax barrier. The two parallax barriers 210 and 220 are respectively view separation devices for processing the right slant multi-view combined images in FIG. 11 and FIG. 13. The structures of the two parallax barriers 210 and 220 have the same characteristic and structure as shown in FIG. 9. The difference between the two parallax barriers 210 and 220 only lies in a first barrier horizontal line structure unit 214. That is to say, the parallax barrier 210 has one more barrier horizontal line structure unit 214 than the parallax barrier 220.

In addition, the light-transmissive elements 211, 221 and the shielding elements 212, 222 respectively have a horizontal width $B_n$, $\overline{B}_n$, and a vertical height $B_H$, which are expressed by the following formulas:

$$B_n = \frac{P_{DW} L_E}{P_{DW} + L_E} \tag{19}$$

$$\overline{B}_n = (n-1)B_n \tag{20}$$

$$B_H = \frac{B_n}{P_{DW}} p_H \tag{21}$$

where n, $L_E$, $P_{DW}$ are defined as described above, and $P_{DW}$ is set to satisfy the following relation:

$$P_{DW} = mp_W \tag{22}$$

where m is a number of sub-pixels for forming a transverse display unit of the smallest view image and a value thereof is an integer m≧1, and $mp_W$ is a horizontal width of a transverse display unit of the smallest view image.

Figure 17:
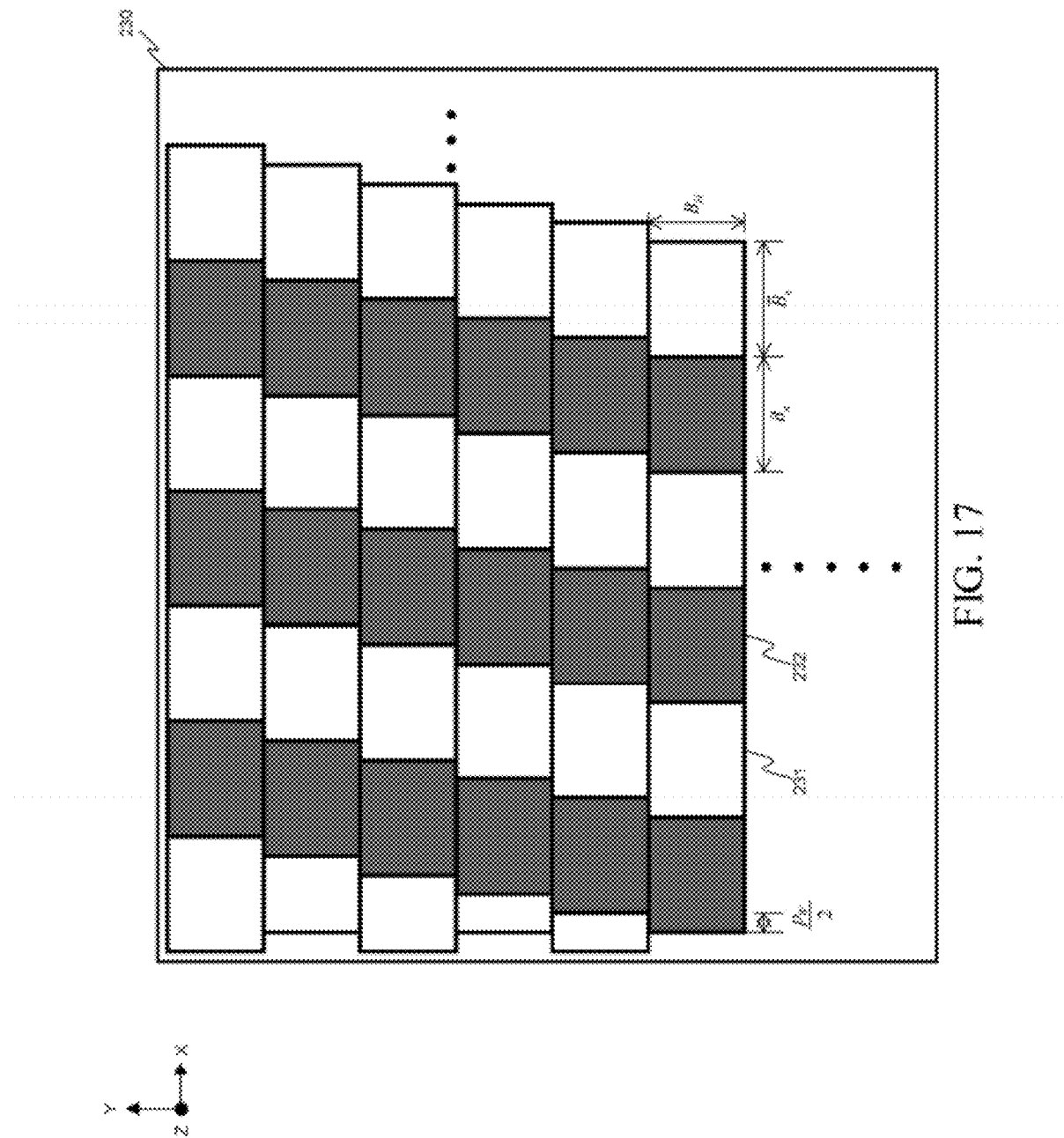
FIG. 17 and FIG. 18 are schematic views of structure of a multi-view left slantwise step parallax barrier.
Figure 18:
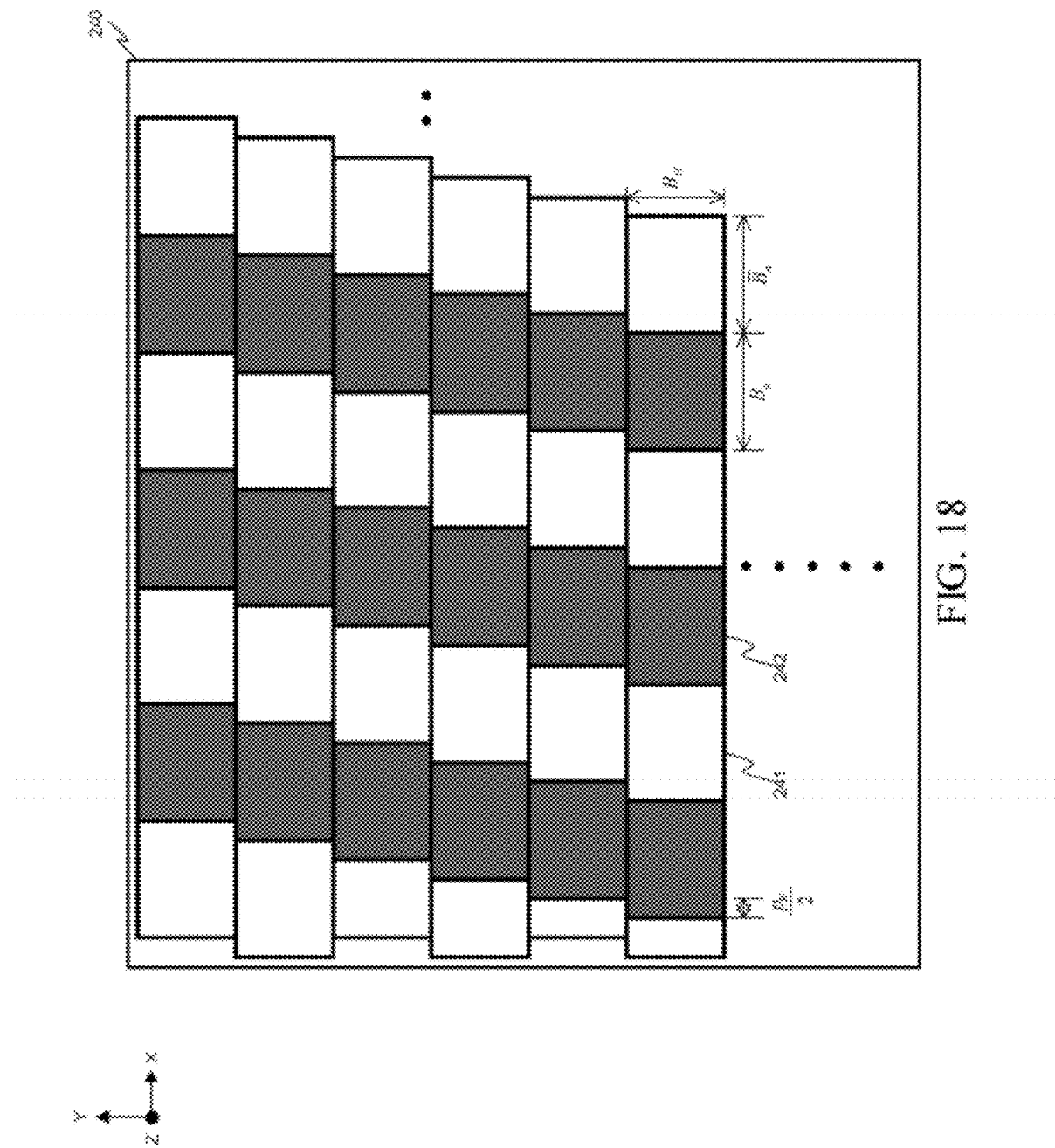

In addition, for the left slant multi-view combined images as shown in FIG. 12 and FIG. 14, a multi-view left slantwise step parallax barrier is designed to display a 3D image. FIG. 17 and FIG. 18 are schematic views of structure of the multi-view left slantwise step parallax barrier. The two parallax barriers 230 and 240 are respectively view separation devices for processing the left slant multi-view combined images in FIG. 12 and FIG. 14. The structures of the two parallax barriers 230 and 240 have the same characteristic and structure as shown in FIG. 9, but only have the difference lying in that the lower horizontal line structure is shifted leftwards by a displacement of $p_W/2$ relative to the upper horizontal line structure. The difference between the two parallax barriers 230 and 240 only lies in the first barrier horizontal line structure unit. That is to say, the parallax barrier 240 has one more barrier horizontal line structure unit than the parallax barrier 230. Additionally, the structure sizes $B_n$, $\overline{B}_n$, $B_H$ of the light-transmissive elements 231, 241 and the shielding elements 232, 242 may be obtained according to Formulas (19) to (22).

Hereinafter, regarding the characteristic of the slant direction of the multi-view 3D combined image, a slantwise strip parallax barrier is provided to display a 3D image.

Figure 10:
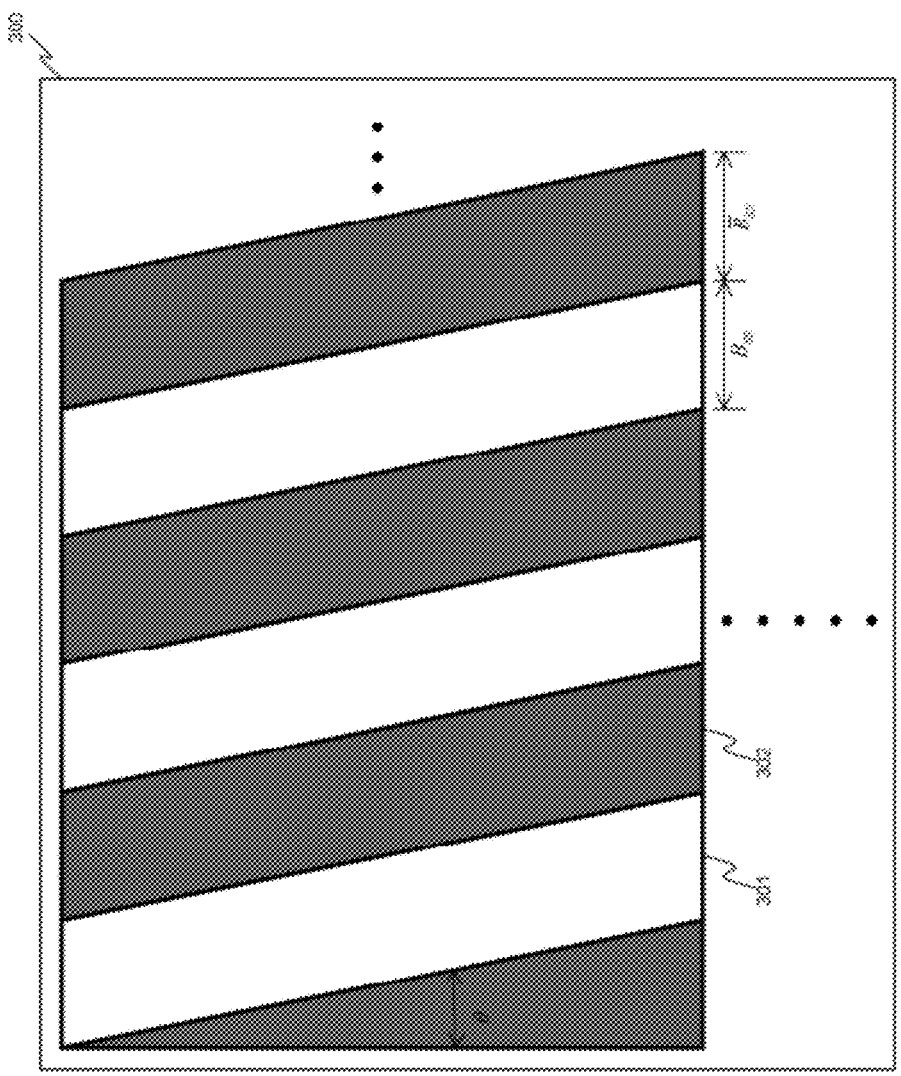
FIG. 10 is a schematic view of structure of a 2-view right slantwise strip parallax barrier.
Figure 19:
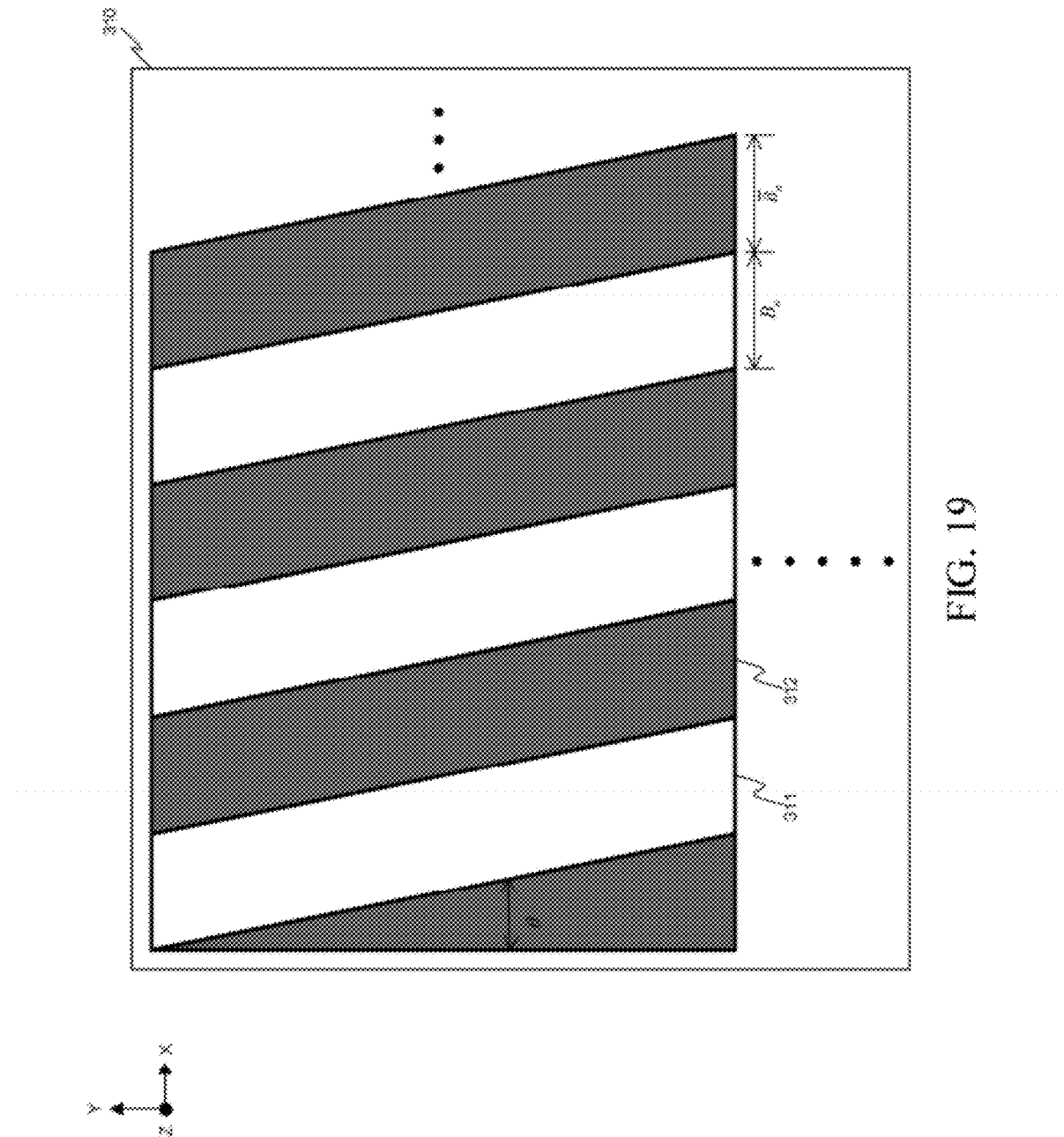
FIG. 19 is a schematic view of structure of a multi-view right slantwise strip parallax barrier.

For the right slant multi-view combined images as shown in FIG. 11 and FIG. 13, a multi-view right slantwise strip parallax barrier is designed to display a 3D image. FIG. 19 is a schematic view of structure of the multi-view right slantwise strip parallax barrier. The parallax barrier 310 is a view separation device for processing the right slant multi-view combined images in FIG. 11 and FIG. 13. The structure of the parallax barrier 310 has the same characteristic and structure as shown in FIG. 10. The structure sizes $B_n$, $\overline{B}_n$ of the light-transmissive element 311 and the shielding element 312 are designed according to Formulas (19), (20), and (22). Additionally, the slant angle θ is obtained according to Formula (11). Here, θ is set to a positive value, which indicates that the structures of the light-transmissive element 311 and the shielding element 312 have the right slant characteristic.

Figure 20:
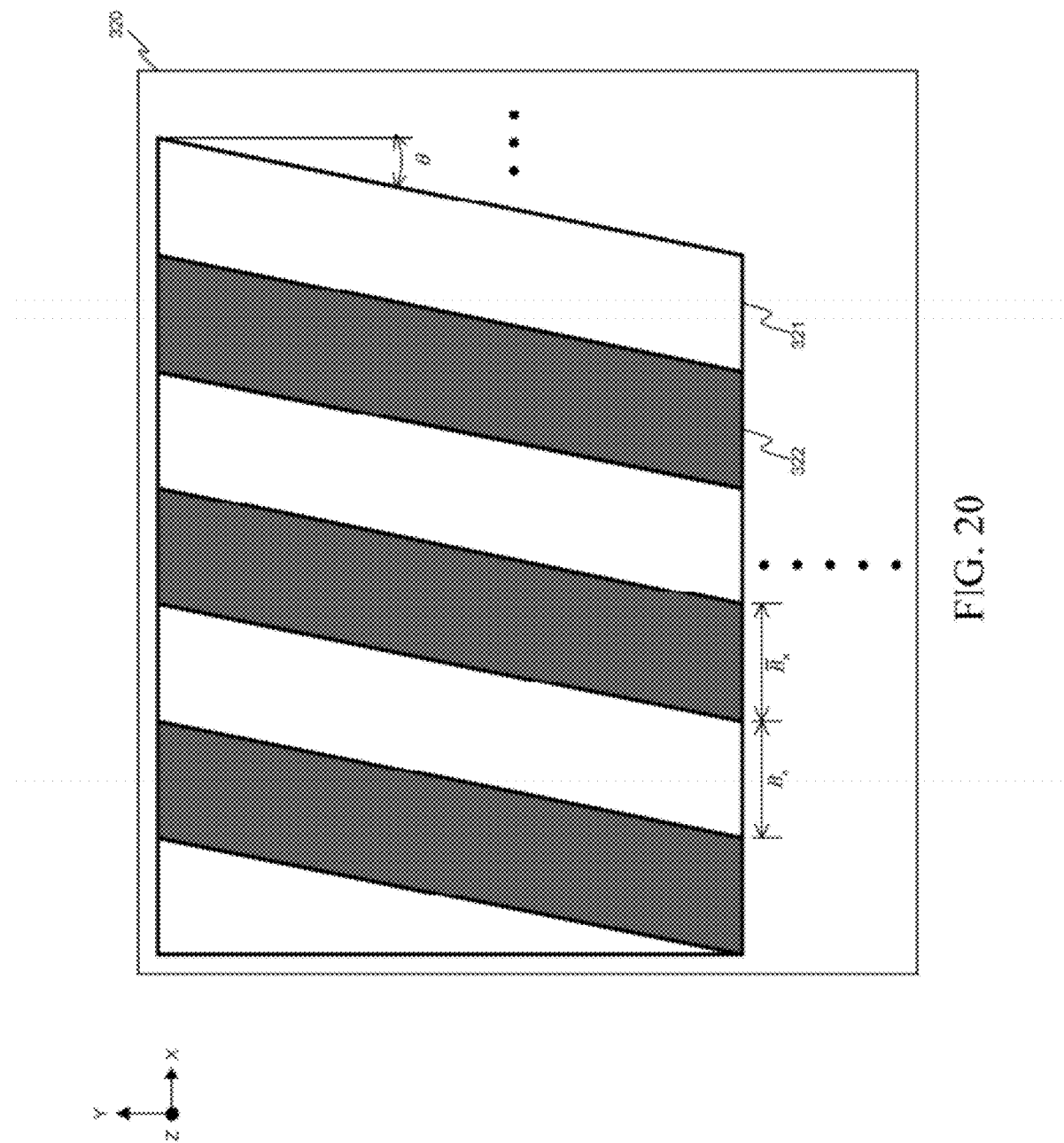
FIG. 20 is a schematic view of structure of a multi-view left slantwise strip parallax barrier.

Further, for the left slant multi-view combined images as shown in FIG. 12 and FIG. 14, a multi-view left slantwise strip parallax barrier is designed to display a 3D image. FIG. 20 is a schematic view of structure of the multi-view left slantwise strip parallax barrier. The parallax barrier 320 is a view separation device for processing the left slant multi-view combined images in FIG. 12 and FIG. 14. The structure of the parallax barrier 320 has the same characteristic and structure as shown in FIG. 10, but has different slant angles. The structure sizes $B_n$, $\overline{B}_n$ of the light-transmissive element 321 and the shielding element 322 are designed according to Formulas (19), (20), and (22). Additionally, the slant angle θ may be obtained according to the following formula:

$$\theta = -\tan^{-1}\left(\frac{p_W}{2p_H}\right) \tag{23}$$

Here, θ is set to a negative value, which indicates that the structures of the light-transmissive element 321 and the shielding element 322 have the left slant characteristic.

Hereinafter, regarding the characteristic of the slant direction of the multi-view 3D combined image, a slant lenticular sheet is provided to display a 3D image.

Figure 21:
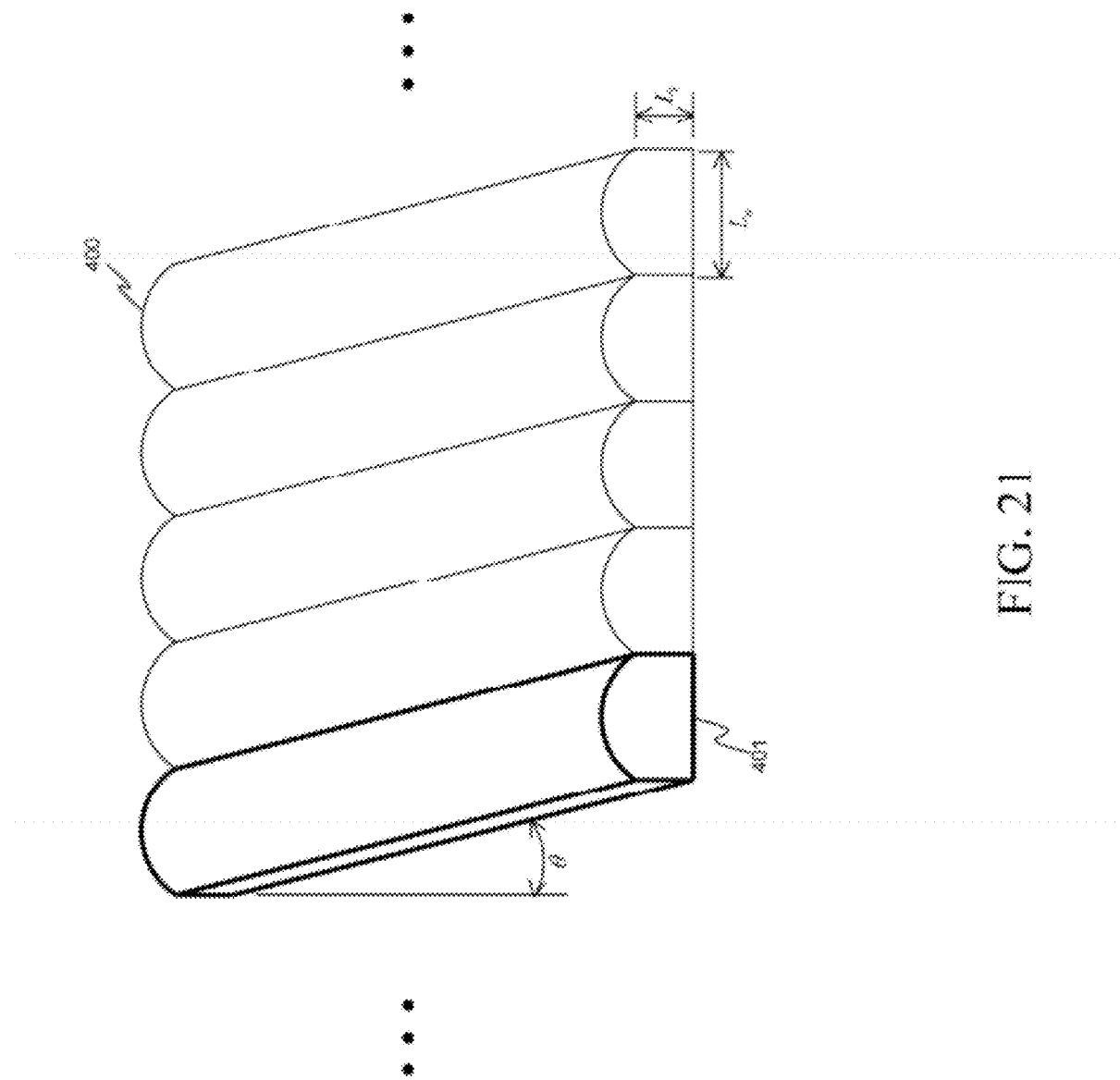
FIG. 21 is a schematic three-dimensional view of structure of a multi-view right slant lenticular sheet.

For the right slant multi-view combined images as shown in FIG. 11 and FIG. 13, a multi-view right slant lenticular sheet is designed to display a 3D image. FIG. 21 is a schematic three-dimensional view of structure of the multi-view right slant lenticular sheet. The right slant lenticular sheet 400 is a view separation device for processing the right slant multi-view combined images in FIG. 11 and FIG. 13. The structure of the right slant lenticular sheet 400 is formed by a plurality of single right slant lenticular lenses 401. The single right slant lenticular lens 401 has a lens width $L_n$, a lens thickness $L_t$, and a lens slant angle θ, which are expressed by the following formulas:

$$L_n = \frac{P_{DW}L_E}{P_{DW} + L_E}n \tag{24}$$

$$L_t \sim f \tag{25}$$

$$\theta = \tan^{-1}\left(\frac{p_W}{2p_H}\right) \tag{26}$$

where n, $L_E$, $P_{DW}$, $p_W$, $p_H$ are defined as described above, and f is a focus of the lenticular lens.

Figure 22:
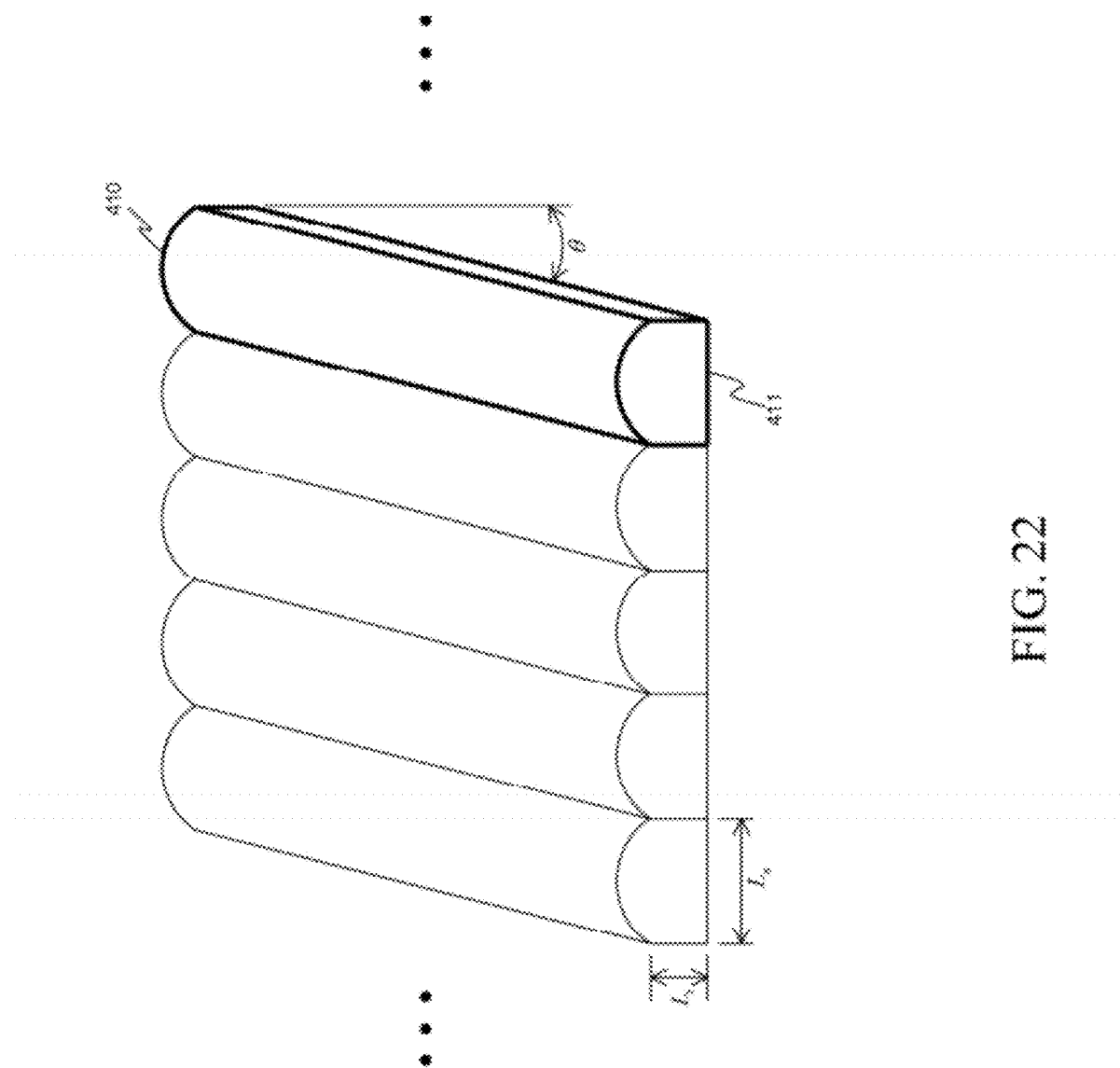
FIG. 22 is a schematic three-dimensional view of structure of a multi-view left slant lenticular sheet.

Additionally, for the left slant multi-view combined images as shown in FIG. 12 and FIG. 14, a multi-view left slant lenticular sheet is designed to display a 3D image. FIG. 22 is a schematic three-dimensional view of structure of a multi-view left slant lenticular sheet. The left slant lenticular sheet 410 is a view separation device for processing the left slant multi-view combined images in FIG. 12 and FIG. 14. The structure of the left slant lenticular sheet 410 is formed by a plurality of single left slant lenticular lenses 411. The single left slant lenticular lens 411 has a lens width $L_n$, a lens thickness $L_t$, and a lens slant angle θ. The lens width $L_n$ and the lens thickness $L_t$ are obtained according to Formulas (24) and (25). Additionally, the slant angle θ is expressed by the following formula:

$$\theta = -\tan^{-1}\left(\frac{p_W}{2p_H}\right) \tag{27}$$

Hereinafter, regarding the characteristic of the slant direction of the multi-view 3D combined image, a slantwise step micro lenticular lens array is provided to display a 3D image.

Figure 23:
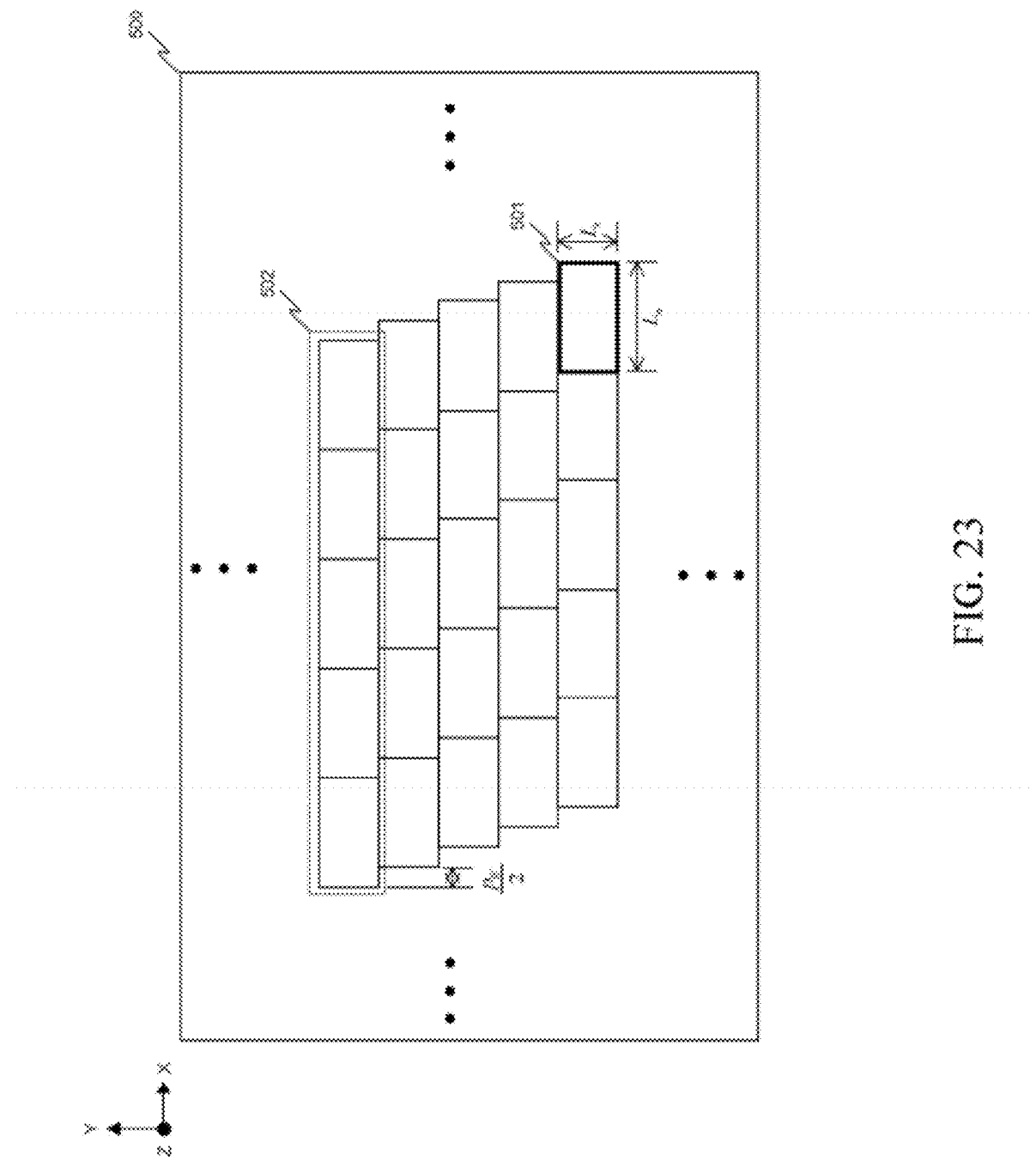
FIG. 23 is a top view of structure of a multi-view right slantwise step micro lenticular lens array.
Figure 25:
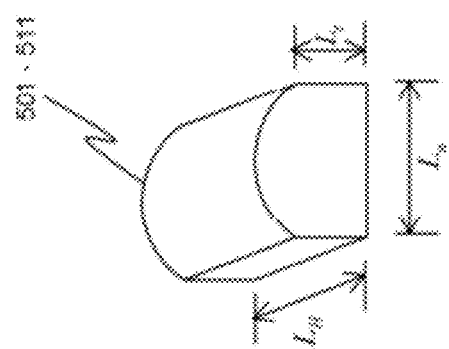
FIG. 25 is a schematic three-dimensional view of a single step micro lenticular lens.

For the right slant multi-view combined images as shown in FIG. 11 and FIG. 13, a multi-view right slantwise step micro lenticular lens array is designed to display a 3D image. FIG. 23 is a top view of structure of a multi-view right slantwise step micro lenticular lens array. The right slantwise step micro lenticular lens array 500 is a view separation device for processing the right slant multi-view combined images in FIG. 11 and FIG. 13. The structure of the right slantwise step micro lenticular lens array 500 is formed by a plurality of single step micro lenticular lenses 501. The single step micro lenticular lens 501, as shown in the schematic three-dimensional view of FIG. 25, is a micro lenticular lens having a lens width $L_n$, a lens length $L_H$, and a lens thickness $L_t$. The lens width $L_n$ and the lens thickness $L_t$ are respectively expressed by Formulas (24) and (25), and the lens length $L_H$ is expressed by the following formula:

$$L_H = \frac{L_n}{nP_{DW}}p_H \tag{28}$$

where n, $P_{DW}$, $p_H$ are defined as described above. As shown in FIG. 23, in the entire structure of the right slantwise step micro lenticular lens array 500, firstly, a plurality of single step micro lenticular lenses 501 forms a lens horizontal line structure unit 502 along the horizontal direction in a repetitive configuration manner; then, a plurality of the lens horizontal line structure units 502 forms the right slantwise step micro lenticular lens array 500 along the vertical direction in a repetitive configuration manner; and any two adjacent upper and lower lens horizontal line structure units in the vertical direction of all the lens horizontal line structure units 502 are arranged in the horizontal direction in a manner that the lower horizontal line structure is shifted rightwards by a displacement of $p_W/2$ relative to the upper horizontal line structure.

Figure 24:
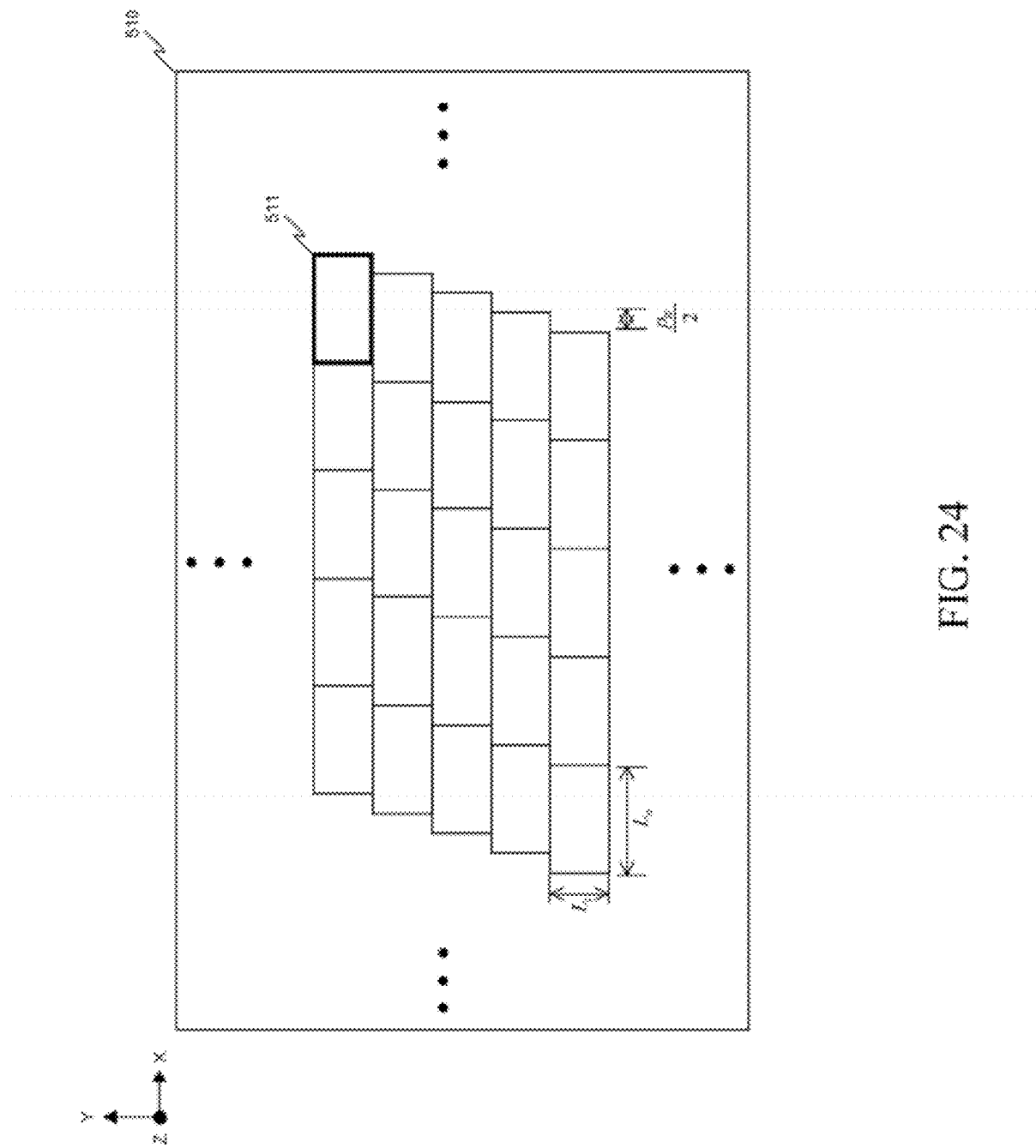
FIG. 24 is a top view of structure of a multi-view left slantwise step micro lenticular lens array.

Additionally, for the left slant multi-view combined images as shown in FIG. 12 and FIG. 14, a multi-view left slantwise step micro lenticular lens array is designed to display a 3D image. FIG. 24 is a top view of structure of a multi-view left slantwise step micro lenticular lens array. The left slantwise step micro lenticular lens array 510 is a view separation device for processing the left slant multi-view combined images in FIG. 12 and FIG. 14. The left slantwise step micro lenticular lens array 510 has the same structure as the aforementioned right slantwise step micro lenticular lens array 500. The difference only lies in that the lower horizontal line structure is shifted leftwards by a displacement of $p_W/2$ relative to the upper horizontal line structure.

Finally, for the display screens having sub-pixels in Delta configuration in FIG. 4 to FIG. 7, the conventional relation of the memory image and the image output is illustrated below.

Figure 26:
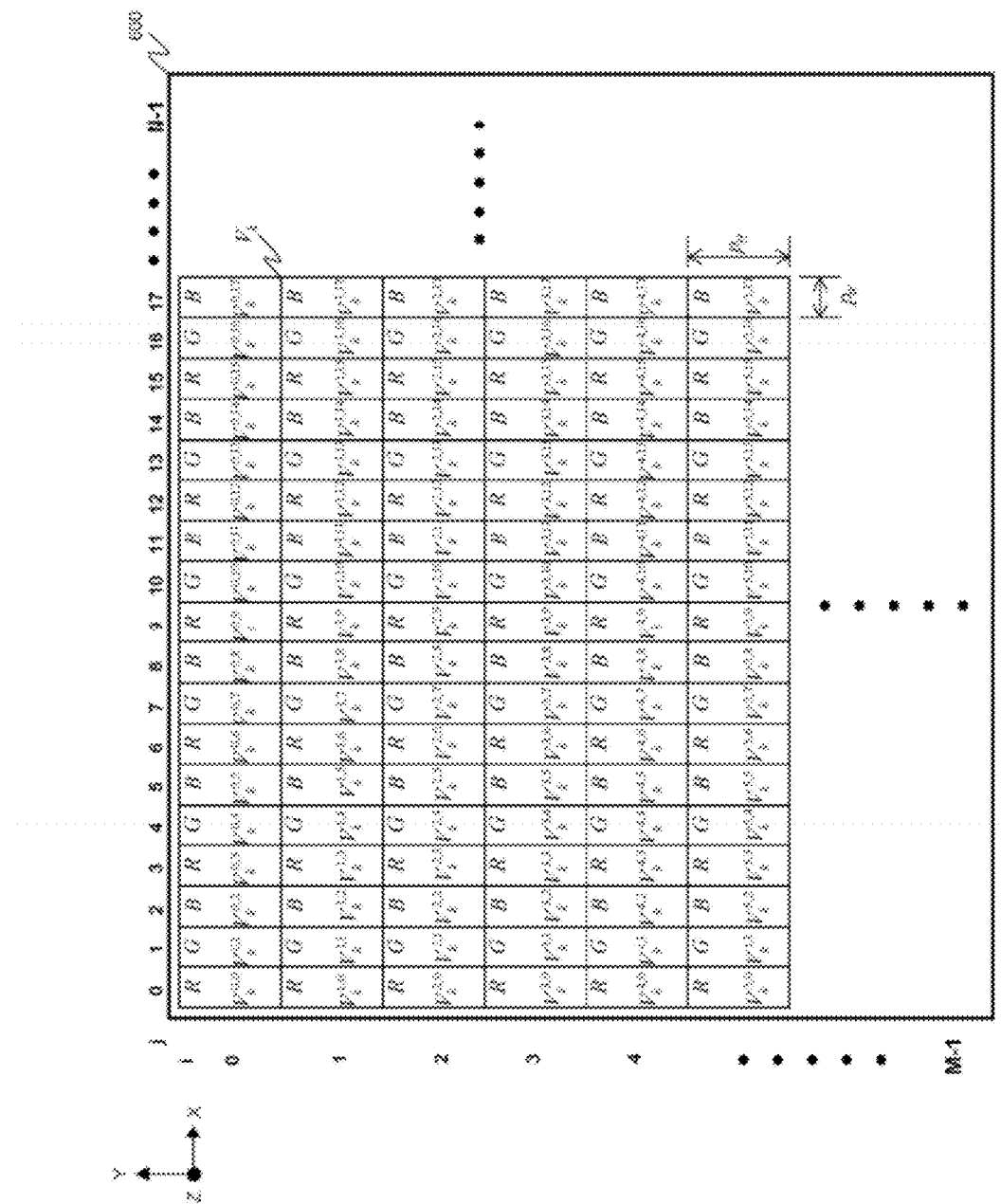
FIG. 26 is a schematic view of image data of a single-view image $V_k$.
Figure 27:
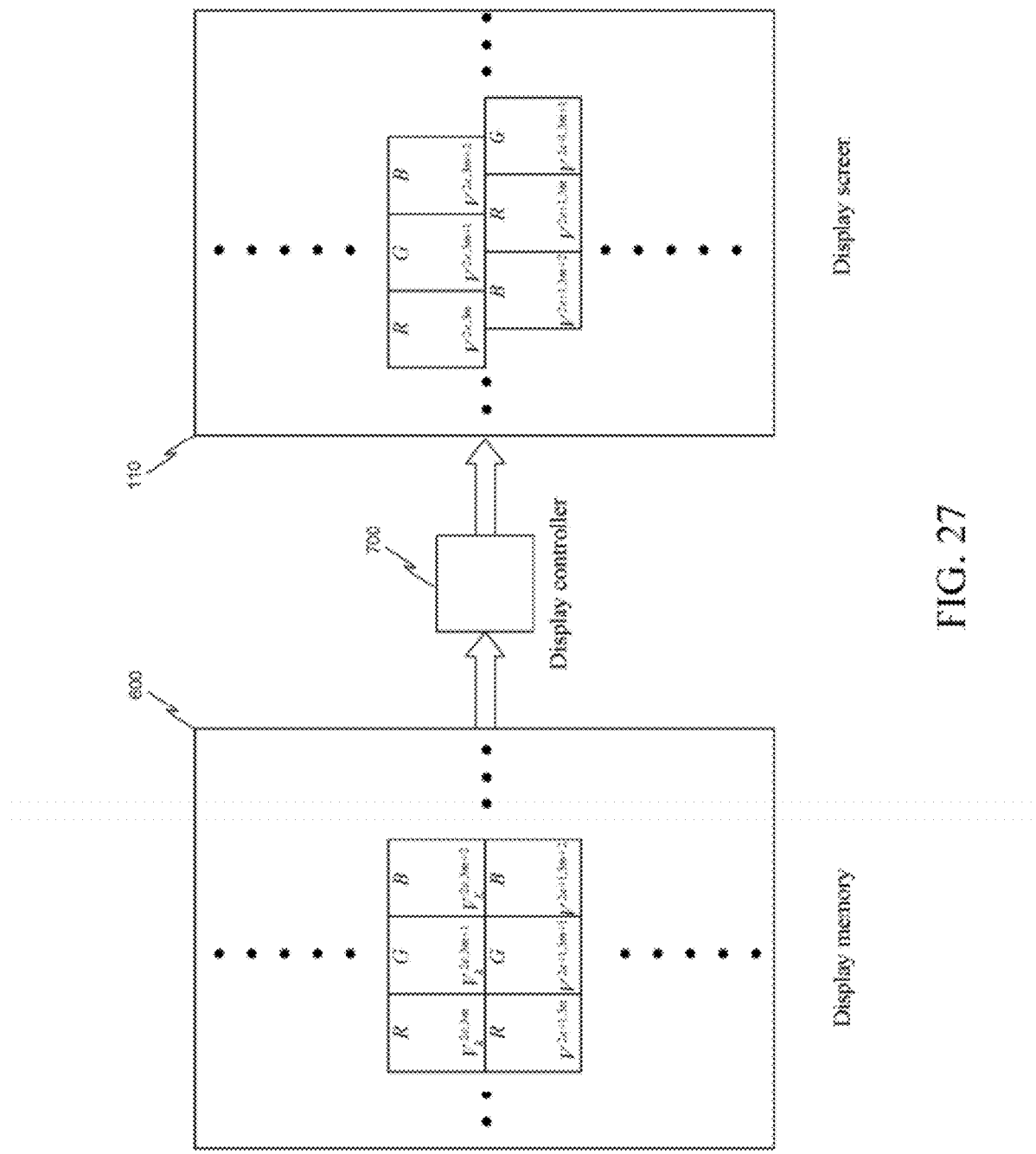
FIG. 27 is a schematic view of an image output of a display controller.

Firstly, for the display screen having sub-pixels in Delta configuration, the general relation of the memory image and the image output is illustrated. For the display screen having sub-pixels in right shifted even Delta configuration in FIG. 4, according to Formula (13), the image data of the corresponding single-view image $V_k$ is as shown in FIG. 26. That is, for the image at the sub-pixel position (i,j) on the screen, the corresponding sub-pixel image data is $V_k^{i,j}$. The image data of the single-view image $V_k$ is firstly stored in a display memory 600 as shown in FIG. 27. Thereafter, a display controller 700 sequentially outputs and displays the sub-pixel image data $V_k^{i,j}$ at the sub-pixel position (i,j) on the screen 110. According to the different Delta configurations of display screens, the display controller 700 is capable of performing different sequence of configurations on the sub-pixel image data on the even-numbered horizontal scan lines or the odd-numbered horizontal scan lines stored in the display memory 600 and then outputting the sub-pixel image data.

Therefore, for the display screen 110 having sub-pixels in right shifted even Delta configuration, as shown in FIG. 27, the even-numbered horizontal scan lines on the display memory 600 respectively have sub-pixel image data $V_k^{2e,3m}$, $V_k^{2e,3m+1}$, and $V_k^{2e,3m+2}$ (where e and m are positive integers including 0) configured in an R, G, B sequence. The display controller 700 outputs the sub-pixel image data onto the screen 110 in the sequence of $V_k^{2e,3m}$, $V_k^{2e,3m+1}$, and $V_k^{2e,3m+2}$, i.e., the R, G, B sequence. That is, for the sub-pixel image on the even-numbered horizontal scan lines, the display controller 700 outputs the sub-pixel image data without changing the sub-pixel image configuration sequence.

Additionally, the odd-numbered horizontal scan lines on the display memory 600 respectively have sub-pixel image data $V_k^{2e+1,3m}$, $V_k^{2e+1,3m+1}$ and $V_k^{2e+1,3m+2}$ (where e and m are positive integers including 0) configured in an R, G, B sequence. For the sub-pixel image data $V_k^{2e+1,3m}$, $V_k^{2e+1,3m+1}$ and $V_k^{2e+1,3m+2}$ in a group unit of R, G, B, the display controller 700 outputs the sub-pixel image data onto the screen 110 in the sequence of $V_k^{2e+1,3m+2}$, $V_k^{2e+1,3m}$, and $V_k^{2e+1,3m+1}$, i.e., a B, R, G sequence. Therefore, the above operation is defined as an operation of a right rotation of the configuration sequence. Further, an operation of a left rotation of the configuration sequence is also defined. That is, for the sub-pixel image data $V_k^{2e+1,3m}$, $V_k^{2e+1,3m+1}$ and $V_k^{2e+1,3m+2}$ configured in the R, G, B sequence, the operation of a left rotation of the configuration sequence is to output the sub-pixel image data onto the screen 110 in the sequence of $V_k^{2e+1,3m+1}$, $V_k^{2e+1,3m+2}$ and $V_k^{2e+1,3m}$, i.e., a G, B, R sequence (not shown).

Figure 28:
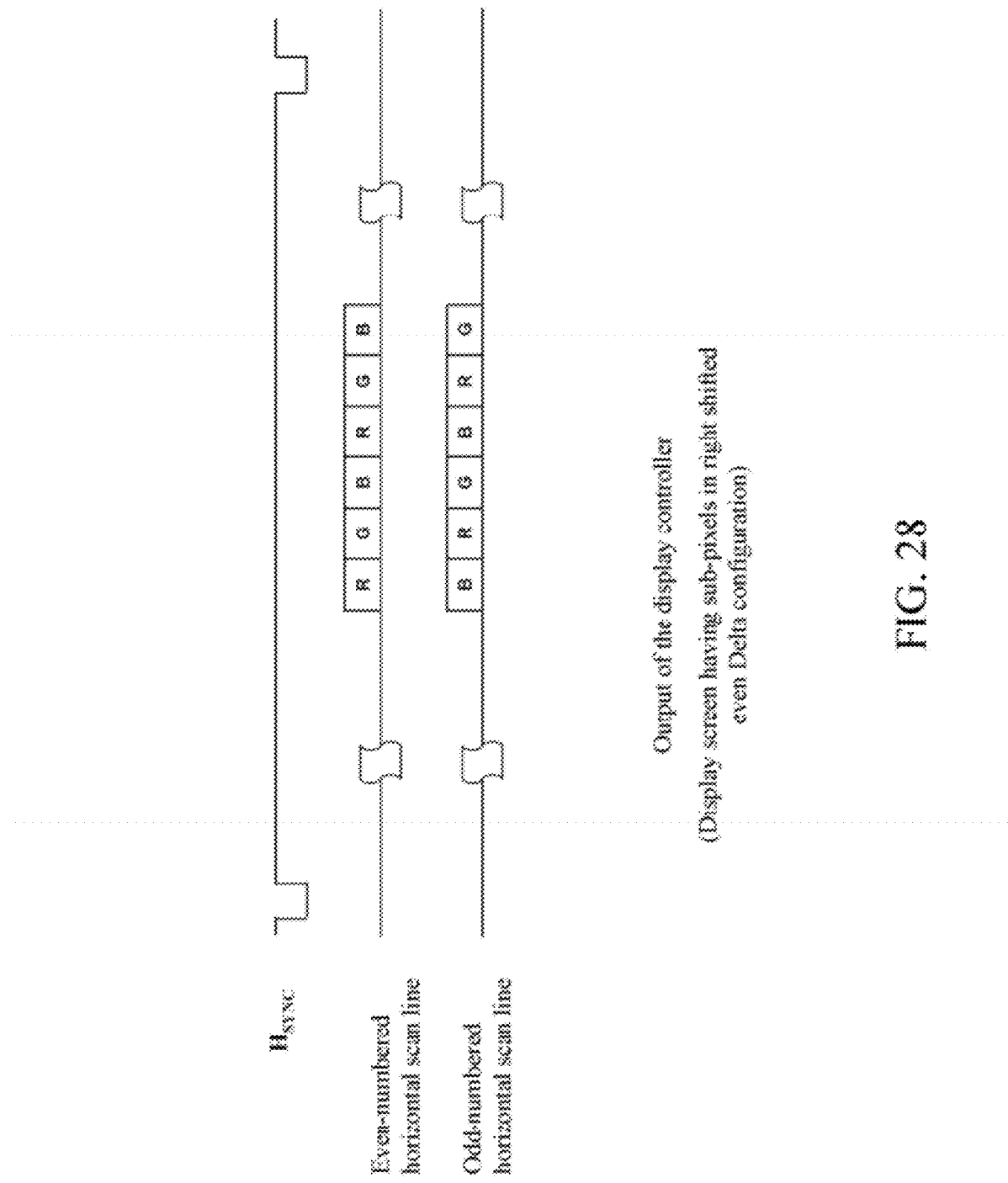
FIG. 28 to FIG. 31 are schematic views of a sub-pixel image output of a display controller.

FIG. 28 is a schematic view of a sub-pixel image output of the display controller. Therefore, for the display screen having sub-pixels in right shifted even Delta configuration in FIG. 4, for the even-numbered horizontal scan lines on the display memory 600, the display controller 700 outputs the sub-pixel image data without changing the R, G, B sequence of the sub-pixel image data; and for the odd-numbered horizontal scan lines, the display controller 700 outputs the sub-pixel image data in the B, R, G sequence in a group unit of R, G, B sub-pixels according to the operation of the right rotation of the configuration sequence. The $H_{SYNC}$ in this figure is a conventional horizontal image scan synchronizing signal.

Figure 29:
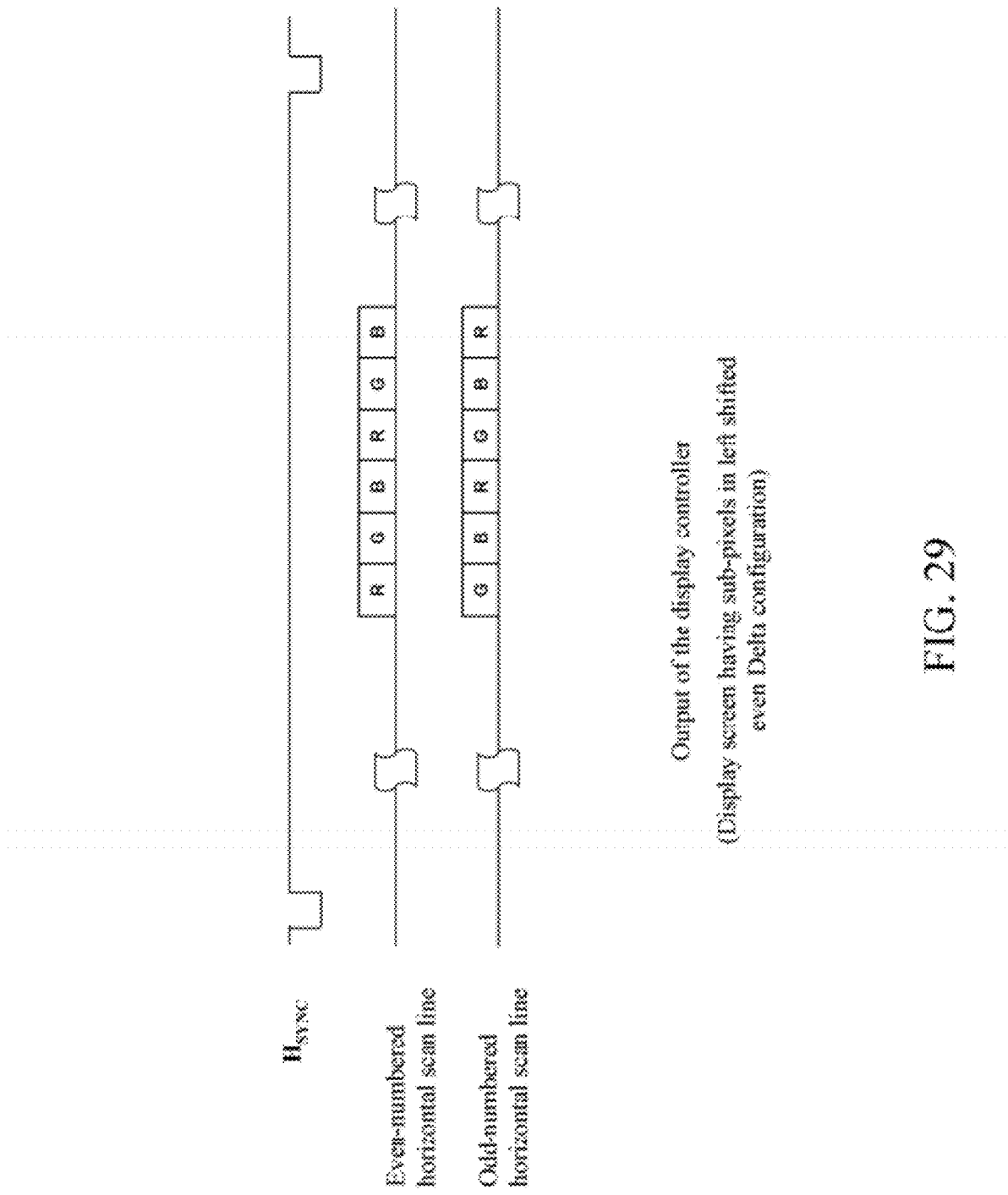

For the display screen having sub-pixels in left shifted even Delta configuration in FIG. 5, FIG. 29 is a schematic view of the sub-pixel image output of the display controller 700. For the even-numbered horizontal scan lines on the display memory 600, the display controller 700 outputs the sub-pixel image data without changing the R, G, B sequence of the sub-pixel image data; and for the odd-numbered horizontal scan lines, the display controller 700 outputs the sub-pixel image data in the G, B, R sequence in a group unit of R, G, B sub-pixels according to the operation of the left rotation of the configuration sequence.

Figure 30:
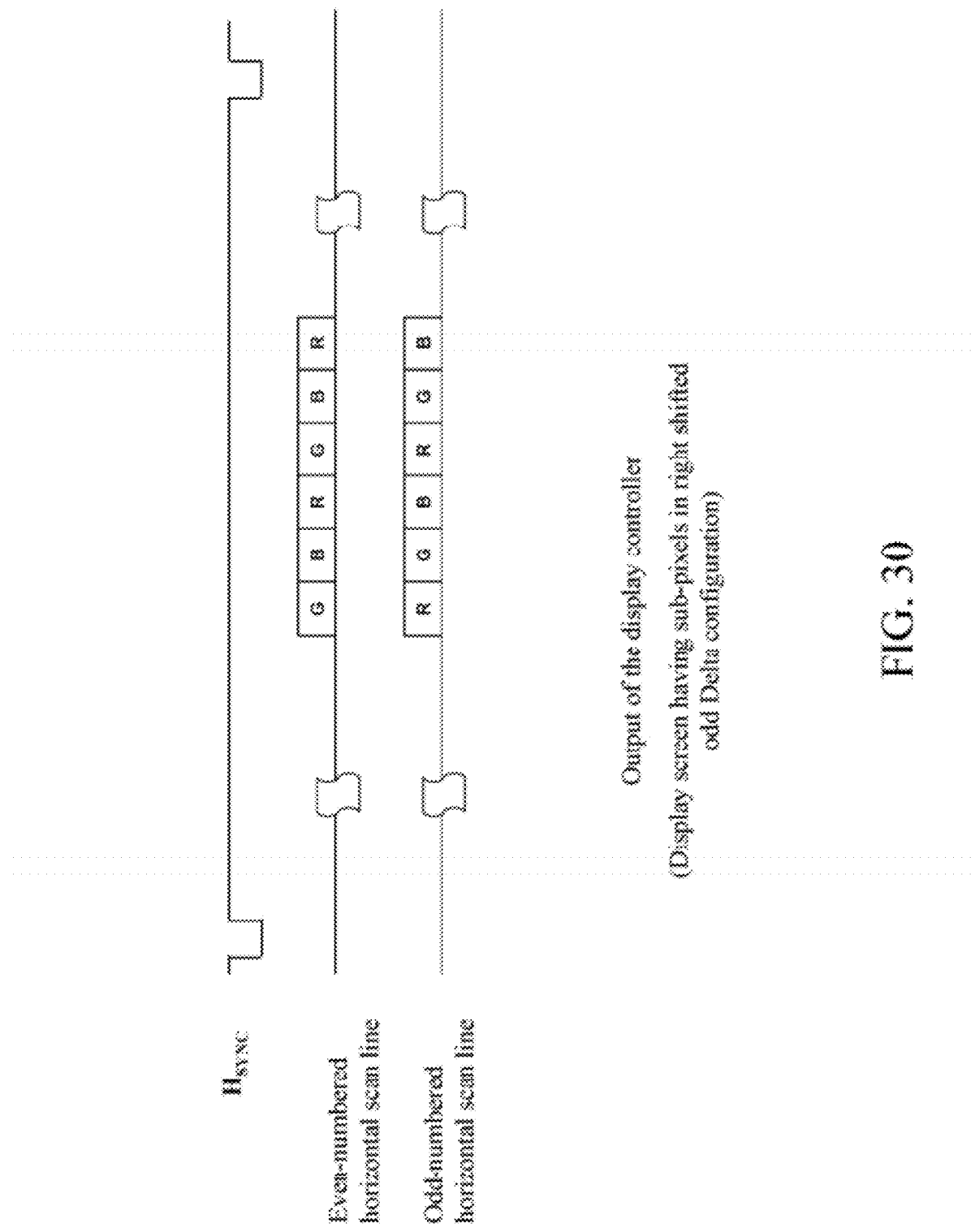

For the display screen having sub-pixels in right shifted odd Delta configuration in FIG. 6, FIG. 30 is a schematic view of the sub-pixel image output of the display controller 700. For the odd-numbered horizontal scan lines on the display memory 600, the display controller 700 outputs the sub-pixel image data without changing the R, G, B sequence of the sub-pixel image data; and for the even-numbered horizontal scan lines, the display controller 700 outputs the sub-pixel image data in the G, B, R sequence in a group unit of R, G, B sub-pixels according to the operation of the left rotation of the configuration sequence.

Figure 31:
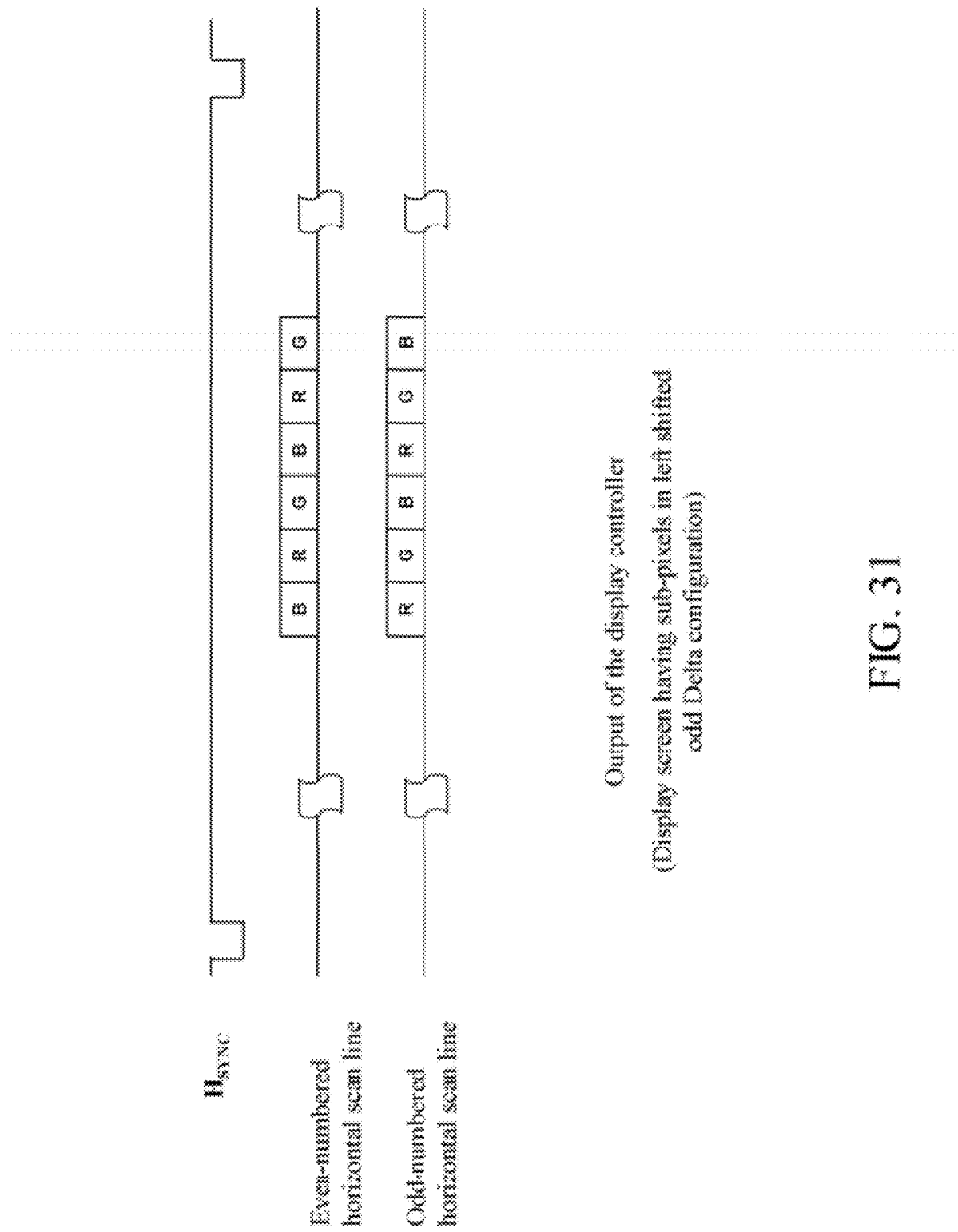

For the display screen having sub-pixels in left shifted odd Delta configuration in FIG. 7, FIG. 31 is a schematic view of the sub-pixel image output of the display controller 700. For the odd-numbered horizontal scan lines on the display memory 600, the display controller 700 outputs the sub-pixel image data without changing the R, G, B sequence of the sub-pixel image data; and for the even-numbered horizontal scan lines, the display controller 700 outputs the sub-pixel image data in the B, R, G sequence in a group unit of R, G, B sub-pixels according to the operation of the right rotation of the configuration sequence.

In view of the above, the display controller 700 is capable of performing the sub-pixel image configuration sequence conversion, and the conversion function refers to converting the sub-pixel image data originally configured in the R, G, B sequence on the even-numbered or odd-numbered horizontal scan lines to a different configuration sequence and then outputting the sub-pixel image data in the new configuration, so as to display the image. For the convenience of illustration, the conversion is defined as a conversion of the sub-pixel image configuration sequence at the display controller end.

For the combination of the multi-view image $V_k$, since the display controller 700 has the characteristic of the sub-pixel image configuration sequence conversion, the multi-view combined image cannot be directly generated according to the operations of Formulas (14) to (18). Thus, a memory image configuration, combination, and conversion procedure must be used to generate a correct multi-view combined image. The memory image configuration, combination, and conversion procedure includes a memory-end sub-pixel image configuration sequence conversion procedure, a multi-view image combination procedure, and a memory-end sub-pixel image configuration sequence inverse conversion procedure.

The memory-end sub-pixel image configuration sequence conversion procedure mainly includes performing a sub-pixel image configuration sequence conversion on all the multi-view images $V_k$ (as shown in FIG. 26) and performing a sub-pixel image data configuration sequence conversion (e.g., an operation of a right rotation of the configuration sequence) on R, G, B sub-pixel image data on the necessary horizontal scan lines of the multi-view image $V_k$ respectively according to a sub-pixel configuration manner of the display screen having sub-pixels in Delta configuration in a group unit of R, G, B sub-pixels. That is, the sub-pixel data of the multi-view image $V_k$ is firstly converted to the configuration sequence of the sub-pixels on the display screen, so as to generate a converted multi-view image $V_k'$. Then, according to Formulas (14) to (18), a multi-view image combination is performed on all the converted multi-view images y: to generate a converted multi-view combined image $\Sigma_n'$. Finally, a memory-end sub-pixel image configuration sequence inverse conversion is performed on the converted multi-view combined image $\Sigma_n'$. The configuration sequence inverse conversion performs an operation of sub-pixel image data configuration sequence inverse conversion (e.g., an operation of a left rotation of the configuration sequence) on the sub-pixel image data on the same horizontal scan lines of the converted multi-view combined image $\Sigma_n'$, so as to generate a recovered multi-view combined image $\Sigma_n$. Finally, the recovered multi-view combined image $\Sigma_n$ is stored in the display memory 600, thus achieving the purpose of correctly displaying the recovered multi-view combined image. Hereinafter, the memory-end sub-pixel image configuration sequence conversion procedure is firstly illustrated.

Figure 32:
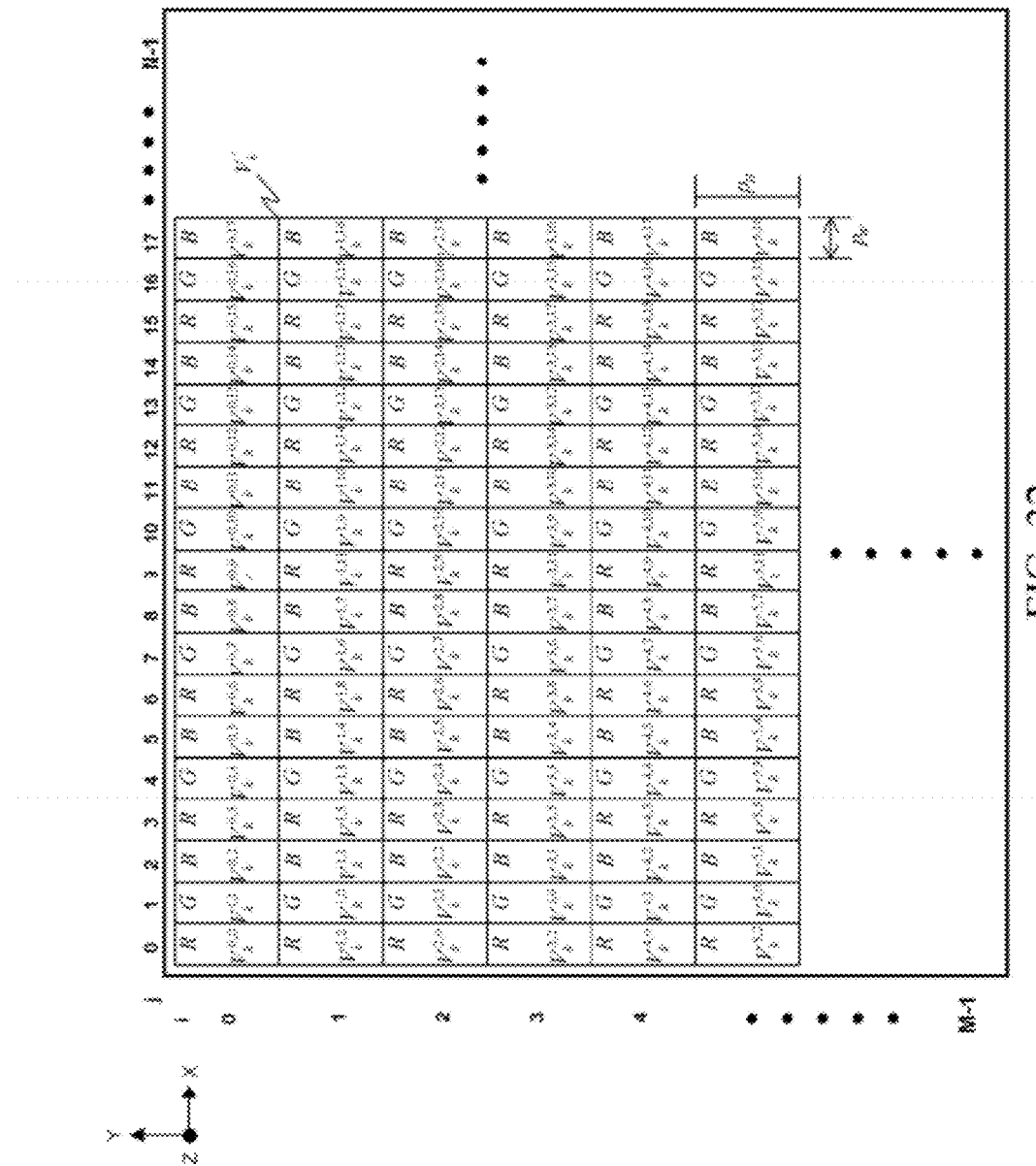
FIG. 32 to FIG. 33 are schematic views of a converted multi-view image $V_k'$

For the display screen 110 having sub-pixels in right shifted even Delta configuration in FIG. 4, the memory-end sub-pixel image configuration sequence conversion is performed on the even-numbered horizontal scan lines of all the multi-view images $V_k$ stored in the memory (not shown) without changing the sub-pixel image data configuration sequence; and for all the odd-numbered horizontal scan lines, an operation of a right rotation of the configuration sequence is performed in a group unit of R, G, B sub-pixels to obtain a converted multi-view image $V_k'$ as shown in FIG. 32, in which the sub-pixel image data $V_k'(i, j)$ at the position (i,j) is expressed by the following formulas:

$$\text{when } i = 2e,\ V_k'(i, j) = V_k^{i,j} \tag{29}$$

$$\text{when } i = 2e + 1,\ V_k'(i, j) = V_k^{i, 3 \times int\left(\frac{j}{3}\right) + Mod[j+2, 3]} \tag{30}$$

where e is a positive integer including 0.

Figure 33:
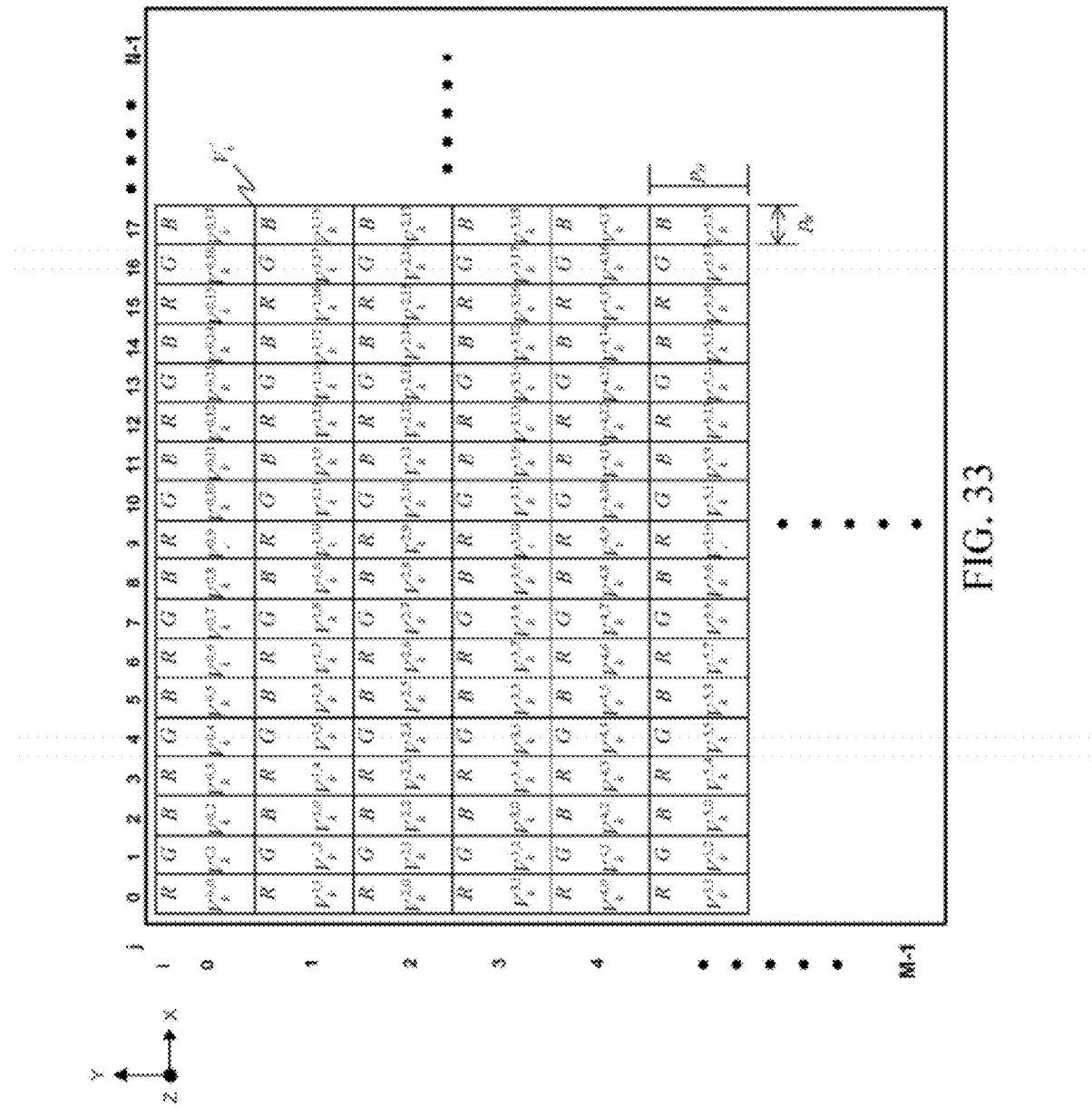

For the display screen 120 having sub-pixels in left shifted even Delta configuration in FIG. 5, the memory-end sub-pixel image configuration sequence conversion is performed on the even-numbered horizontal scan lines of all the multi-view images $V_k$ stored in the memory (not shown) without changing the sub-pixel image data configuration sequence; and for all the odd-numbered horizontal scan lines, an operation of a left rotation of the configuration sequence is performed in a group unit of R, G, B sub-pixels to obtain a converted multi-view image $V_k'$ as shown in FIG. 33, in which the sub-pixel image data $V_k'(i, j)$ at the position (i,j) is expressed by the following formulas:

$$\text{when } i = 2e,\ V_k'(i, j) = V_k^{i,j} \tag{31}$$

$$\text{when } i = 2e + 1,\ V_k'(i, j) = V_k^{i, 3 \times int\left(\frac{j}{3}\right) + Mod[j-2, 3]} \tag{32}$$

where e is defined as described above.

For the display screen 130 having sub-pixels in right shifted odd Delta configuration in FIG. 6, the memory-end sub-pixel image configuration sequence conversion is performed on the odd-numbered horizontal scan lines of all the multi-view images $V_k$ stored in the memory (not shown) without changing the sub-pixel image data configuration sequence; and for all the even-numbered horizontal scan lines, an operation of a left rotation of the configuration sequence is performed in a group unit of R, G, B sub-pixels to obtain a converted multi-view image $V_k'$ (not shown), in which the sub-pixel image data $V_k'(i, j)$ at the position (i,j) is expressed by the following formulas:

$$\text{when } i = 2e + 1,\ V_k'(i, j) = V_k^{i,j} \tag{33}$$

$$\text{when } i = 2e,\ V_k'(i, j) = V_k^{i, 3 \times int\left(\frac{j}{3}\right) + Mod[j-2, 3]} \tag{34}$$

where e is defined as described above.

For the display screen 140 having sub-pixels in left shifted odd Delta configuration in FIG. 7, the memory-end sub-pixel image configuration sequence conversion is performed on the odd-numbered horizontal scan lines of all the multi-view images $V_k$ stored in the memory (not shown) without changing the sub-pixel image data configuration sequence; and for all the even-numbered horizontal scan lines, an operation of a right rotation of the configuration sequence is performed in a group unit of R, G, B sub-pixels to obtain a converted multi-view image $V_k'$ (not shown), in which the sub-pixel image data $V_k'(i, j)$ at the position (i,j) is expressed by the following formulas:

$$\text{when } i = 2e + 1,\ V_k'(i, k) = V_k^{i,j} \tag{35}$$

$$\text{when } i = 2e,\ V_k'(i, j) = V_k^{i, 3 \times int\left(\frac{j}{3}\right) + Mod[j+2, 3]} \tag{36}$$

where e is defined as described above.

As described above, the multi-view image $V_k$ goes through Formulas (29) to (36) to obtain various converted multi-view images $V_k'$ and then goes through Formulas (14) to (18) to obtained a converted multi-view combined image $\Sigma_n'$, which is expressed by the following formula:

$$\Sigma_n' = \sum_{i=0}^{M-1} \sum_{j=0}^{N-1} V_\Lambda'(i, j) \tag{37}$$

Figure 34:
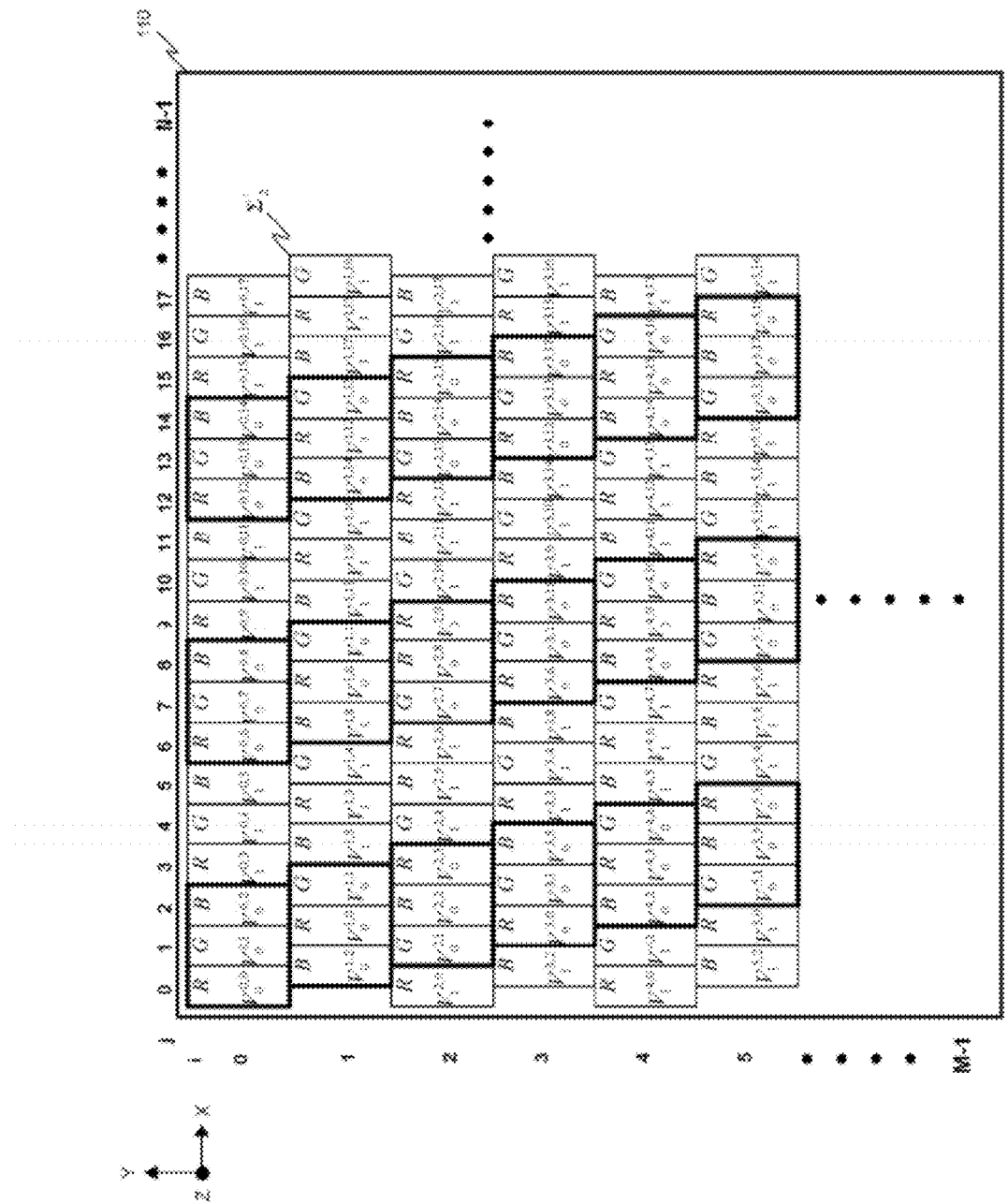
FIG. 34 is a schematic view of a converted right slant 2-view combined image $\Sigma_2'$.

FIG. 34 shows a converted right slant 2-view combined image E; obtained by taking the display screen having sub-pixels in right shifted even Delta configuration as an example, in which n=2, m=3, Q=2, Δ=0, Π=1.

Finally, a process of memory-end sub-pixel image configuration sequence inverse conversion is performed on the converted multi-view combined image $\Sigma_n'$ to recover the sub-pixel image data with the changed configuration sequence in the converted multi-view combined image $\Sigma_n'$ to the original R, G, B configuration sequence and to acquire a recovered multi-view combined image $\Sigma_n'$ which is expressed by the following formula:

$$\Sigma_n = \sum_{i=0}^{M-1} \sum_{j=0}^{N-1} U_\Lambda(i, j) \tag{38}$$

As described above, for the converted multi-view combined image $\Sigma_n'$ obtained by the conversion according to Formulas (29) to (30), in the memory-end sub-pixel image configuration sequence inverse conversion procedure, an operation of a left rotation of the configuration sequence, indicated by the following formula, is performed on all the odd-numbered horizontal scan lines in the image $\Sigma_n'$ in a group unit of R, G, B sub-pixels to recover the R, G, B configuration sequence and to acquire the recovered multi-view combined image $\Sigma_n$:

when $i = 2e$, $U_\Lambda(i, j) = V'_\Lambda(i, j)$ (39)

when $i = 2e + 1$, $U_\Lambda(i, j) = V'_\Lambda\left(i, 3 \times \text{int}\left(\frac{j}{3}\right) + \text{Mod}[j - 2, 3]\right)$ (40)

As described above, for the converted multi-view combined image $\Sigma_n{}'$ obtained by the conversion according to Formulas (31) to (32), in the memory-end sub-pixel image configuration sequence inverse conversion procedure, an operation of a right rotation of the configuration sequence, indicated by the following formula, is performed on all the odd-numbered horizontal scan lines in the image $\Sigma_n{}'$ in a group unit of R, G, B sub-pixels to recover the R, G, B configuration sequence and to acquire the recovered multi-view combined image $\Sigma_n$:

when $i = 2e$, $U_\Lambda(i, j) = V'_\Lambda(i, j)$ (41)

when $i = 2e + 1$, $U_\Lambda(i, j) = V'_\Lambda\left(i, 3 \times \text{int}\left(\frac{j}{3}\right) + \text{Mod}[j + 2, 3]\right)$ (42)

As described above, for the converted multi-view combined image $\Sigma_n{}'$ obtained by the conversion according to Formulas (33) to (34), in the memory-end sub-pixel image configuration sequence inverse conversion procedure, an operation of a right rotation of the configuration sequence, indicated by the following formula, is performed on all the even-numbered horizontal scan lines in the image $\Sigma_n{}'$ in a group unit of R, G, B sub-pixels to recover the R, G, B configuration sequence and to acquire the recovered multi-view combined image $\Sigma_n$:

when $i = 2e + 1$, $U_\Lambda(i, j) = V'_\Lambda(i, j)$ (43)

when $i = 2e$, $U_\Lambda(i, j) = V'_\Lambda\left(i, 3 \times \text{int}\left(\frac{j}{3}\right) + \text{Mod}[j + 2, 3]\right)$ (44)

As described above, for the converted multi-view combined image $\Sigma_n{}'$ obtained by the conversion according to Formulas (35) to (36), in the memory-end sub-pixel image configuration sequence inverse conversion procedure, an operation of a left rotation of the configuration sequence, indicated by the following formula, is performed on all the even-numbered horizontal scan lines in the image $\Sigma_n{}'$ in a group unit of R, G, B sub-pixels to recover the R, G, B configuration sequence and to acquire the recovered multi-view combined image $\Sigma_n$:

when $i = 2e + 1$, $U_\Lambda(i, j) = V'_\Lambda(i, j)$ (45)

when $i = 2e$, $U_\Lambda(i, j) = V'_\Lambda\left(i, 3 \times \text{int}\left(\frac{j}{3}\right) + \text{Mod}[j - 2, 3]\right)$ (46)

Figure 35:
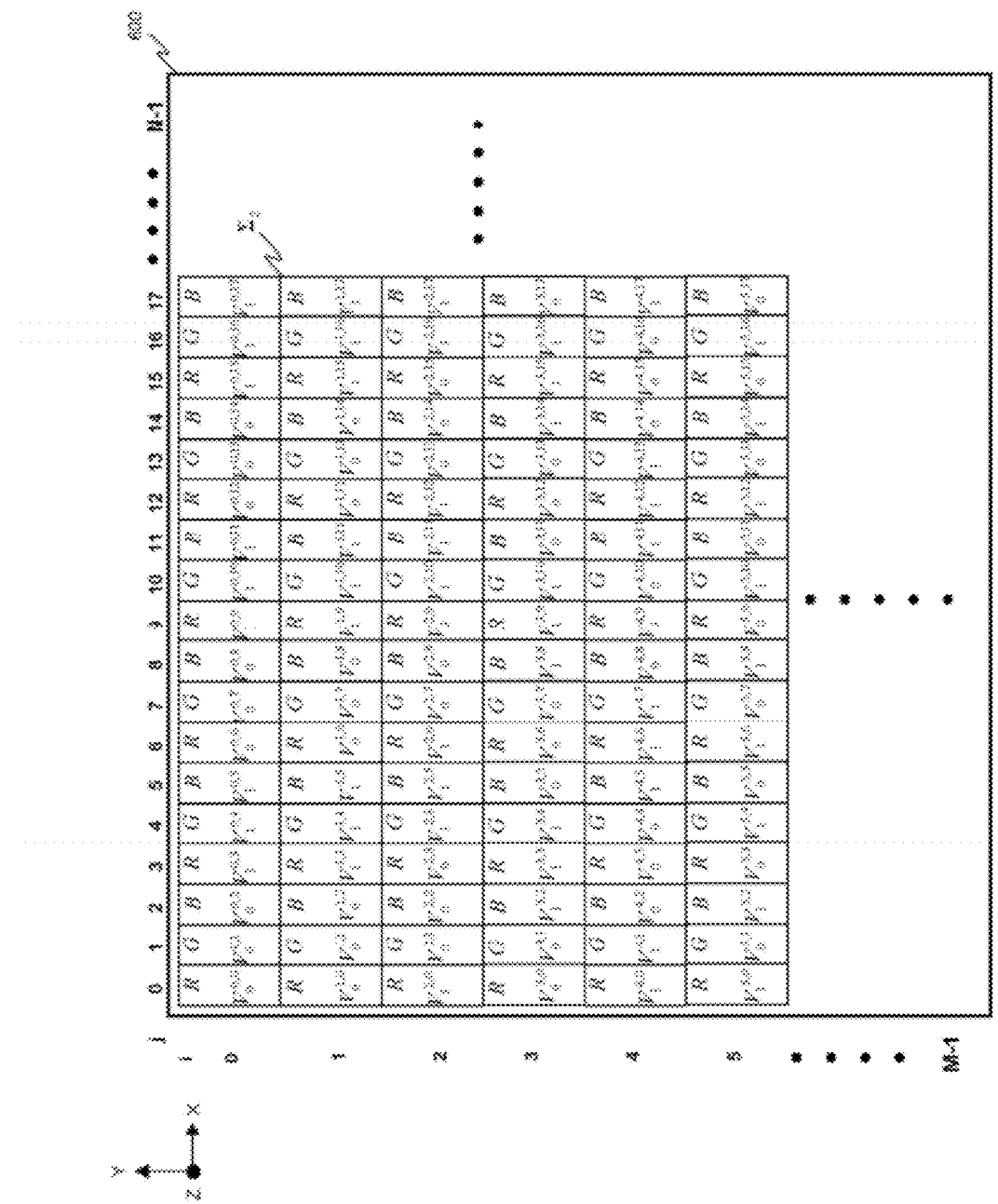
FIG. 35 is a schematic view of a recovered right slant 2-view combined image $\Sigma_2$.

Therefore, the memory-end sub-pixel image configuration sequence inverse conversion procedure is performed on the converted right slant 2-view combined image $\Sigma_2{}'$ in FIG. 34 to obtain the recovered right slant 2-view combined image $\Sigma_2$ in FIG. 35.

Additionally, the display controller 700 may not be capable of performing the sub-pixel image configuration sequence conversion, that is, for the image stored in the display memory, regardless of the even-numbered and the odd-numbered horizontal scan lines, the display controller 700 outputs the sub-pixel image data without changing the sub-pixel image data configuration sequence. Hereinafter, the display controller without the sub-pixel image configuration sequence conversion function is referred to as a non-conversion display controller; and the display controller conventionally having the sub-pixel image configuration sequence conversion function is referred to as a conversion display controller. Thereby, when the non-conversion display controller is used, the memory image configuration, combination, and conversion procedure only includes a memory-end sub-pixel image configuration sequence conversion procedure, and a multi-view image combination procedure. In this case, as described above, the memory-end sub-pixel image configuration sequence conversion only needs to be performed on the multi-view image $V_k$ to generate a converted multi-view image $V_k{}'$. Next, according to Formulas (14) to (18), the multi-view image combination is performed to generate a converted multi-view combined image $\Sigma_n{}'$. The converted multi-view combined image $\Sigma_n{}'$ is then stored in the display memory 600. Therefore, the non-conversion display controller can be used to correctly output the multi-view combined image onto the display screen having sub-pixels in Delta configuration.

Figure 36:
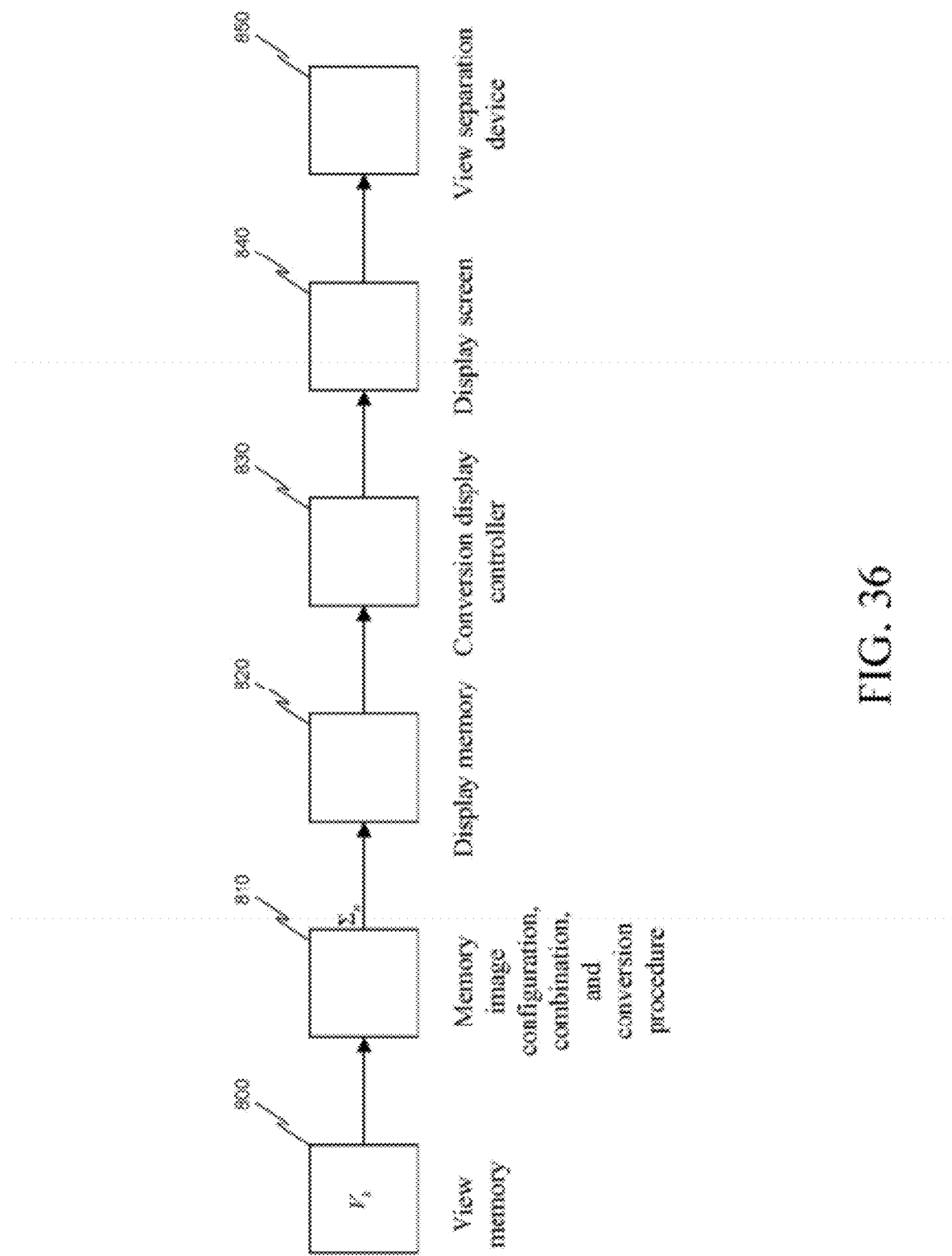
FIG. 36 is a schematic view of a first embodiment of the present invention.

In view of the above, a 3D image display device according to a first embodiment of the present invention, as shown in FIG. 36, mainly includes a multi-view image $V_k$, a view memory 800, a memory image configuration, combination, and conversion procedure 810, a display memory 820, a conversion display controller 830, a display screen having sub-pixels in Delta configuration 840, and a view separation device 850. As described above, the view memory 800 mainly stores and outputs the multi-view image $V_k$. The memory image configuration, combination, and conversion procedure 810 mainly includes a memory-end sub-pixel image configuration sequence conversion procedure, a multi-view image combination procedure, and a memory-end sub-pixel image configuration sequence inverse conversion procedure (the function of each procedure is as described above), and is capable of performing sub-pixel image configuration sequence conversion and multi-view image combination on the multi-view image $V_k$, and outputting a recovered multi-view combined image $\Sigma_n$. The display memory 820 mainly stores and outputs the recovered multi-view combined image $\Sigma_n$. The conversion display controller 830 mainly performs sub-pixel image data configuration sequence conversion on image data on even-numbered or odd-numbered horizontal scan lines of the recovered multi-view combined image $\Sigma_n$ and then outputs the horizontal scan image data. The display screen having sub-pixels in Delta configuration 840 receives the horizontal scan image data and displays the recovered multi-view combined image $\Sigma_n$. The view separation device 850 performs view separation on the recovered multi-view combined image $\Sigma_n$ to display a 3D image.

Figure 37:
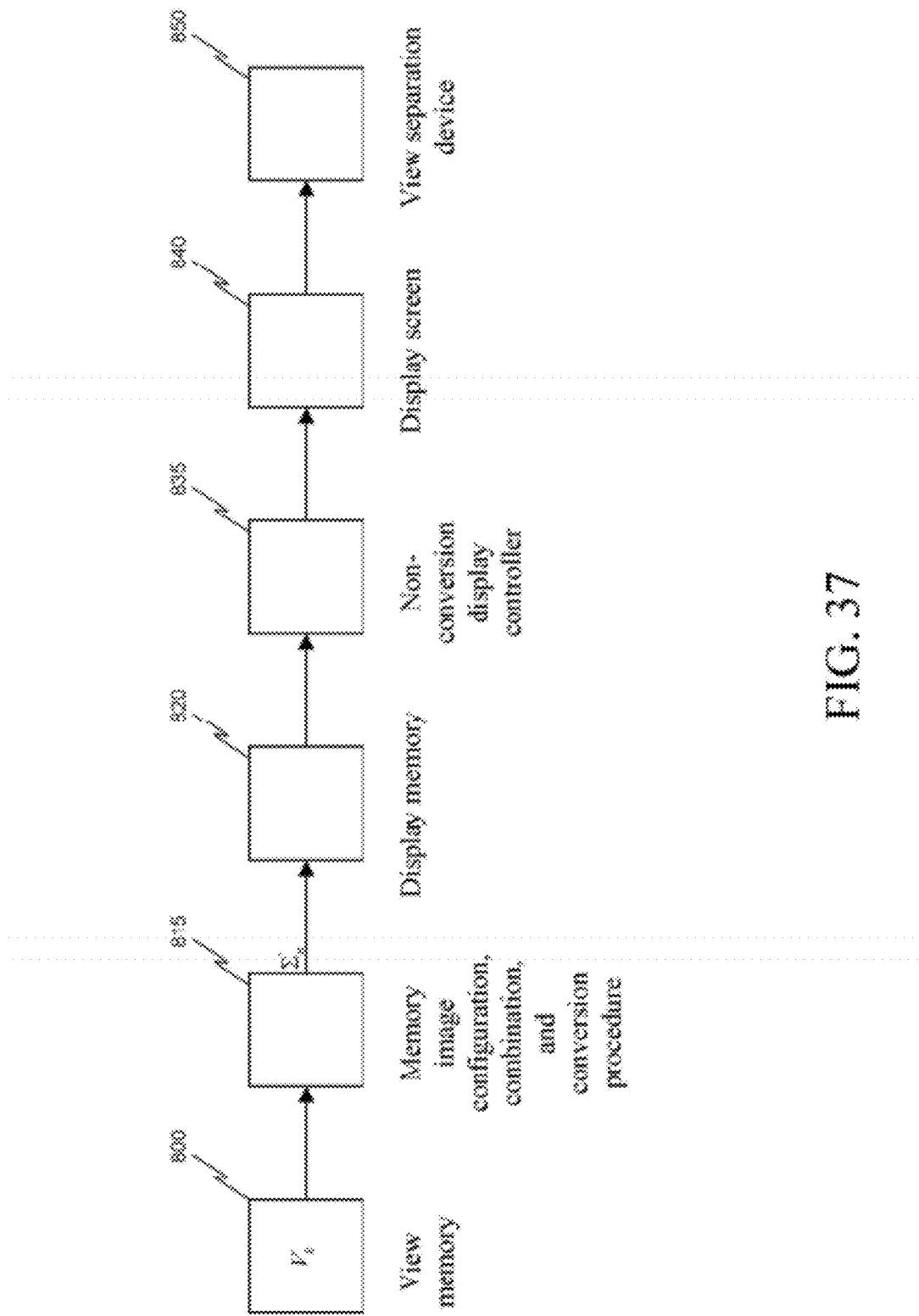
FIG. 37 is a schematic view of a second embodiment of the present invention.

In view of the above, a 3D image display device according to a second embodiment of the present invention, as shown in FIG. 37, mainly includes a view memory 800, a memory image configuration, combination, and conversion procedure 815, a display memory 820, a non-conversion display controller 835, a display screen having sub-pixels in Delta configuration 840, and a view separation device 850. As described above, the view memory 800 mainly stores and outputs the multi-view image $V_k$. The memory image configuration, combination, and conversion procedure 815 mainly includes a memory-end sub-pixel image configuration sequence conversion procedure and a multi-view image combination procedure (the function of each procedure is as described above), and is capable of performing processes of sub-pixel image configuration sequence conversion and multi-view image combination on the multi-view image $V_k$, and outputting a converted multi-view combined image $\Sigma_n'$. The display memory 820 mainly stores and outputs the converted multi-view combined image $\Sigma_n'$. The non-conversion display controller 835 mainly performs no sub-pixel image data configuration sequence conversion on image data on horizontal scan lines of the converted multi-view combined image $\Sigma_n'$ so as to output the horizontal scan image data. The display screen having sub-pixels in Delta configuration 840 receives the horizontal scan image data and displays the converted multi-view combined image $\Sigma_n'$. The view separation device 850 performs view separation on the converted multi-view combined image $\Sigma_n'$ to display a 3D image.

As described above, the present invention is mainly directed to a 3D image display device, in which a flat panel display screen having sub-pixels in Delta configuration is provided. For an auto-stereoscopic display, the present invention is a general design method. Firstly, the method of the present invention is applicable to any flat panel display screen in LCD, OLED, or Plasma display, and is also applicable to flat panel display screens having various sub-pixel configurations. The multi-view image combination as mentioned in the present invention, indicated by Formulas (15) to (16), is a general formula for multi-view image combination. That is to say, the multi-view combined image obtained by introducing different and proper values into m, n, Q, Δ, Π is adapted to the application of the flat panel display screen having sub-pixels in Delta configuration, and also satisfies the application of other flat panel display screens having different sub-pixel configurations as well as the view separation devices having different structures.

For example, ROC Patent Application No. 098145946 discloses a full-frame 3D image display device, in which the 2-view combined image in FIG. 9 is a 2-view combined image obtained by introducing m=1, n=2, Q=M, Δ=0, Π=1 into Formula (15); while the 2-view combined image in FIG. 22 is a 2-view combined image obtained by introducing m=1, n=2, Q=M, Δ=0, Π=1 into Formula (16). The two 2-view combined images are adapted to the flat panel display screen having sub-pixels in horizontal strip configuration, and also adapted to the vertical strip parallax barrier or the vertical lens array.

For example, ROC Patent Application No. 099108528 discloses a multi-functional liquid crystal parallax barrier device, in which the five-view combined image in FIG. 16 is a five-view combined image obtained by introducing m=3, n=5, Q=1, Δ=0, Π=1 into Formula (15). The five-view combined image is adapted to the flat panel display screen having sub-pixels in horizontal strip configuration, adapted to the right slantwise step parallax barrier or the right slantwise strip parallax barrier, and also adapted to the right slantwise step micro lenticular lens array. The relative displacement of the upper and lower horizontal line structures of the right slantwise step parallax barrier and the right slantwise step micro lenticular lens array is a sub-pixel width $p_W$. The slant angle of the right slantwise strip parallax barrier is $\theta=\tan^{-1}(p_W/p_H)$.

For example, ROC Patent Application No. 099127429 discloses a bi-directional 3D image display device, in which the 2-view combined image in FIG. 11 is a 2-view combined image obtained by introducing m=3, n=2, Q=1, Δ=0, Π=3 into Formula (15). The 2-view combined image is adapted to the flat panel display screen having sub-pixels in Mosaic configuration and is adapted to the 2-view right slantwise step parallax barrier.

For example, U.S. Pat. No. 6,064,424 (Cornelis van Berkel, 2000) discloses an AUTOSTEREOSCOPIC DISPLAY APPARATUS, in which the seven-view combined image in FIG. 4A is a seven-view combined image obtained by introducing m=1, n=7, Q=1, Δ=0, Π=4 into Formula (15). The seven-view combined image is adapted to the flat panel display screen having sub-pixels in horizontal strip configuration and is adapted to the right slant lenticular sheet.

In view of the above, the 3D image display device of the present invention is a general design method, and is applicable to various display screens having different sub-pixel configurations, provides a general formula for multi-view image combination and various view separation device designs, and also provides a mechanism having a display controller with or without the conversion function so as to satisfy different applications of the auto-stereoscopic display. The above descriptions are merely preferred embodiments of the present invention, and are not intended to limit the scope of the present invention. Various modifications and variations made within the appended claims of the present invention shall fall within the scope of the invention. Thus, we will be most grateful if a patent right is granted upon careful examination of the Examiner.

What is claimed is:
1. A 3D image display device, comprising:
a multi-view image, mainly formed by n single-view images

$$V_k = \sum_{i=0}^{M-1} \sum_{j=0}^{N-1} V_k^{i,j},$$

wherein the single-view image is formed by N×M sub-pixel images, N is a total number of sub-pixel images in a horizontal direction, and M is a total number of sub-pixel images in a vertical direction; j, i are respectively indices of horizontal and vertical positions of a single sub-pixel image; n is a total number of views and a value thereof is greater than or equal to 2; and k is an index of view and a value thereof is $0 \leq k < n$;
a view memory, mainly for storing and outputting a multi-view image;
a memory image configuration, combination, and conversion procedure, mainly for performing processes of sub-pixel image configuration sequence conversion and multi-view image combination on the multi-view image, and outputting a recovered multi-view combined image $\Sigma_n$;
a display memory, mainly for storing and outputting the recovered multi-view combined image $\Sigma_n$;
a conversion display controller, for inputting the recovered multi-view combined image $\Sigma_n$, and mainly performing sub-pixel image data configuration sequence conversion for image data on even-numbered or odd-numbered horizontal scan lines of the image $\Sigma_n$, and then outputting the horizontal scan image data;
a display screen having sub-pixels in Delta configuration, formed by N×M sub-pixels with a geometrical size of $p_W \times p_H$, where $p_W$ is a sub-pixel width and $p_H$ is a sub-pixel height, and used for inputting the horizontal scan image data and displaying the recovered multi-view combined image $\Sigma_n$; and
a view separation device, for performing view separation on the recovered multi-view combined image $\Sigma_n$ to display a 3D image.

2. The 3D image display device according to claim 1, wherein the memory image configuration, combination, and conversion procedure comprises a memory-end sub-pixel image configuration sequence conversion procedure, a multi-view image combination procedure, and a memory-end sub-pixel image configuration sequence inverse conversion procedure.

3. The 3D image display device according to claim 2, wherein the memory-end sub-pixel image configuration sequence conversion procedure mainly performs the sub-pixel image data configuration sequence conversion on R, G, B sub-pixel image data on the necessary horizontal scan lines of all the multi-view images $V_k$ according to a sub-pixel configuration manner of the display screen having sub-pixels in Delta configuration in a group unit of R, G, B sub-pixels, so as to generate a converted multi-view image $$V'_k = \sum_{i=0}^{M-1} \sum_{j=0}^{N-1} V'_k(i, j).$$

4. The 3D image display device according to claim 3, wherein the sub-pixel image data configuration sequence conversion is an operation of a right rotation of the configuration sequence to obtain a converted multi-view image $V_k'$, and the sub-pixel image data $V_k'(i, j)$ at a position (i,j) is expressed by the following formulas:

$$\text{when } i = 2e, \ V'_k(i, k) = V_k^{i,j}; \text{ and}$$
$$\text{when } i = 2e + 1, \ V'_k(i, j) = V_k^{i, 3\times int\left(\frac{j}{3}\right) + Mod[j+2, 3]},$$

where e is a positive integer including 0.

5. The 3D image display device according to claim 3, wherein the sub-pixel image data configuration sequence conversion is an operation of a left rotation of the configuration sequence to obtain a converted multi-view image $V_k'$, and the sub-pixel image data $V_k'(i, j)$ at the position (i,j) is expressed by the following formulas:

$$\text{when } i = 2e, \ V'_k(i, j) = V_k^{i,j}; \text{ and}$$
$$\text{when } i = 2e + 1, \ V'_k(i, j) = V_k^{i, 3\times int\left(\frac{j}{3}\right) + Mod[j-2, 3]},$$

where e is a positive integer including 0.

6. The 3D image display device according to claim 3, wherein the sub-pixel image data configuration sequence conversion is an operation of a left rotation of the configuration sequence to obtain a converted multi-view image $V_k'$ and the sub-pixel image data $V_k'(i, j)$ at the position (i,j) is expressed by the following formulas:

$$\text{when } i = 2e + 1, \ V'_k(i, j) = V_k^{i,j}; \text{ and}$$
$$\text{when } i = 2e, \ V'_k(i, j) = V_k^{i, 3\times int\left(\frac{j}{3}\right) + Mod[j-2, 3]},$$

where e is a positive integer including 0.

7. The 3D image display device according to claim 3, wherein the sub-pixel image data configuration sequence conversion is an operation of a right rotation of the configuration sequence to obtain a converted multi-view image $V_k'$, and the sub-pixel image data $V_k'(i, j)$ at the position (i,j) is expressed by the following formulas:

$$\text{when } i = 2e + 1, \ V'_k(i, j) = V_k^{i,j}; \text{ and}$$
$$\text{when } i = 2e, \ V'_k(i, j) = V_k^{i, 3\times int\left(\frac{j}{3}\right) + Mod[j+2, 3]},$$

where e is a positive integer including 0.

8. The 3D image display device according to claim 2, wherein the multi-view image combination procedure generates a converted multi-view combined image $\Sigma_n'$ from the converted multi-view image $V_k'$ according to the following formulas, and the multi-view combined image has a right slant characteristic:

$$\Sigma'_n = \sum_{i=0}^{M-1} \sum_{j=0}^{N-1} V'_\Lambda(i, j); \text{ and}$$

$$\Lambda = Mod\left[int\left(\frac{j - \Pi \times int\left(\frac{i+\Delta}{Q}\right)}{m}\right), n\right],$$

where M, N, i, j, n are defined as described above; m is a number of sub-pixels for forming a transverse display unit of the smallest view image and a value thereof is a positive integer greater than or equal to 1; Q is a number of sub-pixels for forming a vertical display unit of the smallest view image and a value thereof is a positive integer greater than or equal to 1; $\Delta$ is a transverse displacement phase and a value thereof is a positive integer including 0; and $\Pi$ is a transverse displacement amplitude and a value thereof is a positive integer greater than or equal to 1.

9. The 3D image display device according to claim 8, wherein the values of n, m, Q, $\Delta$, $\Pi$ are preferably: n=2, m=3, Q=2, $\Delta$=0, $\Pi$=1; or preferably: n=2, m=2, Q=2, $\Delta$=0, $\Pi$=1.

10. The 3D image display device according to claim 8, wherein the values of n, m, Q, $\Delta$, $\Pi$ are preferably: n=2, m=3, Q=2, $\Delta$=1, $\Pi$=1; or preferably: n=2, m=2, Q=2, $\Delta$=1, $\Pi$=1.

11. The 3D image display device according to claim 2, wherein the multi-view image combination procedure generates a converted multi-view combined image $\Sigma_n'$ from the converted multi-view image $V_k'$ according to the following formulas, and the multi-view combined image has a left slant characteristic:

$$\Sigma'_n = \sum_{i=0}^{M-1} \sum_{j=0}^{N-1} V'_\Lambda(i, j); \text{ and}$$

$$\Lambda = Mod\left[int\left(\frac{(N-1) - j - \Pi \times int\left(\frac{i+\Delta}{Q}\right)}{m}\right), n\right],$$

where M, N, i, j, m, n, Q, $\Delta$, $\Pi$ are defined as described above.

12. The 3D image display device according to claim 11, wherein the values of n, m, Q, $\Delta$, $\Pi$ are preferably: n=2, m=3, Q=2, $\Delta$=0, $\Pi$=1; or preferably: n=2, m=2, Q=2, $\Delta$=0, $\Pi$=1.

13. The 3D image display device according to claim 11, wherein the values of n, m, Q, $\Delta$, $\Pi$ are preferably: n=2, m=3, Q=2, $\Delta$=1, $\Pi$=1; or preferably: n=2, m=2, Q=2, $\Delta$=1, $\Pi$=1.

14. The 3D image display device according to claim 2, wherein the memory-end sub-pixel image configuration sequence inverse conversion procedure mainly performs the sub-pixel image data configuration sequence conversion on R, G, B sub-pixel image data on the necessary horizontal scan lines of the converted multi-view combined image $\Sigma_n'$ according to a sub-pixel configuration manner of the display screen having sub-pixels in Delta configuration in a group unit of R, G, B sub-pixels, so as to generate a recovered multi-view combined image $$\Sigma_n = \sum_{i=0}^{M-1} \sum_{j=0}^{N-1} U_\Lambda(i, j).$$

15. The 3D image display device according to claim 14, wherein the sub-pixel image data configuration sequence conversion is an operation of a right rotation of the configuration sequence to obtain a recovered multi-view combined image $\Sigma_n$, and the sub-pixel image data $U_\Lambda(i, j)$ at the position (i,j) is expressed by the following formulas:

when $i = 2e$, $U_\Lambda(i, j) = V_\Lambda'(i, j)$; and when $i = 2e + 1$, $U_\Lambda(i, j) = V_\Lambda'\left(i, 3 \times \operatorname{int}\left(\frac{j}{3}\right) + \operatorname{Mod}[j + 2, 3]\right)$, where e is a positive integer including 0.

16. The 3D image display device according to claim 14, wherein the sub-pixel image data configuration sequence conversion is an operation of a left rotation of the configuration sequence to obtain a recovered multi-view combined image $\Sigma_n$, and the sub-pixel image data $U_\Lambda(i, j)$ at the position (i,j) is expressed by the following formulas:

when $i = 2e$, $U_\Lambda(i, j) = V_\Lambda'(i, j)$; and when $i = 2e + 1$, $U_\Lambda(i, j) = V_\Lambda'\left(i, 3 \times \operatorname{int}\left(\frac{j}{3}\right) + \operatorname{Mod}[j - 2, 3]\right)$, where e is a positive integer including 0.

17. The 3D image display device according to claim 14, wherein the sub-pixel image data configuration sequence conversion is an operation of a left rotation of the configuration sequence to obtain a recovered multi-view combined image $\Sigma_n$, and the sub-pixel image data $U_\Lambda(i, j)$ at the position (i,j) is expressed by the following formulas:

when $i = 2e + 1$, $U_\Lambda(i, j) = V_\Lambda'(i, j)$; and when $i = 2e$, $U_\Lambda(i, j) = V_\Lambda'\left(i, 3 \times \operatorname{int}\left(\frac{j}{3}\right) + \operatorname{Mod}[j - 2, 3]\right)$, where e is a positive integer including 0.

18. The 3D image display device according to claim 14, wherein the sub-pixel image data configuration sequence conversion is an operation of a right rotation of the configuration sequence to obtain a recovered multi-view combined image $\Sigma_n$, and the sub-pixel image data $U_\Lambda(i, j)$ at the position (i,j) is expressed by the following formulas:

when $i = 2e + 1$, $U_\Lambda(i, j) = V_\Lambda'(i, j)$; and when $i = 2e$, $U_\Lambda(i, j) = V_\Lambda'\left(i, 3 \times \operatorname{int}\left(\frac{j}{3}\right) + \operatorname{Mod}[j + 2, 3]\right)$, where e is a positive integer including 0.

19. The 3D image display device according to claim 1, wherein the function of the sub-pixel image data configuration sequence conversion of the conversion display controller is mainly to convert an R, G, B configuration sequence into a B, R, G configuration sequence.

20. The 3D image display device according to claim 1, wherein the function of the sub-pixel image data configuration sequence conversion of the conversion display controller is mainly to convert an R, G, B configuration sequence into a G, B, R configuration sequence.

21. The 3D image display device according to claim 1, wherein the display screen having sub-pixels in Delta configuration is one selected from a display screen having sub-pixels in right shifted even Delta configuration, a display screen having sub-pixels in right shifted odd Delta configuration, a display screen having sub-pixels in left shifted even Delta configuration, and a display screen having sub-pixels in left shifted odd Delta configuration.

22. The 3D image display device according to claim 1, wherein the view separation device is one selected from a slantwise step parallax barrier, a slantwise strip parallax barrier, a slant lenticular sheet, and a slantwise step micro lenticular lens array.

23. The 3D image display device according to claim 22, wherein the slantwise step parallax barrier is one selected from a right slantwise step parallax barrier and a left slantwise step parallax barrier.

24. The 3D image display device according to claim 22, wherein the slantwise step parallax barrier is formed by a plurality of single basic barrier structure units, and the basic barrier structure unit is formed by a light-transmissive element and a shielding element; the plurality of the basic barrier structure units forms a barrier horizontal line structure unit along the horizontal direction in a repetitive configuration manner; a plurality of the barrier horizontal line structure units forms the slantwise step parallax barrier along the vertical direction in a repetitive configuration manner; and the structures of the light-transmissive element and the shielding element respectively have a horizontal width $B_n$, $\overline{B}_n$ and a vertical height $B_H$, which are expressed by the following formulas:

$$B_n = \frac{P_{DW} L_E}{P_{DW} + L_E};$$

$$\overline{B}_n = (n-1)B_n;\ \text{and}$$

$$B_H = \frac{B_n}{P_{DW}} p_H,$$

with $P_{DW}$ set to satisfy the following relation:

$P_{DW} = m p_W$, where n is a total number of views, $L_E$ is an interpupillary distance, $P_{DW}$ is a horizontal width of a transverse display unit of the smallest view image, m is a number of sub-pixels for forming a transverse display unit of the smallest view image and a value thereof is an integer m≧1, $p_W$ is a sub-pixel width, and $p_H$ is a sub-pixel height.

25. The 3D image display device according to claim 24, wherein any two adjacent upper and lower barrier horizontal line structures of the slantwise step parallax barrier are arranged in the horizontal direction in a manner that the lower horizontal line structure is shifted rightwards or leftwards by a displacement relative to the upper horizontal line structure.

26. The 3D image display device according to claim 25, wherein the shifted displacement is $p_W/2$.

27. The 3D image display device according to claim 22, wherein the slantwise strip parallax barrier is one selected from a right slantwise strip parallax barrier and a left slantwise strip parallax barrier.

28. The 3D image display device according to claim 22, wherein the slantwise strip parallax barrier is formed by a plurality of light-transmissive elements having a slantwise strip structure and a plurality of shielding elements having a slantwise strip structure, the light-transmissive elements and the shielding elements are alternately configured along the horizontal direction, and the structures of the light-transmissive element and the shielding element respectively have a horizontal width $B_n$, $\overline{B}_n$ and a slant angle θ, which are expressed by the following formulas:

$$B_n = \frac{P_{DW}L_E}{P_{DW} + L_E};$$

$$\overline{B}_n = (n-1)B_n; \text{ and}$$

$$\|\theta\| = \tan^{-1}\left(\frac{p_W}{2p_H}\right),$$

with $P_{DW}$ set to satisfy the following relation:

$$P_{DW} = mp_W,$$

where n is a total number of views, $L_E$ is an interpupillary distance, $P_{DW}$ is a horizontal width of a transverse display unit of the smallest view image, m is a number of sub-pixels for forming a transverse display unit of the smallest view image and a value thereof is an integer m≧1, $p_W$ is a sub-pixel width, $p_H$ is a sub-pixel height, and the slant angle θ is $$\theta = \tan^{-1}\left(\frac{p_W}{2p_H}\right) \text{ or } \theta = -\tan^{-1}\left(\frac{p_W}{2p_H}\right).$$

29. The 3D image display device according to claim 22, wherein the slant lenticular sheet is one selected from a right slant lenticular sheet and a left slant lenticular sheet.

30. The 3D image display device according to claim 22, wherein the slant lenticular sheet is formed by a plurality of single slant lenticular lenses, and the structure of the single slant lenticular lens has a lens width $L_n$, a lens thickness $L_t$, and a lens slant angle θ, which are expressed by the following formulas:

$$L_n = \frac{P_{DW}L_E}{P_{DW} + L_E}n;$$

$$L_t \sim f; \text{ and}$$

$$\|\theta\| = \tan^{-1}\left(\frac{p_W}{2p_H}\right),$$

with $P_{DW}$ set to satisfy the following relation:

$$P_{DW} = mp_W,$$

where n is a total number of views, $L_E$ is an interpupillary distance, $P_{DW}$ is a horizontal width of a transverse display unit of the smallest view image, m is a number of sub-pixels for forming a transverse display unit of the smallest view image and a value thereof is an integer m≧1, $p_W$ is a sub-pixel width, $p_H$ is a sub-pixel height, f is a focus of the lenticular lens, and the slant angle θ is $$\theta = \tan^{-1}\left(\frac{p_W}{2p_H}\right) \text{ or } \theta = -\tan^{-1}\left(\frac{p_W}{2p_H}\right).$$

31. The 3D image display device according to claim 22, wherein the slantwise step micro lenticular lens array is one selected from a right slantwise step micro lenticular lens array and a left slantwise step micro lenticular lens array.

32. The 3D image display device according to claim 22, wherein in the slantwise step micro lenticular lens array, a plurality of single step micro lenticular lenses forms a lens horizontal line structure unit along the horizontal direction in a repetitive configuration manner; a plurality of the lens horizontal line structure units forms the slantwise step micro lenticular lens array along the vertical direction in a repetitive configuration manner, and the structure of the single step micro lenticular lens is a micro lenticular lens with a lens width $L_n$, a lens length $L_H$, and a lens thickness $L_t$, and the lens width $L_n$ and the lens thickness $L_t$ are expressed by the following formulas:

$$L_n = \frac{P_{DW}L_E}{P_{DW} + L_E}n;$$

$$L_t \sim f; \text{ and}$$

$$L_H = \frac{L_n}{nP_{DW}}p_H,$$

with $P_{DW}$ set to satisfy the following relation:

$$P_{DW} = mp_W,$$

where n is a total number of views, $L_E$ is an interpupillary distance, $P_{DW}$ is a horizontal width of a transverse display unit of the smallest view image, m is a number of sub-pixels for forming a transverse display unit of the smallest view image and a value thereof is an integer m≧1, $p_W$ is a sub-pixel width, $p_H$ is a sub-pixel height, and f is a focus of the micro lenticular lens.

33. The 3D image display device according to claim 32, wherein any two adjacent upper and lower lens horizontal line structures of the slantwise step micro lenticular lens array are arranged in the horizontal direction in a manner that the lower horizontal line structure is shifted rightwards or leftwards by a displacement relative to the upper horizontal line structure.

34. The 3D image display device according to claim 33, wherein the shifted displacement is $p_W/2$.

35. A 3D image display device, comprising:
a multi-view image, mainly formed by n single-view images $$V_k = \sum_{i=0}^{M-1}\sum_{j=0}^{N-1} V_k^{i,j},$$

wherein the single-view image is formed by N×M sub-pixel images, N is a total number of sub-pixel images in a horizontal direction, M is a total number of sub-pixel images in a vertical direction; j, i are respectively indices of horizontal and vertical positions of a single sub-pixel image; n is a total number of views and a value thereof is greater than or equal to 2; and k is an index of view and a value thereof is 0≦k<n;
- a view memory, mainly for storing and outputting a multi-view image;
- a memory image configuration, combination, and conversion procedure, mainly for performing processes of sub-pixel image configuration sequence conversion and multi-view image combination on the multi-view image, and outputting a converted multi-view combined image $\Sigma_n'$;
- a display memory, mainly for storing and outputting the converted multi-view combined image $\Sigma_n'$;
- a non-conversion display controller, for inputting the converted multi-view combined image $\Sigma_n'$, and for image data on all horizontal scan lines in the image $\Sigma_n'$, outputting the horizontal scan image data without changing the sub-pixel image data configuration sequence;
- a display screen having sub-pixels in Delta configuration, formed by N×M sub-pixels with a geometrical size of $p_W \times p_H$, where $p_W$ is a sub-pixel width and $p_H$ is a sub-pixel height, and used for inputting the horizontal scan image data and displaying the converted multi-view combined image $\Sigma_n'$; and
- a view separation device, for performing view separation on the converted multi-view combined image $\Sigma_n'$, to display a 3D image.

36. The 3D image display device according to claim 35, wherein the memory image configuration, combination, and conversion procedure comprises a memory-end sub-pixel image configuration sequence conversion procedure and a multi-view image combination procedure.

37. The 3D image display device according to claim 36, wherein the memory-end sub-pixel image configuration sequence conversion procedure mainly performs the sub-pixel image data configuration sequence conversion on R, G, B sub-pixel image data on the necessary horizontal scan lines of all the multi-view images $V_k$ according to a sub-pixel configuration manner of the display screen having sub-pixels in Delta configuration in a group unit of R, G, B sub-pixels, so as to generate a converted multi-view image $$V_k' = \sum_{i=0}^{M-1} \sum_{j=0}^{N-1} V_k'(i, j).$$

38. The 3D image display device according to claim 37, wherein the sub-pixel image data configuration sequence conversion is an operation of a right rotation of the configuration sequence to obtain a converted multi-view image $V_k'$, and the sub-pixel image data $V_k'(i, j)$ at a position (i,j) is expressed by the following formulas:

$$\text{when } i = 2e, \quad V_k'(i, j) = V_k^{i,j};$$

and $$\text{when } i = 2e+1, \; V_k'(i, j) = V_k^{i, 3 \times int(\frac{j}{3}) + Mod[j+2,3]},$$

where e is a positive integer including 0.

39. The 3D image display device according to claim 37, wherein the sub-pixel image data configuration sequence conversion is an operation of a left rotation of the configuration sequence to obtain a converted multi-view image $V_k'$, and the sub-pixel image data $V_k'(i, j)$ at the position (i,j) is expressed by the following formulas:

$$\text{when } i = 2e, \quad V_k'(i, j) = V_k^{i,j};$$

and $$\text{when } i = 2e+1, \; V_k'(i, j) = V_k^{i, 3 \times int(\frac{j}{3}) + Mod[j-2,3]},$$

where e is a positive integer including 0.

40. The 3D image display device according to claim 37, wherein the sub-pixel image data configuration sequence conversion is an operation of a left rotation of the configuration sequence to obtain a converted multi-view image $V_k'$, and the sub-pixel image data $V_k'(i, j)$ at the position (i,j) is expressed by the following formulas:

$$\text{when } i = 2e+1, \quad V_k'(i, j) = V_k^{i,j};$$

and $$\text{when } i = 2e, \; V_k'(i, j) = V_k^{i, 3 \times int(\frac{j}{3}) + Mod[j+2,3]},$$

where e is a positive integer including 0.

41. The 3D image display device according to claim 37, wherein the sub-pixel image data configuration sequence conversion is an operation of a right rotation of the configuration sequence to obtain a converted multi-view image $V_k'$, and the sub-pixel image data $V_k'(i, j)$ at the position (i,j) is expressed by the following formulas:

$$\text{when } i = 2e+1, \quad V_k'(i, j) = V_k^{i,j};$$

and $$\text{when } i = 2e, \; V_k'(i, j) = V_k^{i, 3 \times int(\frac{j}{3}) + Mod[j+2,3]},$$

where e is a positive integer including 0.

42. The 3D image display device according to claim 36, wherein the multi-view image combination procedure generates a converted multi-view combined image $\Sigma_n'$ from the converted multi-view image $V_k'$ according to the following formulas, and the multi-view combined image has a right slant characteristic:

$$\sum\nolimits_n' = \sum_{i=0}^{M-1} \sum_{j=0}^{N-1} V_\Lambda'(i, j);$$

and $$\Lambda = Mod\left[ int\left( \frac{j - \Pi \times int\left(\frac{i+\Delta}{Q}\right)}{m} \right), n \right],$$

where M, N, i, j, n are defined as described above; m is a number of sub-pixels for forming a transverse display unit of the smallest view image and a value thereof is a positive integer greater than or equal to 1; Q is a number of sub-pixels for forming a vertical display unit of the smallest view image and a value thereof is a positive integer greater than or equal to 1; Δ is a transverse displacement phase and a value thereof is a positive integer including 0; and Π is a transverse displacement amplitude and a value thereof is a positive integer greater than or equal to 1.

43. The 3D image display device according to claim 42, wherein the values of n, m, Q, Δ, Π are preferably: n=2, m=3, Q=2, Δ=0, Π=1; or preferably: n=2, m=2, Q=2, Δ=0, Π=1.

44. The 3D image display device according to claim 42, wherein the values of n, m, Q, Δ, Π are preferably: n=2, m=3, Q=2, Δ=1, Π=1; or preferably: n=2, m=2, Q=2, Δ=1, Π=1.

45. The 3D image display device according to claim 36, wherein the multi-view image combination procedure generates a converted multi-view combined image $\Sigma_n'$ from the converted multi-view image $V_k'$ according to the following formulas, and the multi-view combined image has a left slant characteristic:

$$\sum{}_n' = \sum_{i=0}^{M-1}\sum_{j=0}^{N-1} V_\Lambda'(i, j);$$

and $$\Lambda = \mathrm{Mod}\left[\mathrm{int}\left(\frac{(N-1)-j-\Pi\times\mathrm{int}\left(\frac{i+\Delta}{Q}\right)}{m}\right), n\right],$$

where M, N, i, j, m, n, Q, Δ, Π are defined as described above.

46. The 3D image display device according to claim 45, wherein the values of n, m, Q, Δ, Π are preferably: n=2, m=3, Q=2, Δ=0, Π=1; or preferably: n=2, m=2, Q=2, Δ=0, Π=1.

47. The 3D image display device according to claim 45, wherein the values of n, m, Q, Δ, Π are preferably: n=2, m=3, Q=2, Δ=1, Π=1; or preferably: n=2, m=2, Q=2, Δ=1, Π=1.

48. The 3D image display device according to claim 35, wherein the display screen having sub-pixels in Delta configuration is one selected from a display screen having sub-pixels in right shifted even Delta configuration, a display screen having sub-pixels in right shifted odd Delta configuration, a display screen having sub-pixels in left shifted even Delta configuration, and a display screen having sub-pixels in left shifted odd Delta configuration.

49. The 3D image display device according to claim 35, wherein the view separation device is one selected from a slantwise step parallax barrier, a slantwise strip parallax barrier, a slant lenticular sheet, and a slantwise step micro lenticular lens array.

50. The 3D image display device according to claim 49, wherein the slantwise step parallax barrier is one selected from a right slantwise step parallax barrier and a left slantwise step parallax barrier.

51. The 3D image display device according to claim 49, wherein the slantwise step parallax barrier is formed by a plurality of single basic barrier structure units, and the basic barrier structure unit is formed by a light-transmissive element and a shielding element; the plurality of the basic barrier structure units forms a barrier horizontal line structure unit along the horizontal direction in a repetitive configuration manner; a plurality of the barrier horizontal line structure units forms the slantwise step parallax barrier along the vertical direction in a repetitive configuration manner; and the structures of the light-transmissive element and the shielding element respectively have a horizontal width $B_n$, $\overline{B}_n$ and a vertical height $B_H$, which are expressed by the following formulas:

$$B_n = \frac{P_{DW}L_E}{P_{DW}+L_E};$$

$$\overline{B}_n = (n-1)B_n;$$

and $$B_H = \frac{B_n}{P_{DW}}p_H,$$

with $P_{DW}$ set to satisfy the following relation:

$$P_{DW}=mp_W,$$

where n is a total number of views, $L_E$ is an interpupillary distance, $P_{DW}$ is a horizontal width of a transverse display unit of the smallest view image, m is a number of sub-pixels for forming a transverse display unit of the smallest view image and a value thereof is an integer m≧1, $p_W$ is a sub-pixel width, and $p_H$ is a sub-pixel height.

52. The 3D image display device according to claim 51, wherein any two adjacent upper and lower barrier horizontal line structures of the slantwise step parallax barrier are arranged in the horizontal direction in a manner that the lower horizontal line structure is shifted rightwards or leftwards by a displacement relative to the upper horizontal line structure.

53. The 3D image display device according to claim 52, wherein the shifted displacement is $p_W/2$.

54. The 3D image display device according to claim 49, wherein the slantwise strip parallax barrier is one selected from a right slantwise strip parallax barrier and a left slantwise strip parallax barrier.

55. The 3D image display device according to claim 49, wherein the slantwise strip parallax barrier is formed by a plurality of light-transmissive elements having a slantwise strip structure and a plurality of shielding elements having a slantwise strip structure, the light-transmissive elements and the shielding elements are alternately configured along the horizontal direction, and the structures of the light-transmissive element and the shielding element respectively have a horizontal width $B_n$, $\overline{B}_n$ and a slant angle θ, which are expressed by the following formulas:

$$B_n = \frac{P_{DW}L_E}{P_{DW}+L_E};$$

$$\overline{B}_n = (n-1)B_n;$$

and $$\|\theta\| = \tan^{-1}\left(\frac{p_w}{2p_H}\right),$$

with $P_{DW}$ set to satisfy the following relation:

$$P_{DW}=mp_W,$$

where n is a total number of views, $L_E$ is an interpupillary distance, $P_{DW}$ is a horizontal width of a transverse display unit of the smallest view image, m is a number of sub-pixels for forming a transverse display unit of the smallest view image and a value thereof is an integer $m \geq 1$, $p_W$ is a sub-pixel width, $p_H$ is a sub-pixel height, and the slant angle θ is $$\theta = \tan^{-1}\left(\frac{p_W}{2p_H}\right) \text{ or } \theta = -\tan^{-1}\left(\frac{p_W}{2p_H}\right).$$

56. The 3D image display device according to claim 49, wherein the slant lenticular sheet is one selected from a right slant lenticular sheet and a left slant lenticular sheet.

57. The 3D image display device according to claim 49, wherein the slant lenticular sheet is formed by a plurality of single slant lenticular lenses, the structure of the single slant lenticular lens has a lens width $L_n$, a lens thickness $L_t$, and a lens slant angle θ, which are expressed by the following formulas:

$$L_n = \frac{P_{DW} L_E}{P_{DW} + L_E} n;$$

$$L_t \sim f;$$

and $$\|\theta\| = \tan^{-1}\left(\frac{p_W}{2p_H}\right),$$

with $P_{DW}$ set to satisfy the following relation:

$$P_{DW} = m p_W,$$

where n is a total number of views, $L_E$ is an interpupillary distance, $P_{DW}$ is a horizontal width of a transverse display unit of the smallest view image, m is a number of sub-pixels for forming a transverse display unit of the smallest view image and a value thereof is an integer $m \geq 1$, $p_W$ is a sub-pixel width, $p_H$ is a sub-pixel height, f is a focus of the lenticular lens, and the slant angle θ is $$\theta = \tan^{-1}\left(\frac{p_W}{2p_H}\right) \text{ or } \theta = -\tan^{-1}\left(\frac{p_W}{2p_H}\right).$$

58. The 3D image display device according to claim 49, wherein the slantwise step micro lenticular lens array is one selected from a right slantwise step micro lenticular lens array and a left slantwise step micro lenticular lens array.

59. The 3D image display device according to claim 49, wherein in the slantwise step micro lenticular lens array, a plurality of single step micro lenticular lenses forms a lens horizontal line structure unit along the horizontal direction in a repetitive configuration manner; a plurality of the lens horizontal line structure units forms the slantwise step micro lenticular lens array along the vertical direction in a repetitive configuration manner, and the structure of the single step micro lenticular lens is a micro lenticular lens with a lens width $L_n$, a lens length $L_H$, and a lens thickness $L_t$, and the lens width $L_n$ and the lens thickness $L_t$ are expressed by the following formulas:

$$L_n = \frac{P_{DW} L_E}{P_{DW} + L_E} n;$$

$$L_t \sim f;$$

and $$L_H = \frac{L_n}{n P_{DW}} p_H,$$

with $P_{DW}$ set to satisfy the following relation:

$$P_{DW} = m p_W,$$

where n is a total number of views, $L_E$ is an interpupillary distance, $P_{DW}$ is a horizontal width of a transverse display unit of the smallest view image, m is a number of sub-pixels for forming a transverse display unit of the smallest view image and a value thereof is an integer $m \geq 1$, $p_W$ is a sub-pixel width, $p_H$ is a sub-pixel height, and f is a focus of the micro lenticular lens.

60. The 3D image display device according to claim 59, wherein any two adjacent upper and lower lens horizontal line structures of the slantwise step micro lenticular lens array are arranged in the horizontal direction in a manner that the lower horizontal line structure is shifted rightwards or leftwards by a displacement relative to the upper horizontal line structure.

61. The 3D image display device according to claim 60, wherein the shifted displacement is $p_W/2$.

\* \* \* \* \*